(12) United States Patent
Herndon

(10) Patent No.: US 10,863,857 B2
(45) Date of Patent: Dec. 15, 2020

(54) CONTAINER ASSEMBLY AND ACCESSORIES THEREFOR

(71) Applicant: Jeffrey R. Herndon, St. Clair Shores, MI (US)

(72) Inventor: Jeffrey R. Herndon, St. Clair Shores, MI (US)

(*) Notice: Subject to any disclaimer, the term of this patent is extended or adjusted under 35 U.S.C. 154(b) by 0 days.

(21) Appl. No.: 16/304,763

(22) PCT Filed: Jun. 2, 2017

(86) PCT No.: PCT/US2017/035676
§ 371 (c)(1),
(2) Date: Nov. 27, 2018

(87) PCT Pub. No.: WO2017/210554
PCT Pub. Date: Dec. 7, 2017

(65) Prior Publication Data
US 2019/0357721 A1    Nov. 28, 2019

Related U.S. Application Data

(60) Provisional application No. 62/344,476, filed on Jun. 2, 2016.

(51) Int. Cl.
*A47J 31/38* (2006.01)
*A47J 31/20* (2006.01)
(Continued)

(52) U.S. Cl.
CPC ............ *A47J 31/38* (2013.01); *A47J 31/20* (2013.01); *A47J 31/3623* (2013.01); *A47J 31/40* (2013.01)

(58) Field of Classification Search
CPC .......... A47J 31/407; A47J 31/20; A47J 31/38; A47J 31/3623; A47J 31/40; A47J 31/3676;
(Continued)

(56) References Cited

U.S. PATENT DOCUMENTS 3,995,445 A * 12/1976 Huskins ............. B65D 81/3883
62/371
4,365,544 A * 12/1982 Howitt ..................... A47J 31/20
99/297
(Continued)

OTHER PUBLICATIONS

Indiegogo webpage for Yecup 365: Your All Season Smart Mug; Mar. 26, 2016 https://www.indiegogo.com/projects/yecup-365-your-all-season-smart-mug#/ <https://www.indiegogo.com/projects/yecup-365-your-all-season-smart-mug>.
(Continued)

*Primary Examiner* — Dana Ross
*Assistant Examiner* — Michael S. Poetzinger
(74) *Attorney, Agent, or Firm* — Fishman Stewart PLLC

(57) ABSTRACT

A container assembly includes a container, a plunger assembly including a plunger, a lid including a lid lever connected to actuate the plunger of the plunger assembly, and a housing disposed in the container and configured to receive mixing media. The lid and the plunger may define a fluid chamber. The plunger assembly may include a rod connected to the lid and the housing. The rod may include an internal fluid passage providing fluid communication between the housing and an opposite end of the rod. The rod may include at least one aperture disposed proximate the end of the rod. Rotation of the lid lever may cause rotation of the rod and translation of the plunger. Translation of the plunger may cause fluid disposed between the plunger and the housing to flow into the housing via at least one inlet port of the housing.

23 Claims, 39 Drawing Sheets

(51) Int. Cl.
*A47J 31/36* (2006.01)
*A47J 31/40* (2006.01)

(58) Field of Classification Search
CPC ..... A47J 31/404; A47J 31/18; A47G 19/2272; A61M 5/30
USPC ........ 99/279, 287, 295, 297, 302 P; 220/715
See application file for complete search history.

(56) References Cited

U.S. PATENT DOCUMENTS

| | | | |
|---|---|---|---|
| 4,832,231 A | 5/1989 | Kolody | |
| 4,867,875 A | 9/1989 | Peranio | |
| 5,880,441 A | 3/1999 | Hartman et al. | |
| 5,932,098 A | 8/1999 | Ross | |
| 6,324,966 B1 | 12/2001 | Joergensen | |
| 6,324,967 B1* | 12/2001 | Robinson | A47J 31/20 99/287 |
| 6,422,133 B1 | 7/2002 | Brady | |
| 7,217,908 B2 | 5/2007 | Orrico et al. | |
| 8,234,971 B2 | 8/2012 | Cerroni | |
| 8,439,221 B2 | 5/2013 | Davis | |
| 8,677,887 B2 | 3/2014 | Crescenzi | |
| 8,695,486 B2 | 4/2014 | Bodum | |
| 2006/0185521 A1 | 8/2006 | Publicover et al. | |
| 2008/0092748 A1 | 4/2008 | Reid | |
| 2009/0229472 A1 | 9/2009 | Ferrara, Jr. | |
| 2010/0098823 A1* | 4/2010 | Nenov | A47J 31/36 426/433 |
| 2010/0275785 A1 | 11/2010 | Weissman et al. | |
| 2010/0294135 A1* | 11/2010 | Weissman | A47J 31/20 99/287 |
| 2011/0083560 A1 | 4/2011 | Chen | |
| 2012/0017767 A1* | 1/2012 | Samso Besora | A47J 31/38 99/302 R |
| 2014/0060337 A1 | 3/2014 | Varnum | |
| 2014/0072684 A1 | 3/2014 | Madden | |
| 2014/0076908 A1* | 3/2014 | Pinelli | B65D 43/02 220/715 |
| 2014/0205725 A1* | 7/2014 | Albanese | A47J 31/20 426/433 |
| 2015/0059592 A1 | 3/2015 | Richardson | |
| 2015/0257579 A1* | 9/2015 | Dammermann | A47J 31/0668 426/454 |
| 2015/0282664 A1 | 10/2015 | Savage et al. | |
| 2016/0000253 A1* | 1/2016 | Song | A47J 31/38 99/295 |
| 2016/0058235 A1* | 3/2016 | Blair | A47J 31/20 99/297 |
| 2017/0303712 A1* | 10/2017 | Pisarevsky | A47J 31/043 |

OTHER PUBLICATIONS

Webpage for Titan Mixer Bottle—World's Mostw Revolutionary Mixer Bottle; <https://www.kickstarter.com/projects/956156534/titan-mixer-bottle-worlds-most-revolutionary-mixer/description>; available at least as early as Jun. 16, 2015.

International Search Report dated Aug. 16, 2017 related to PCT/US2017/035676 filed on Jun. 2, 2017.

* cited by examiner

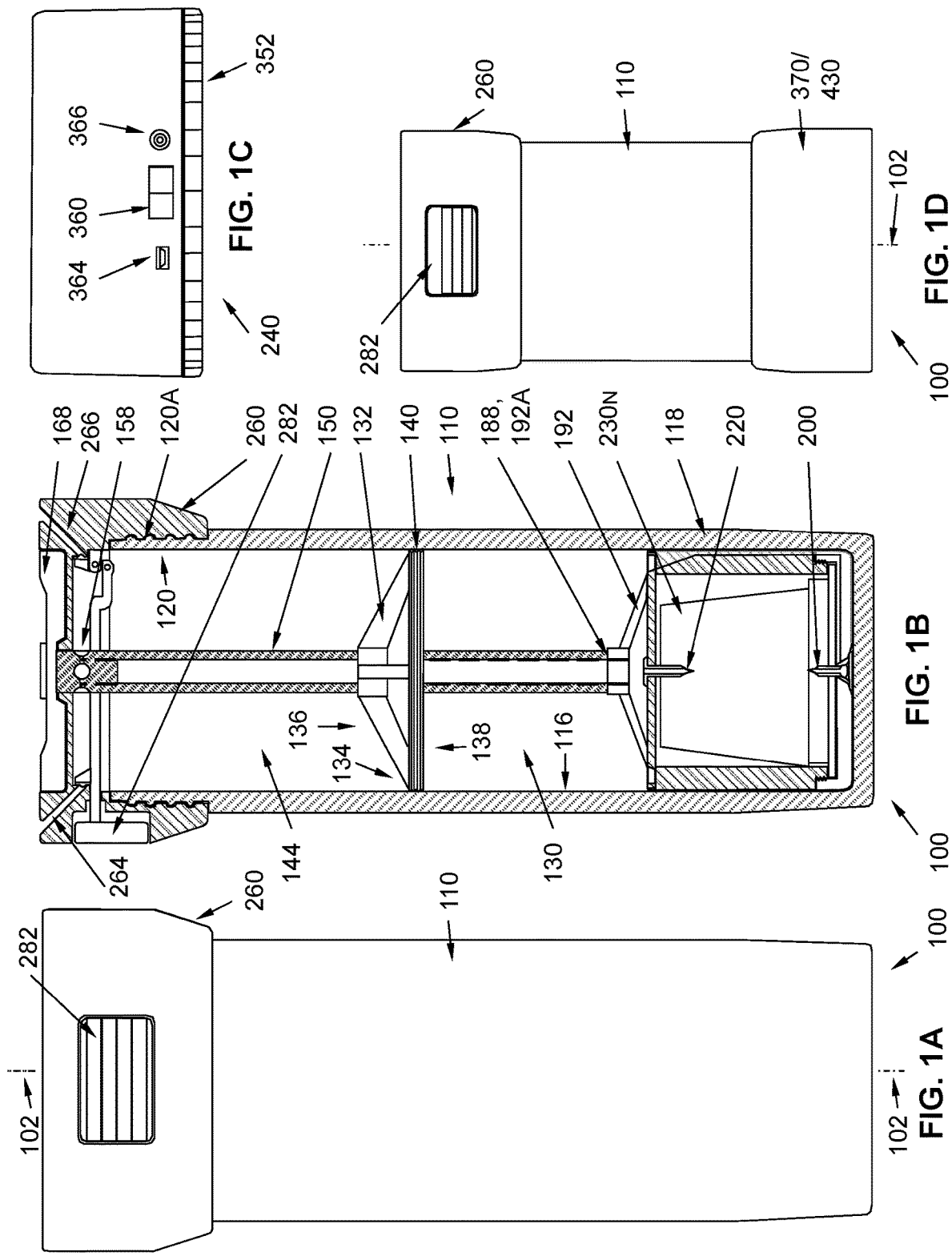

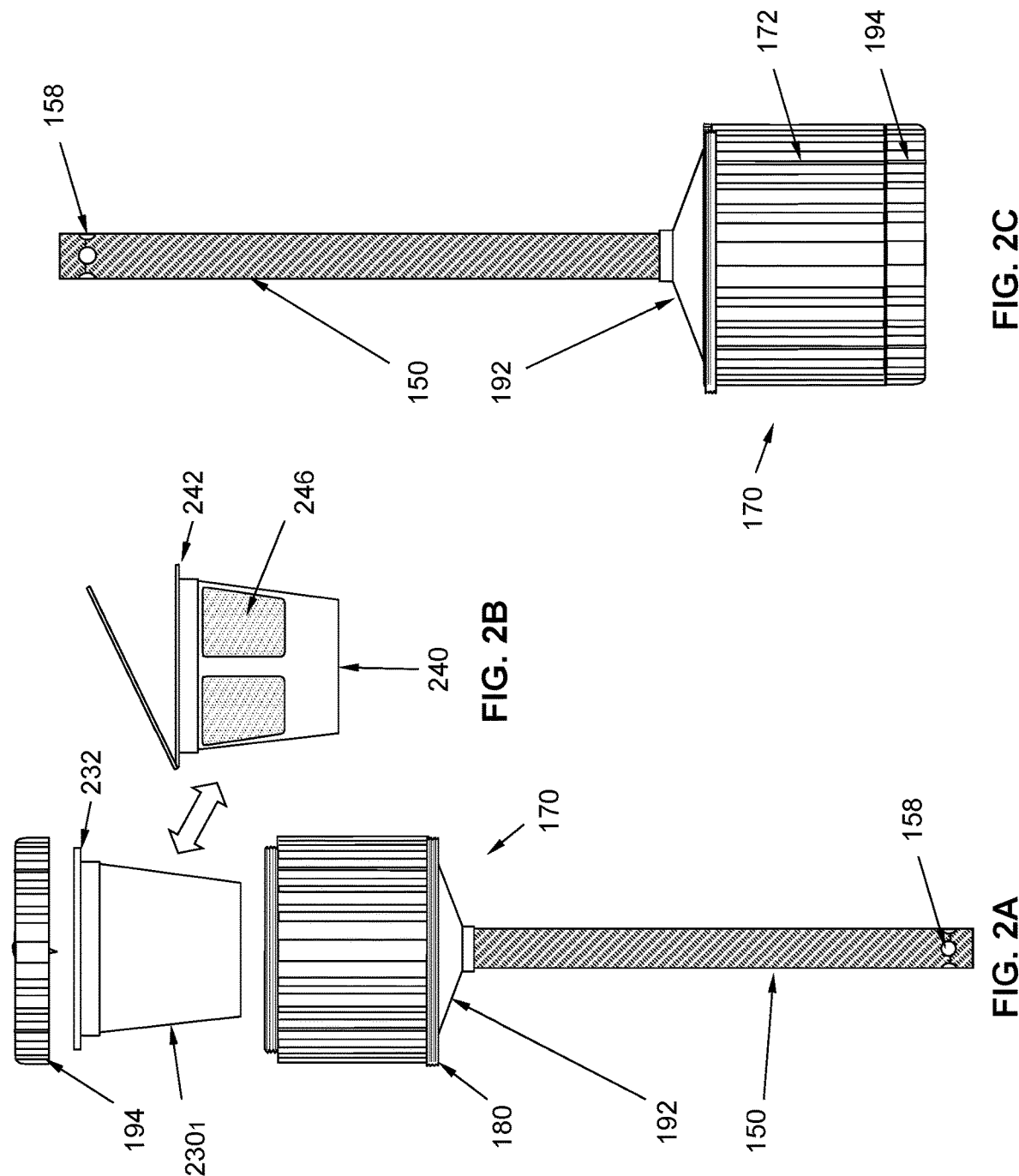

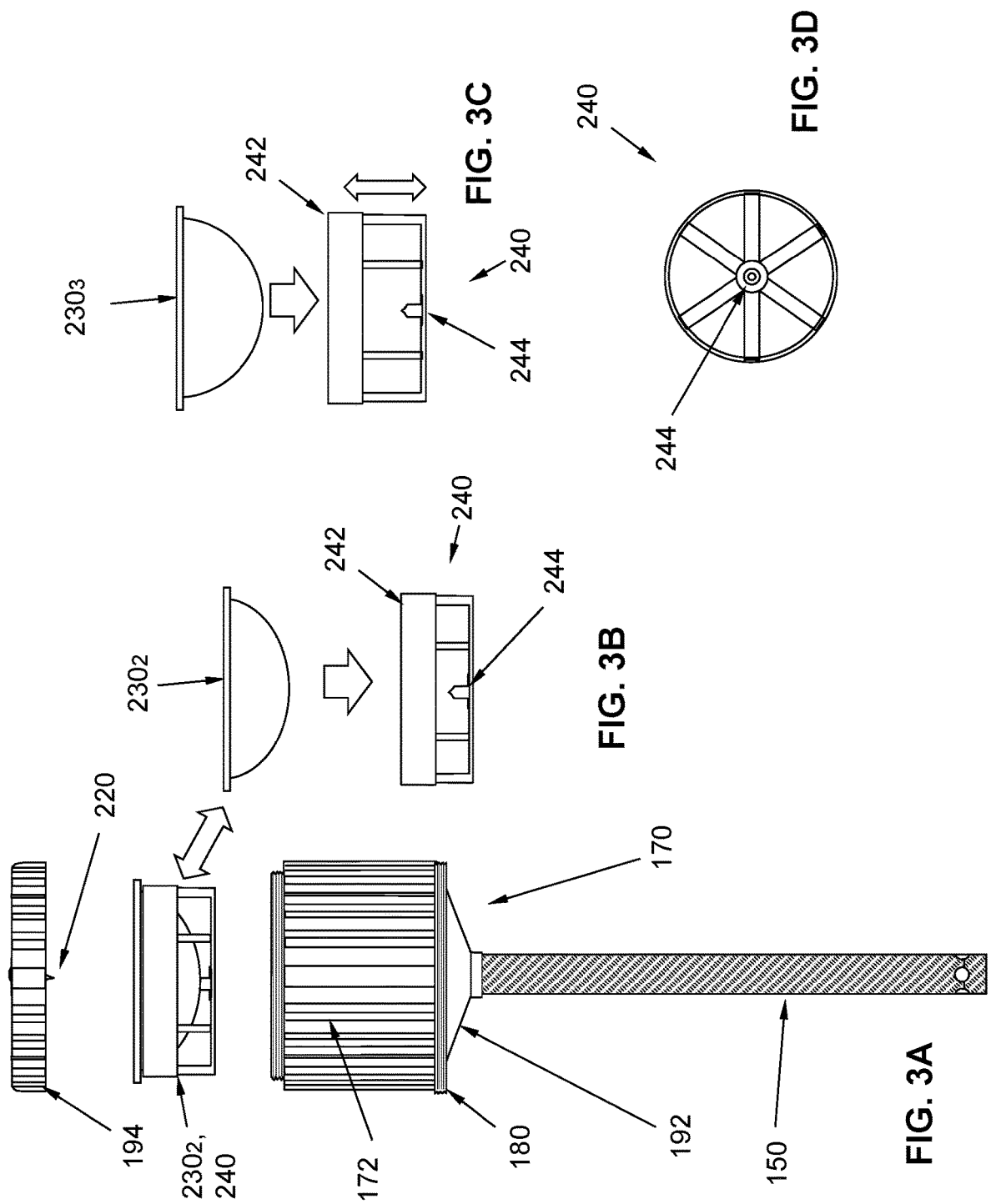

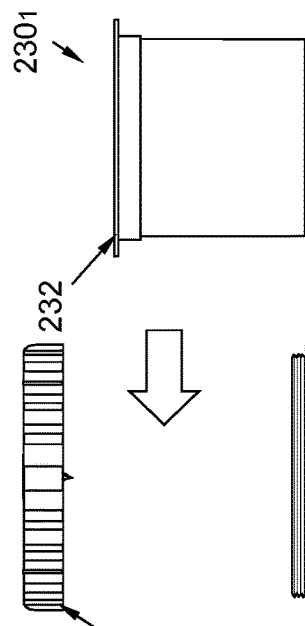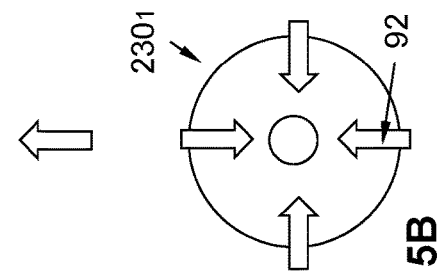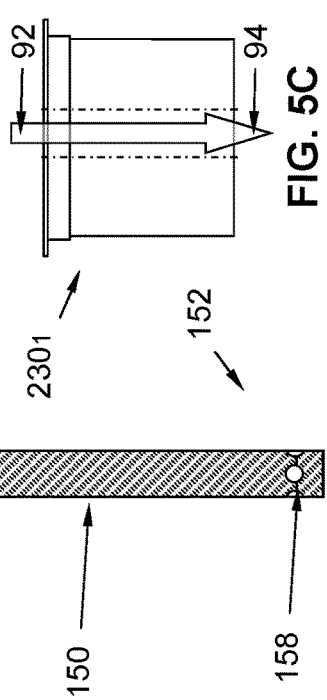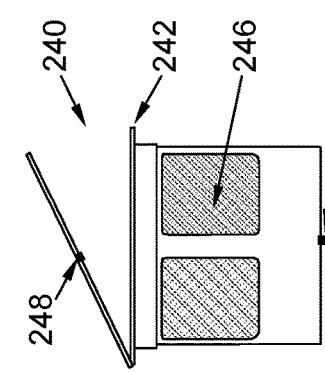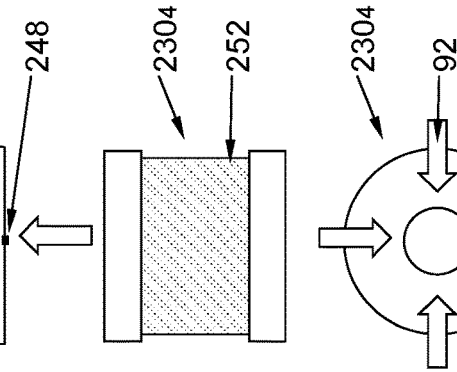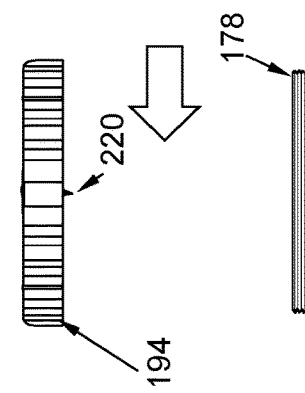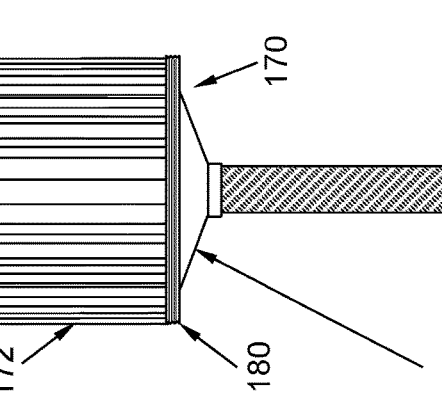

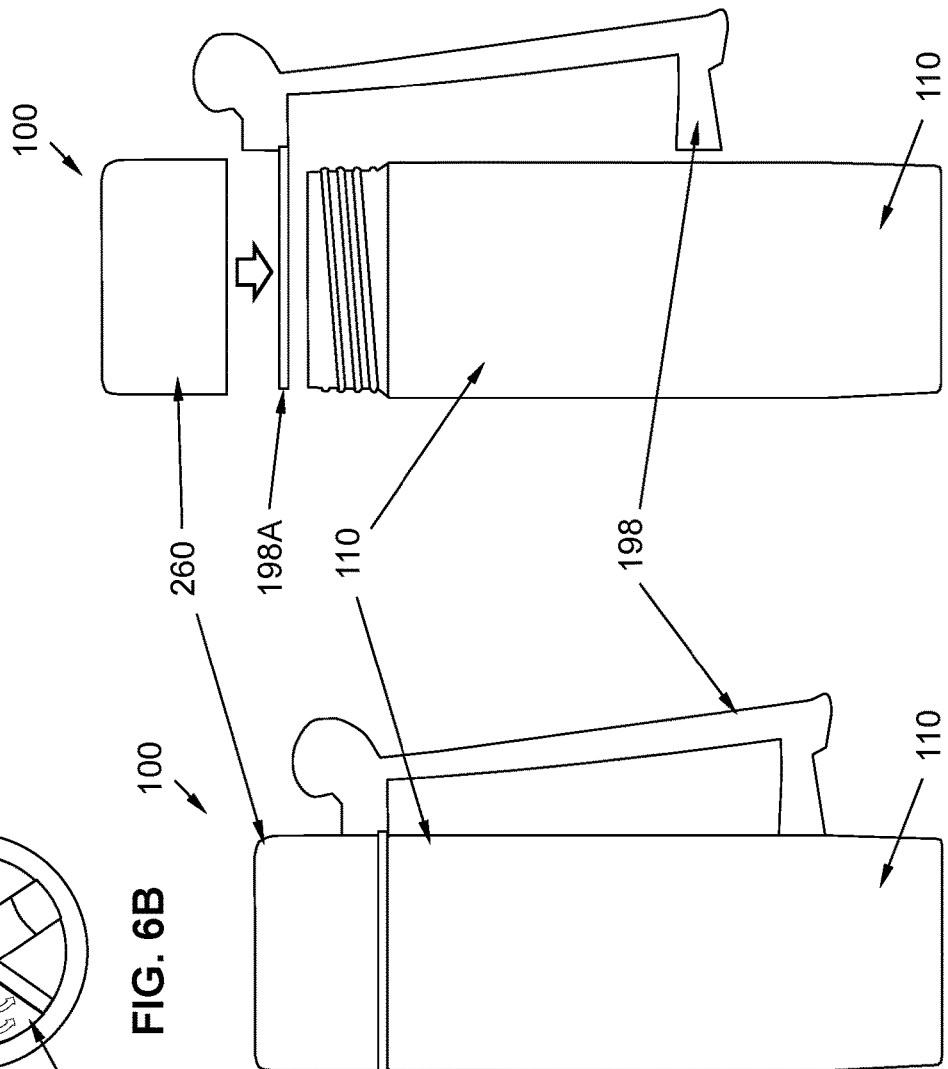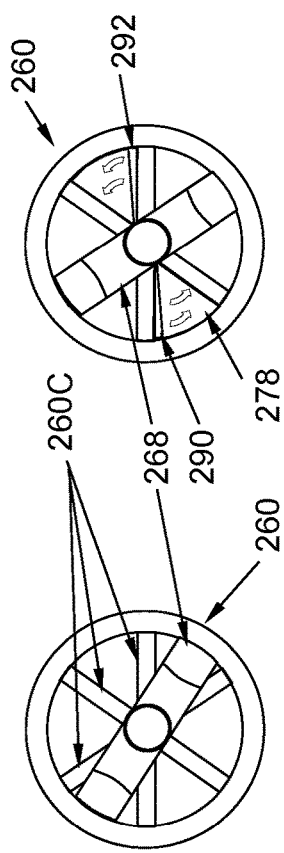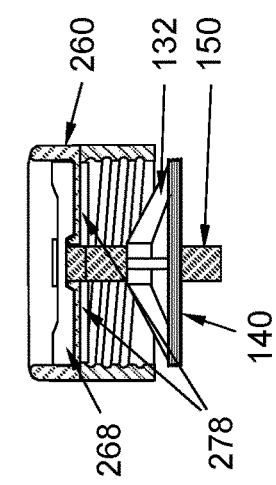

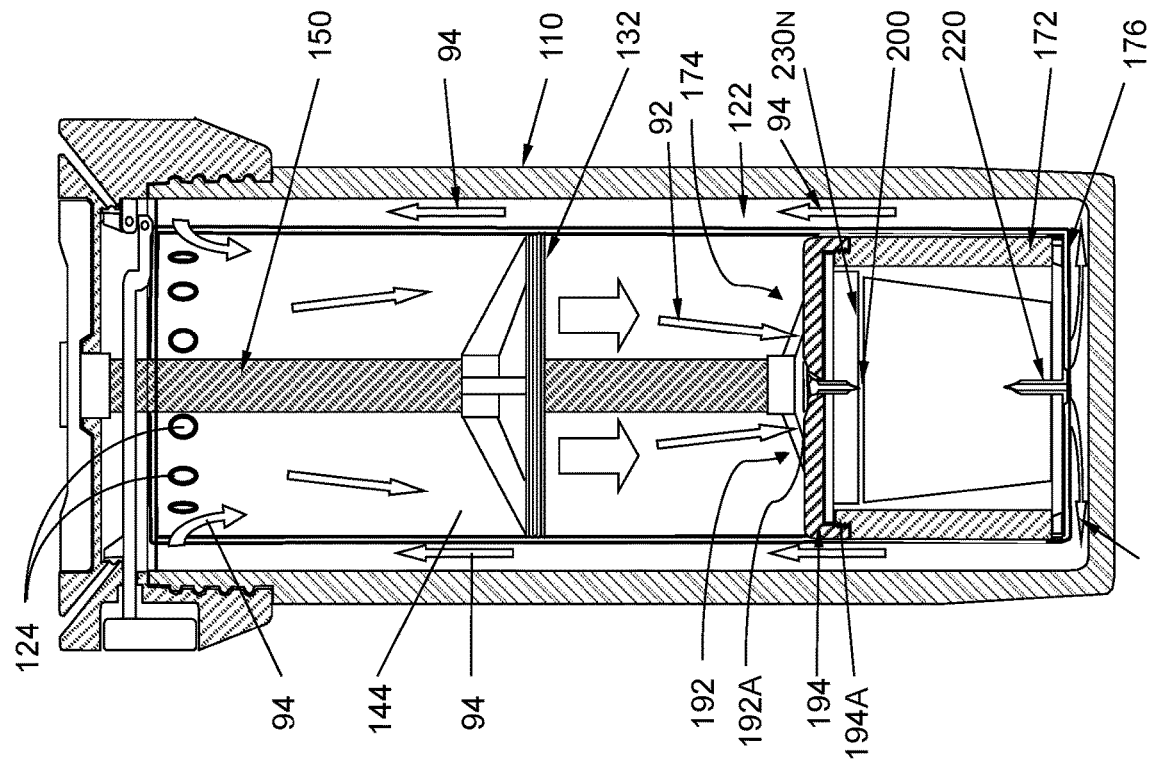
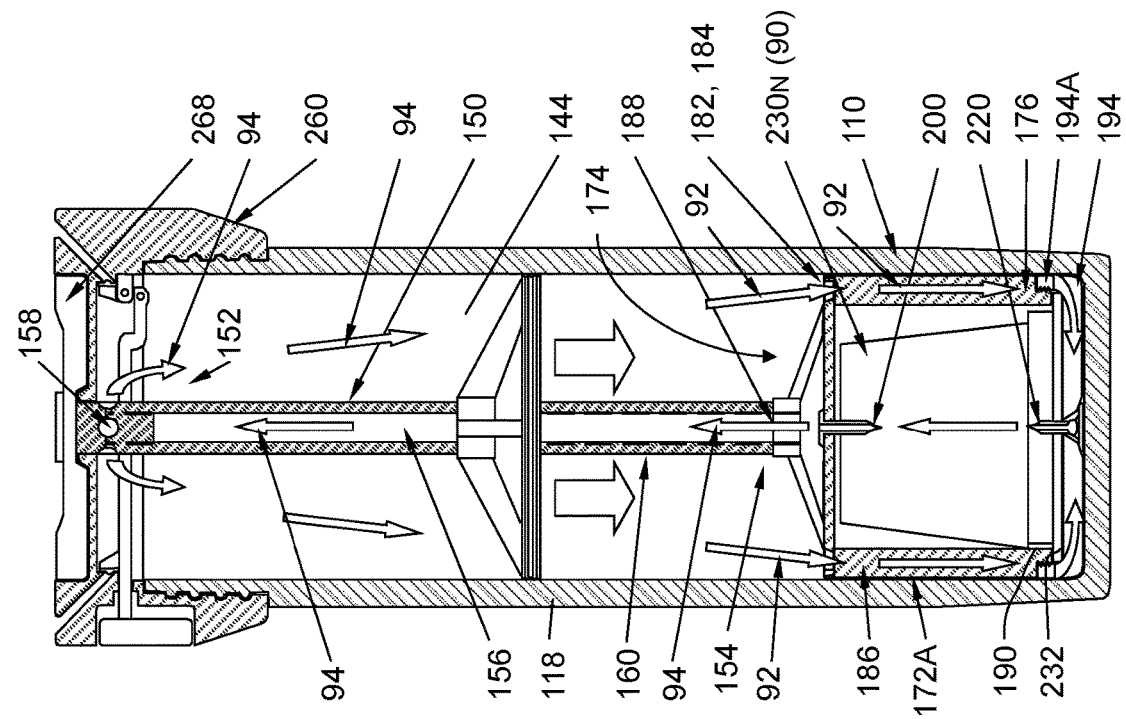
FIG. 8B
FIG. 8A

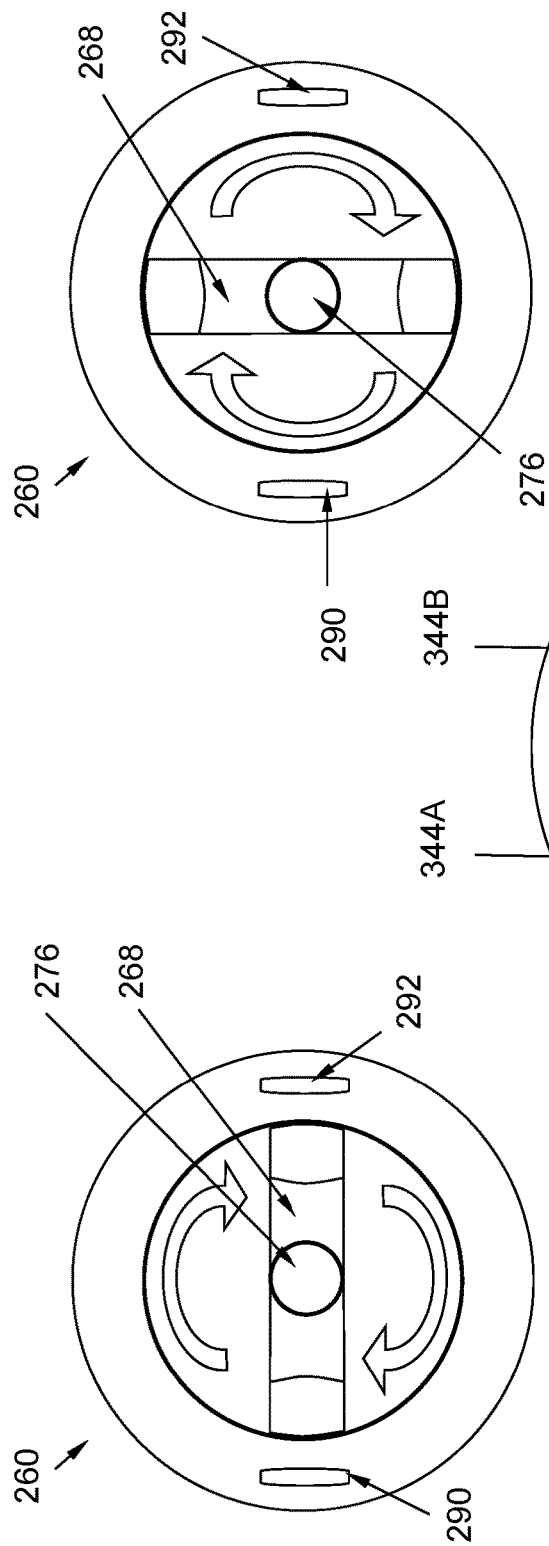
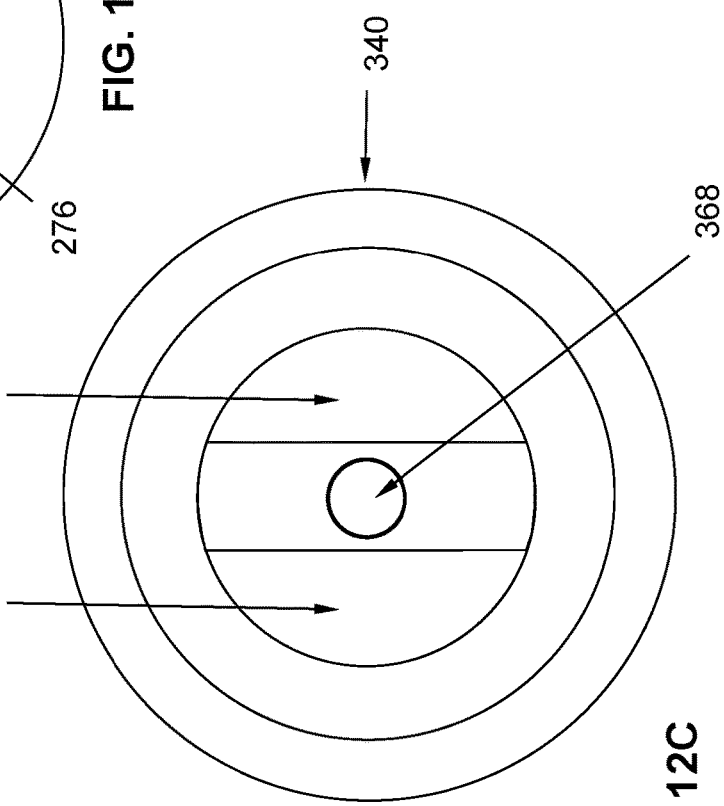
FIG. 11B
FIG. 11A
FIG. 12C

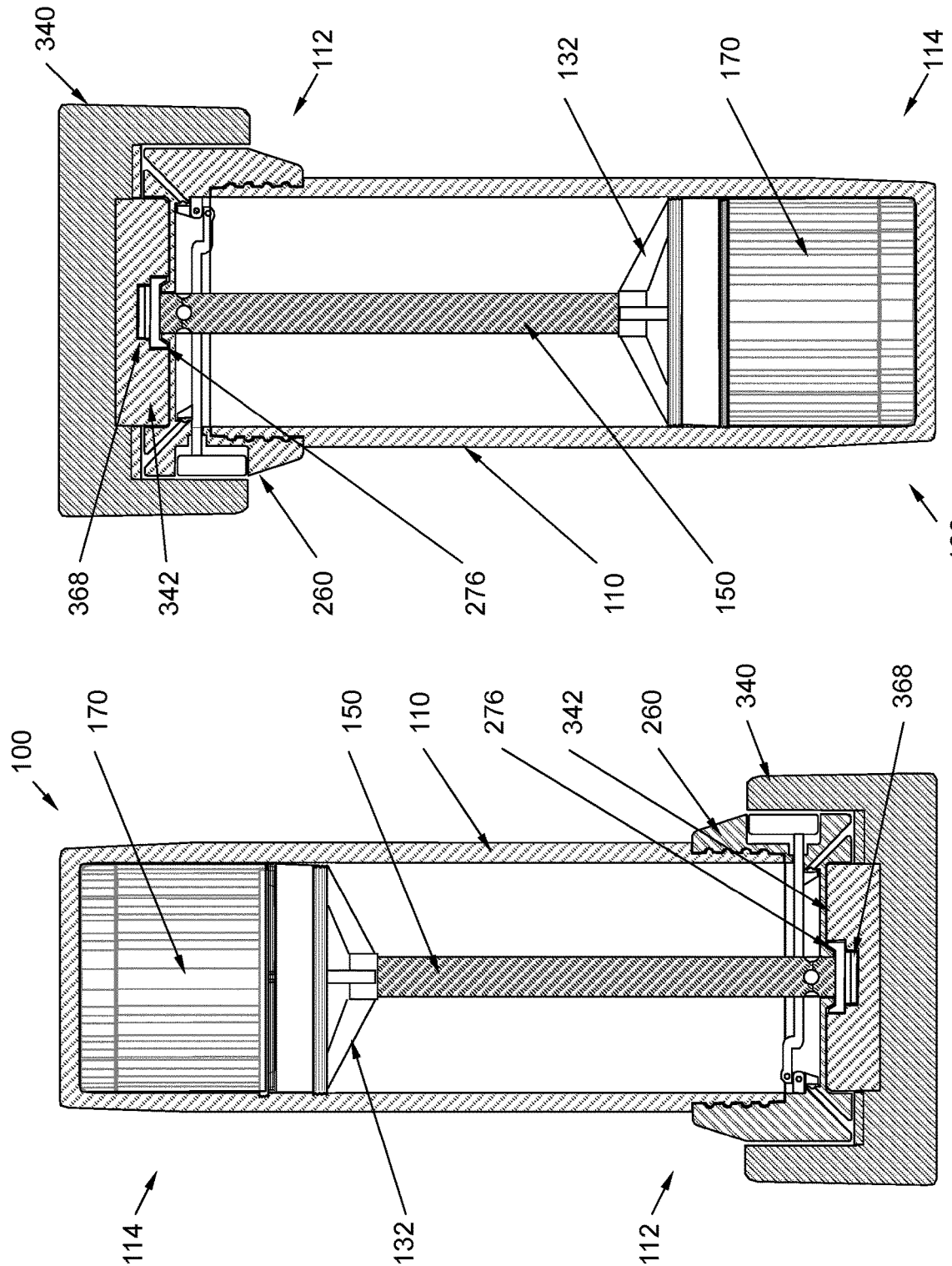

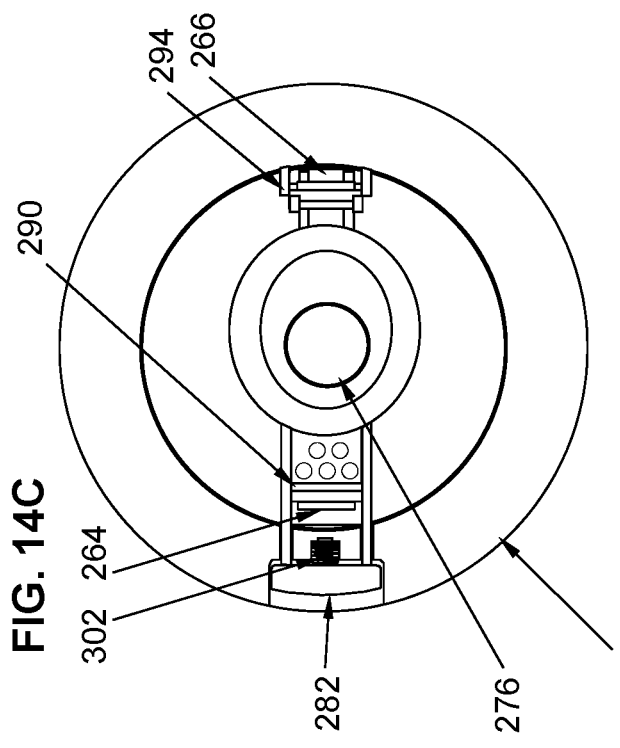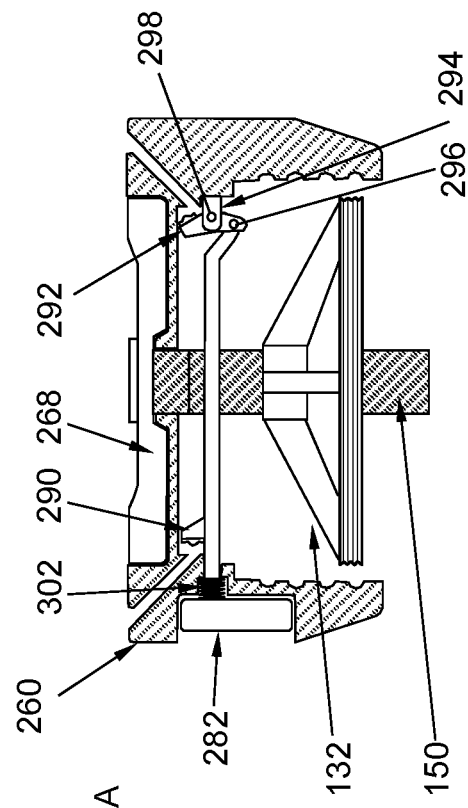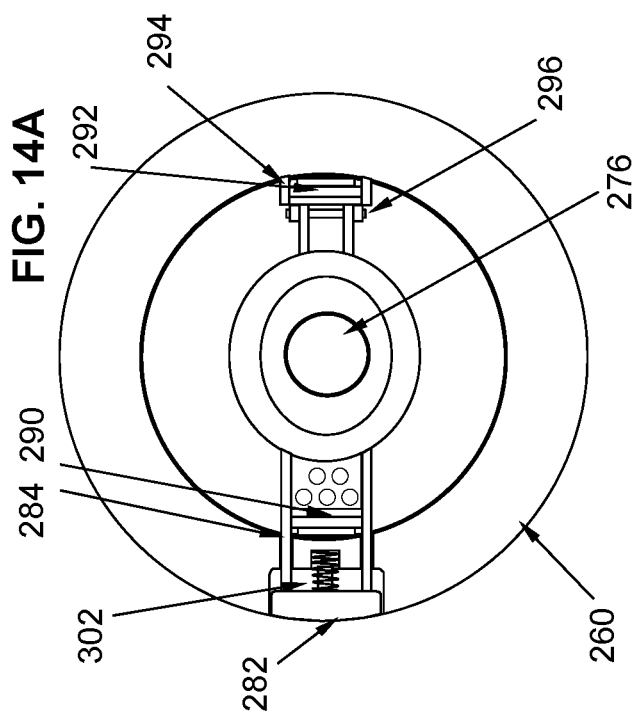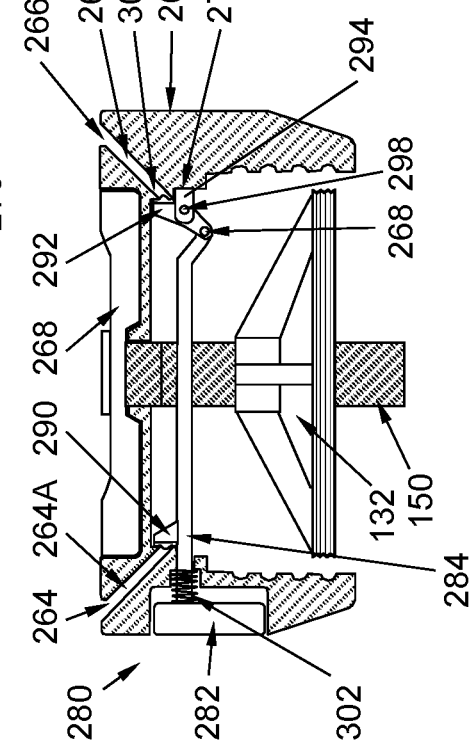

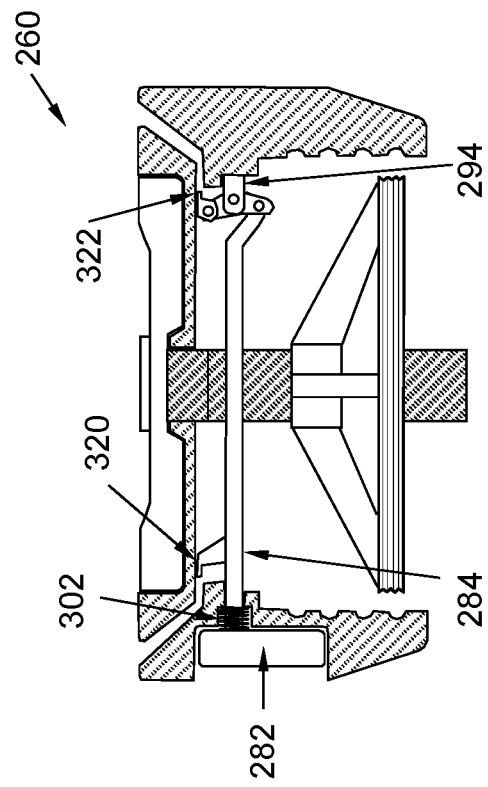
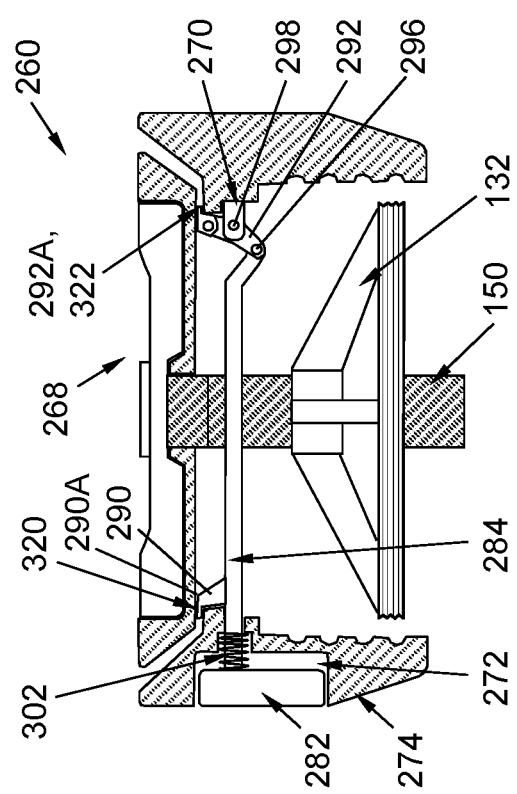

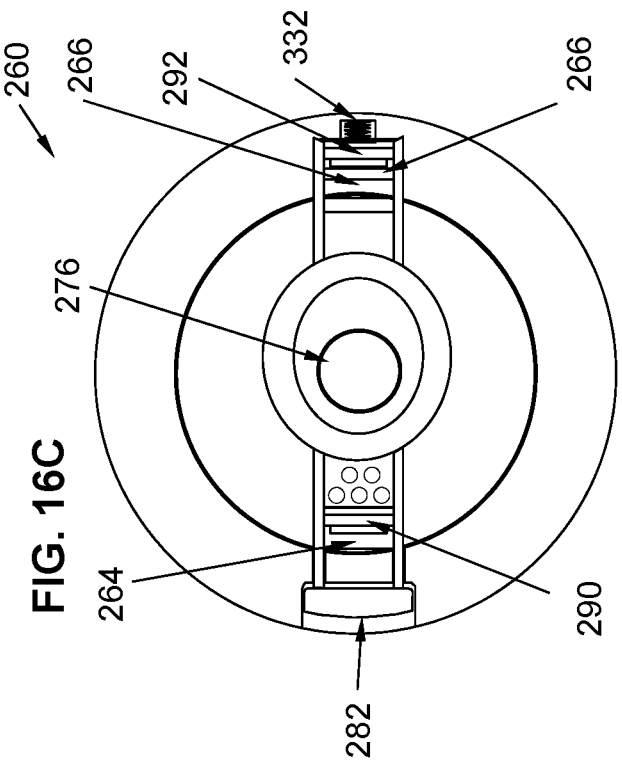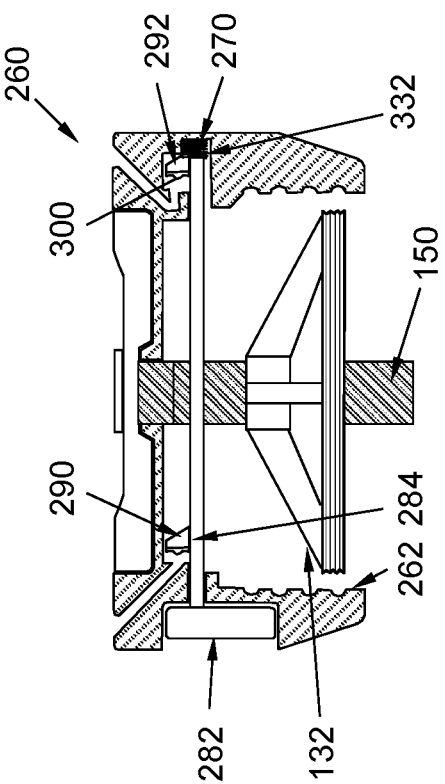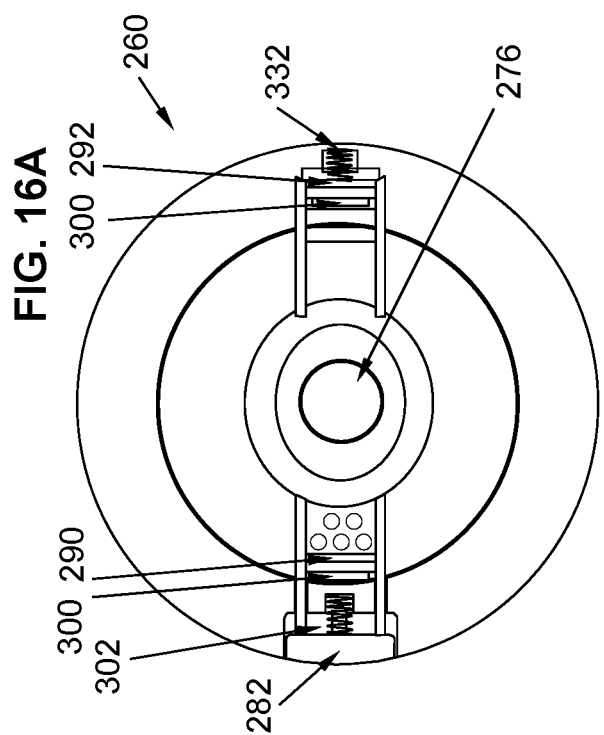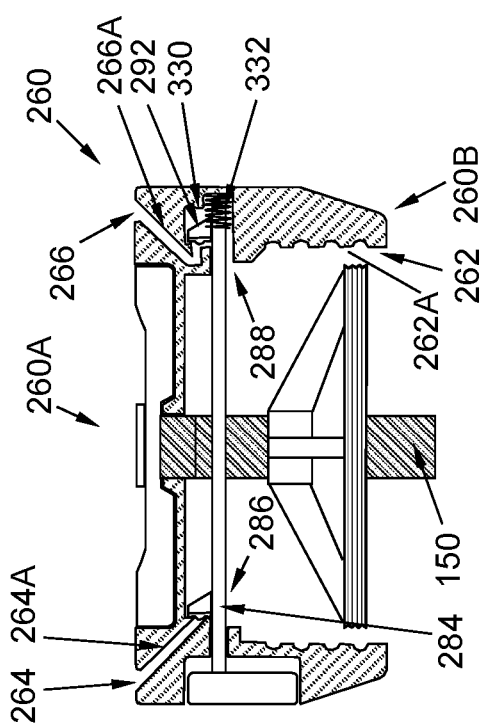

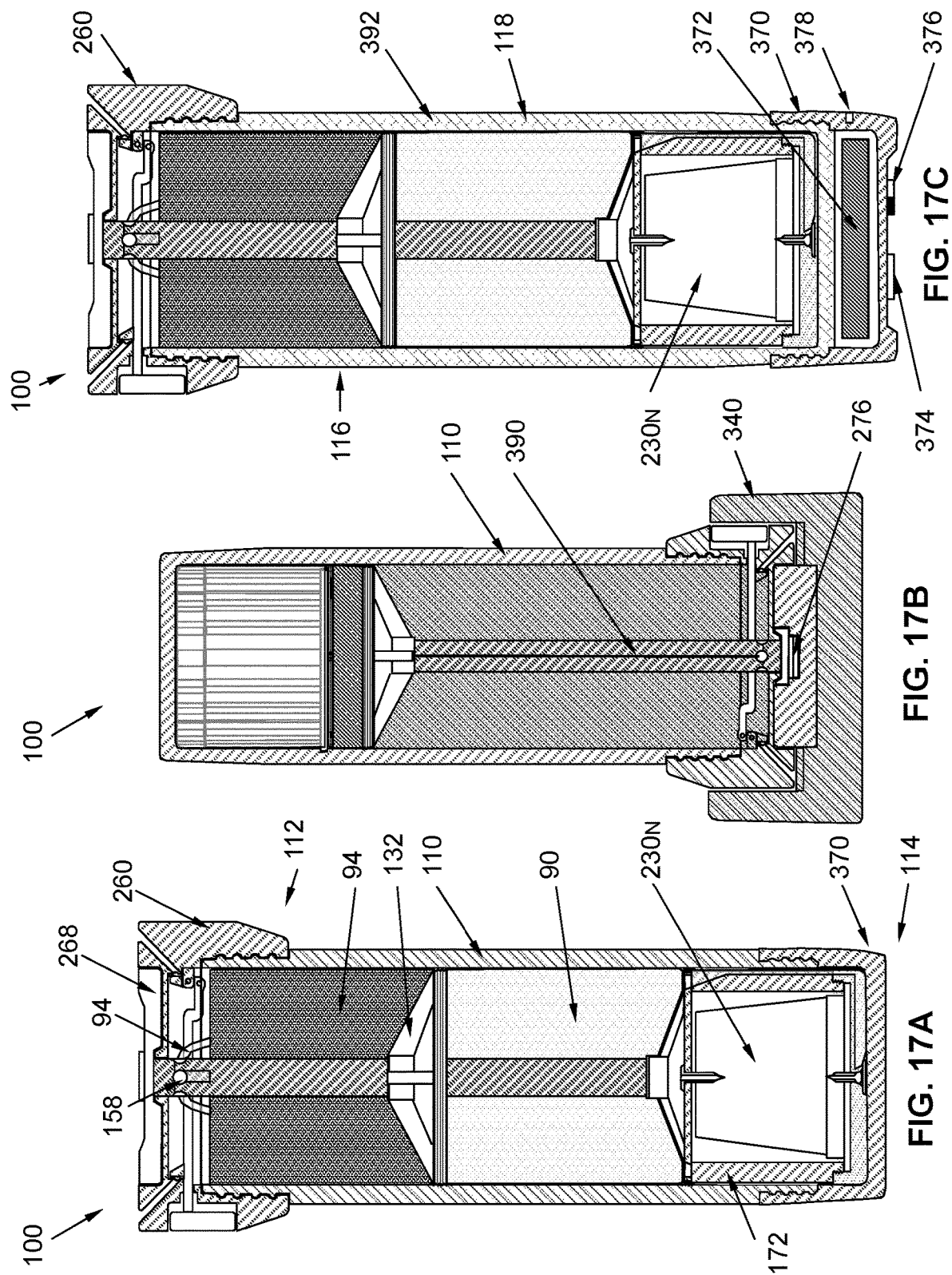

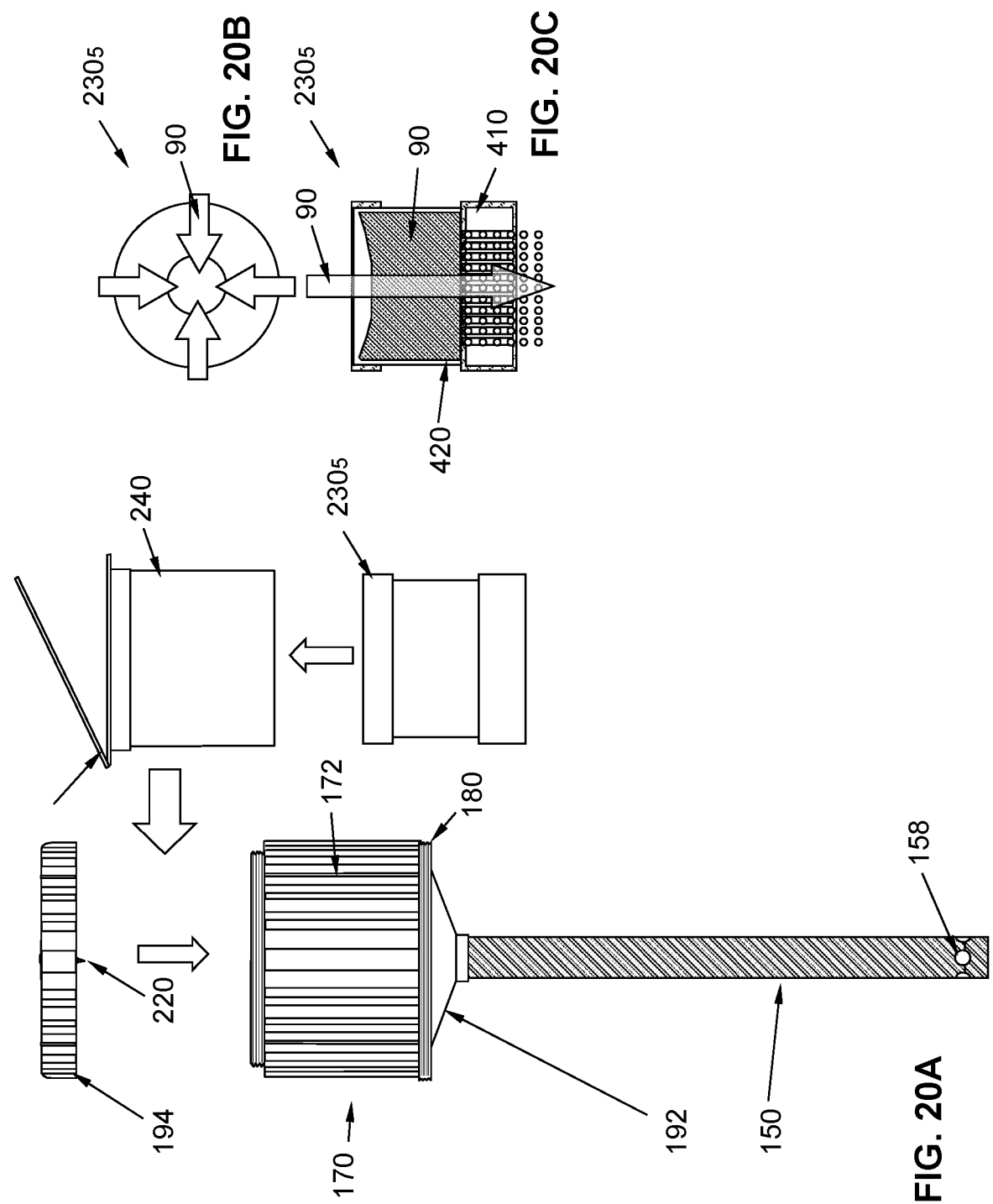

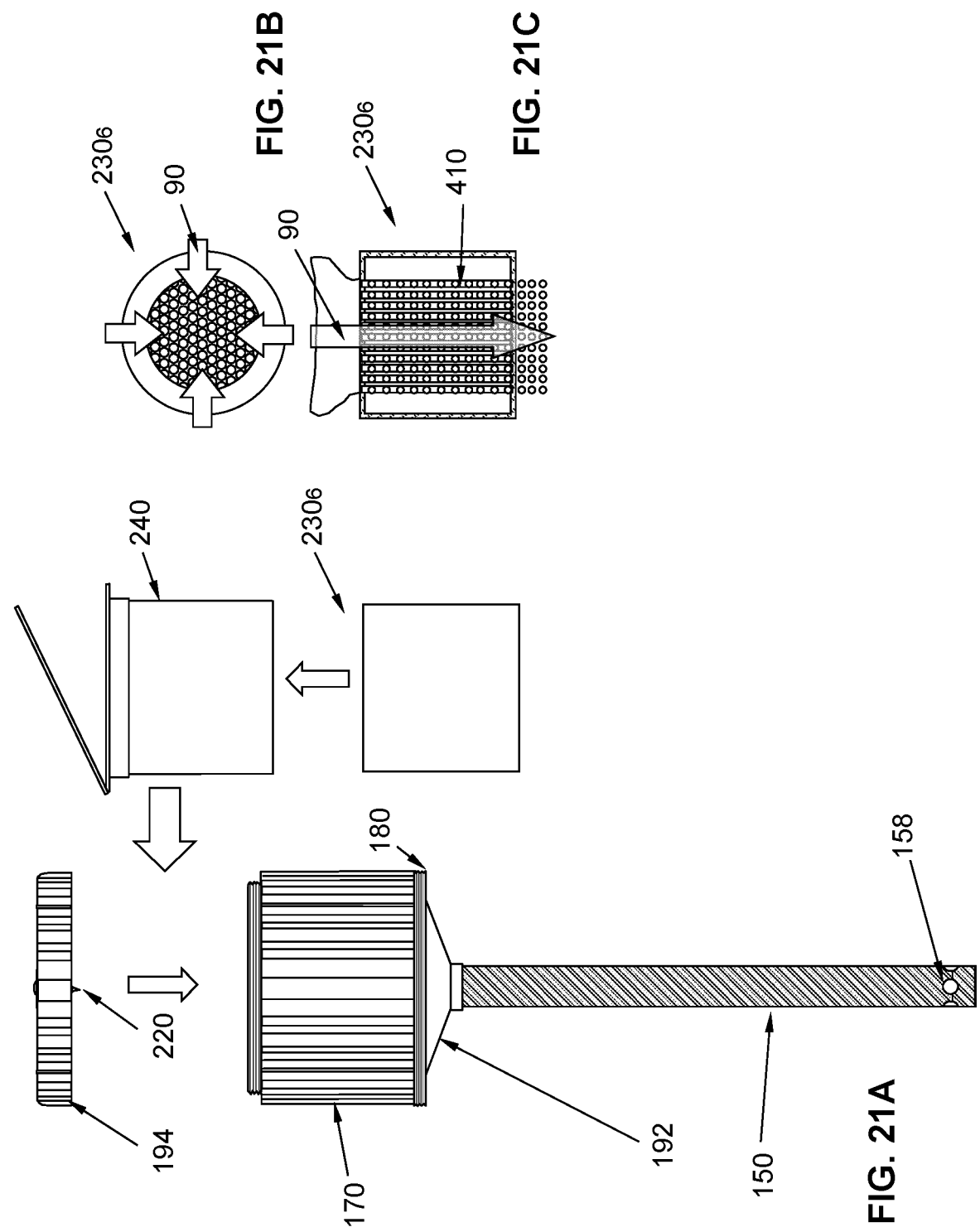

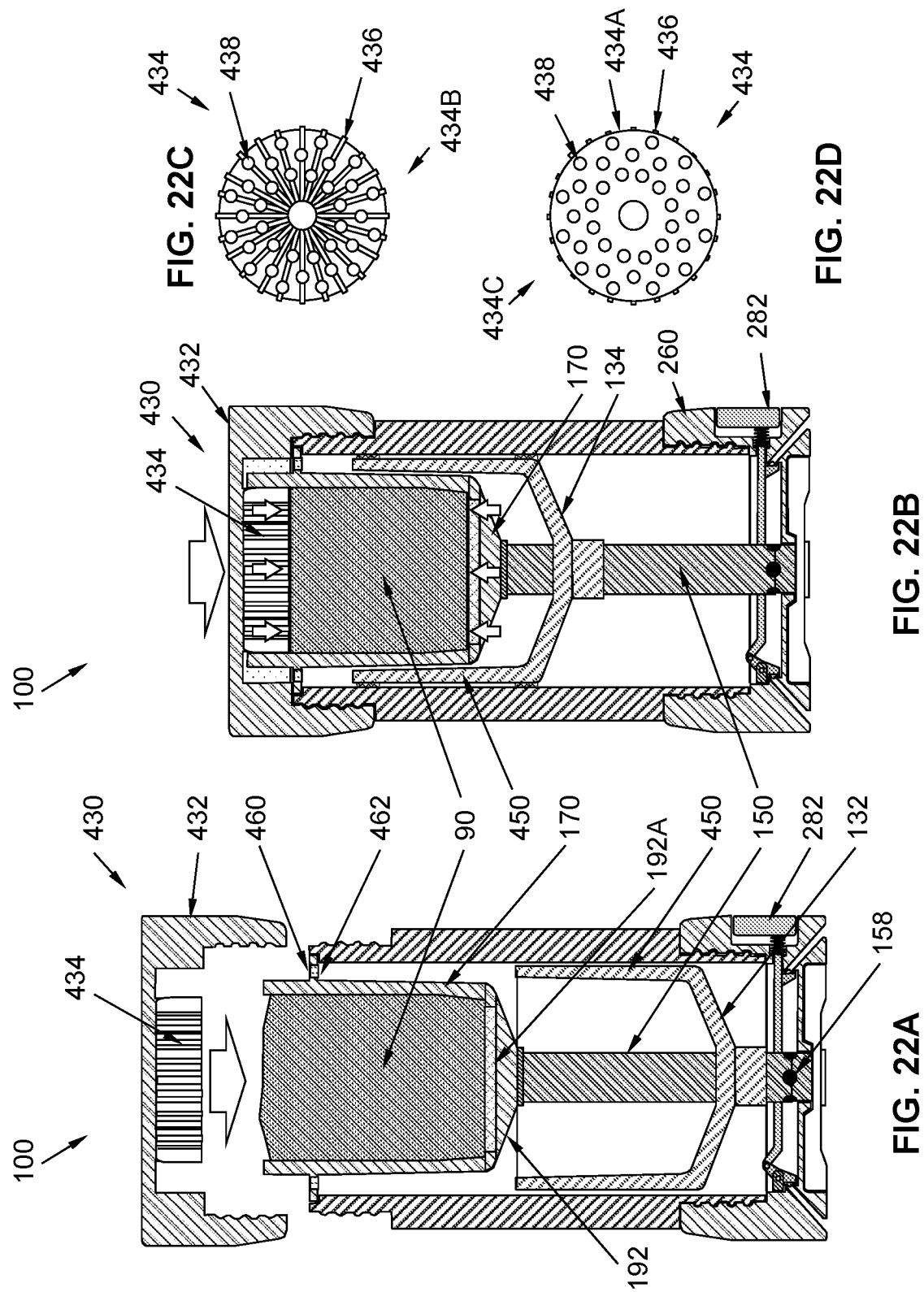

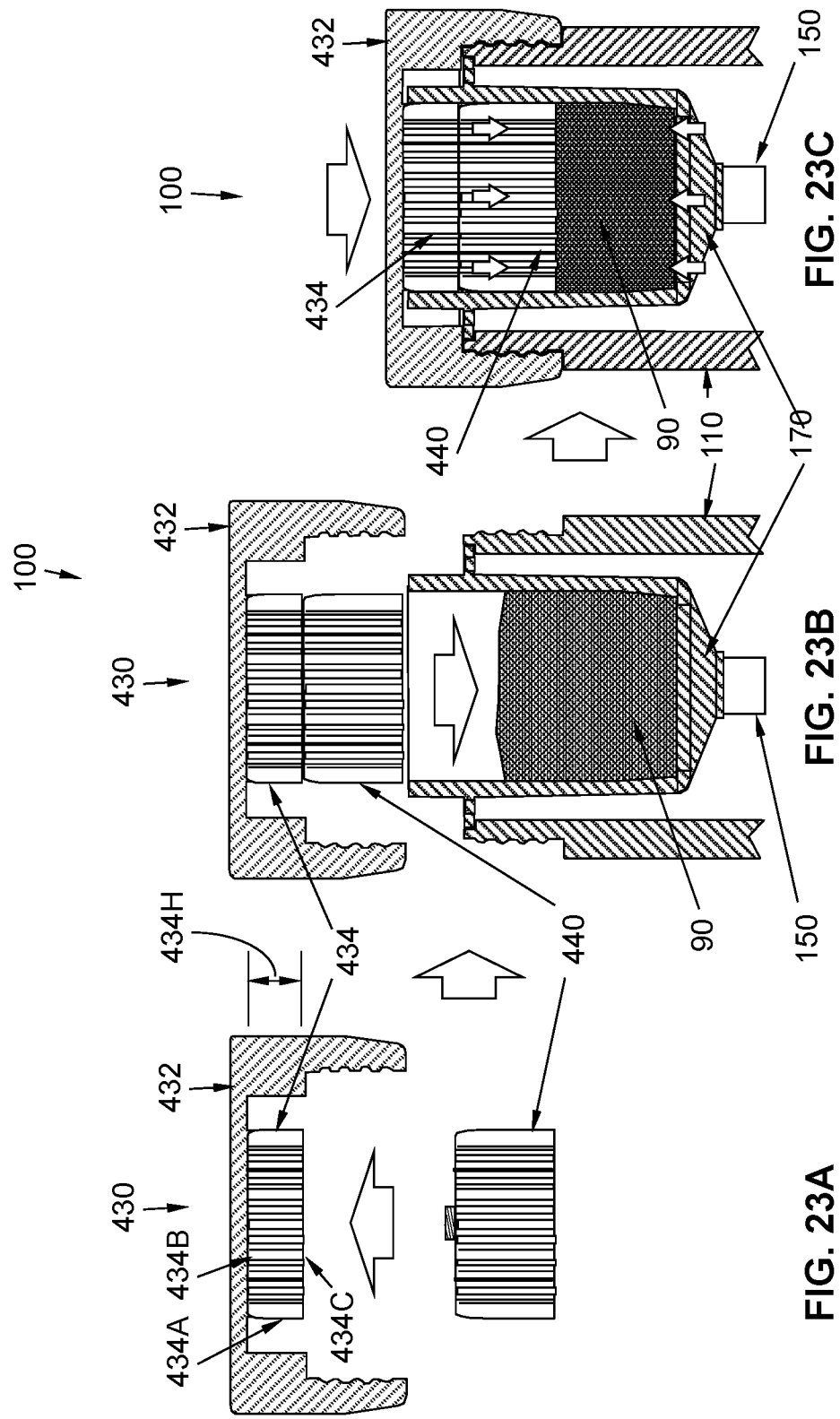

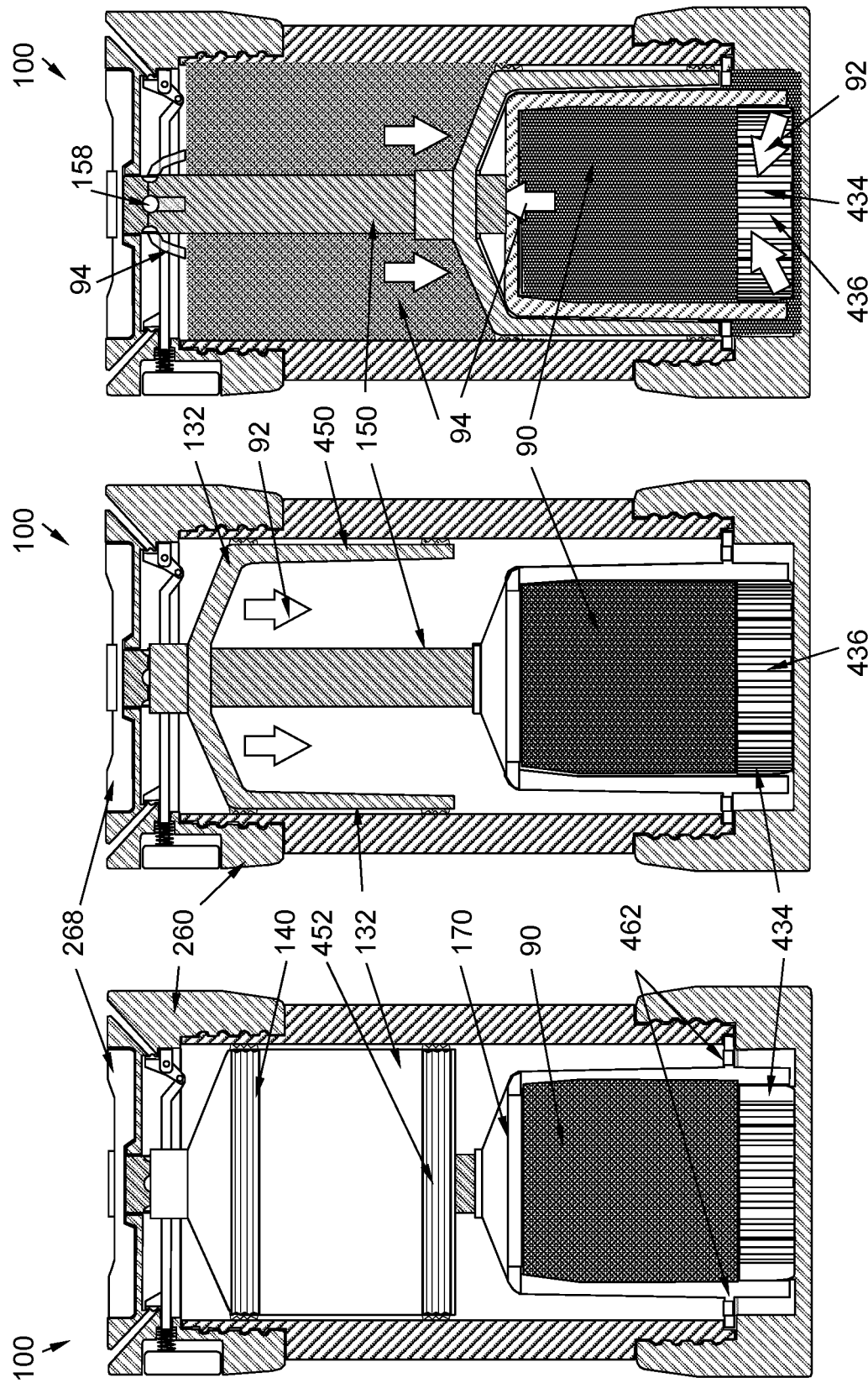

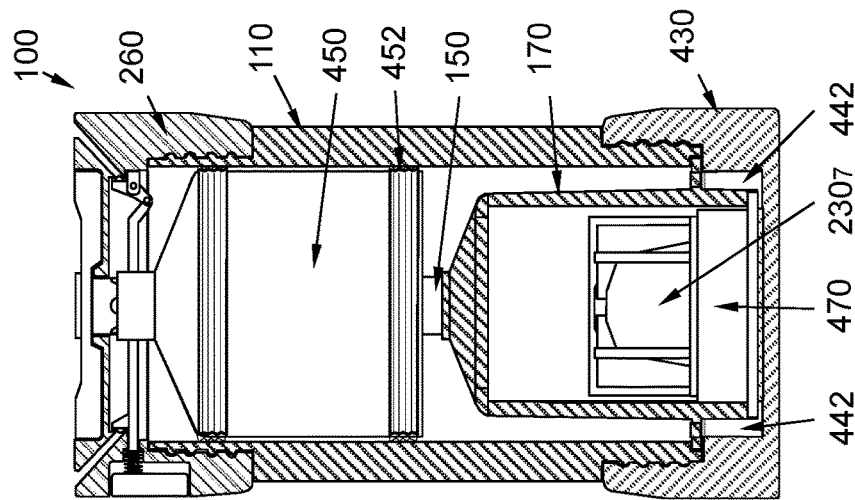
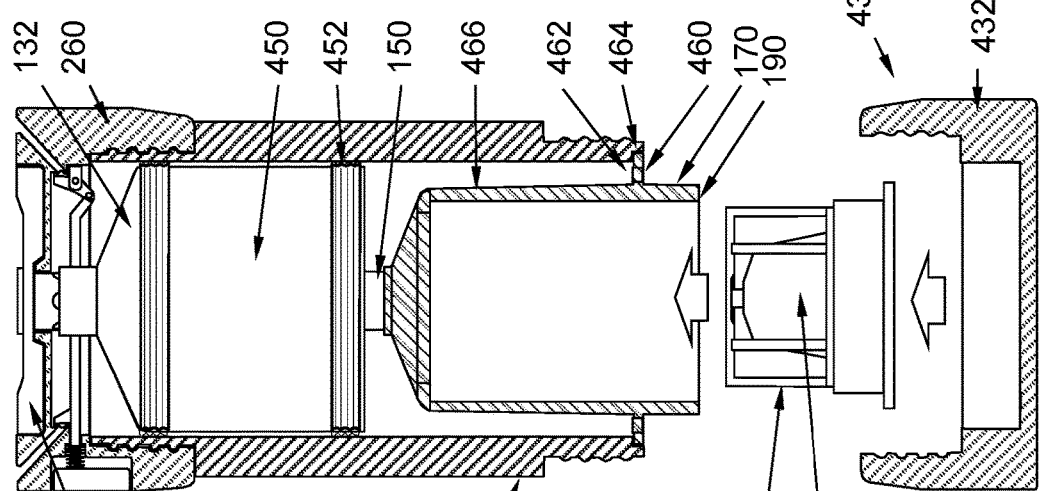
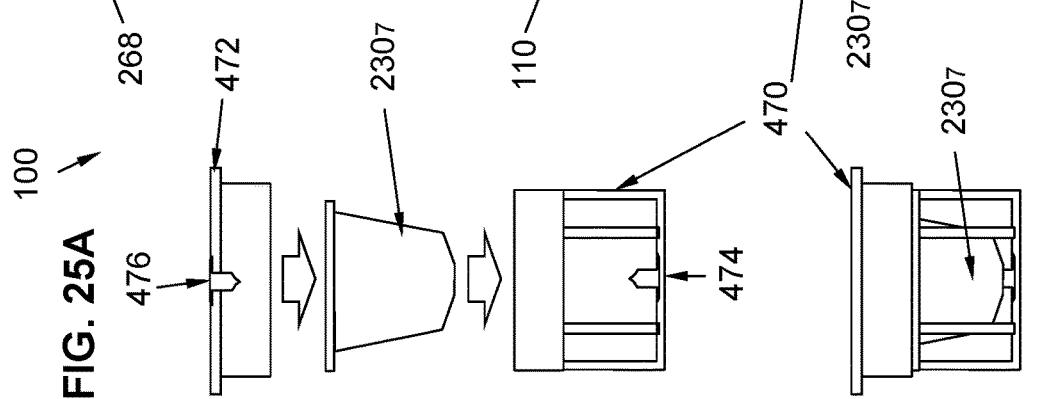
FIG. 25A
FIG. 25B
FIG. 25C
FIG. 25D

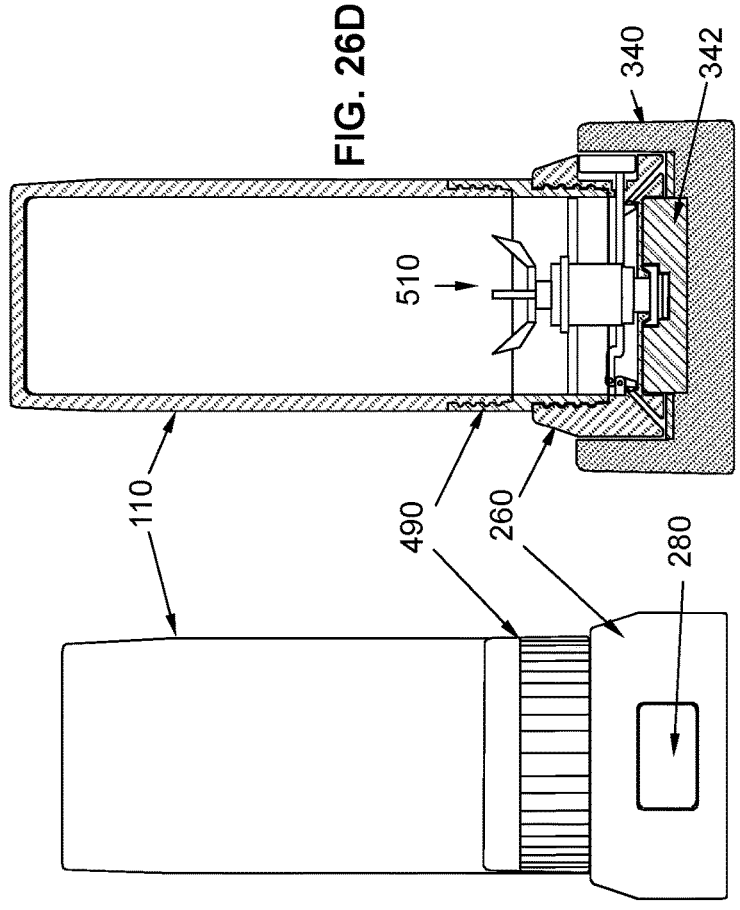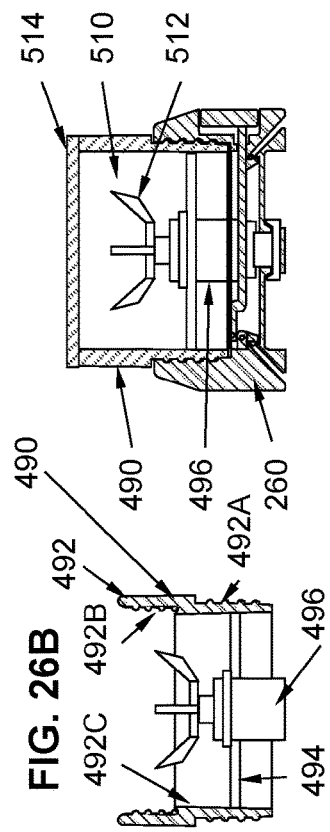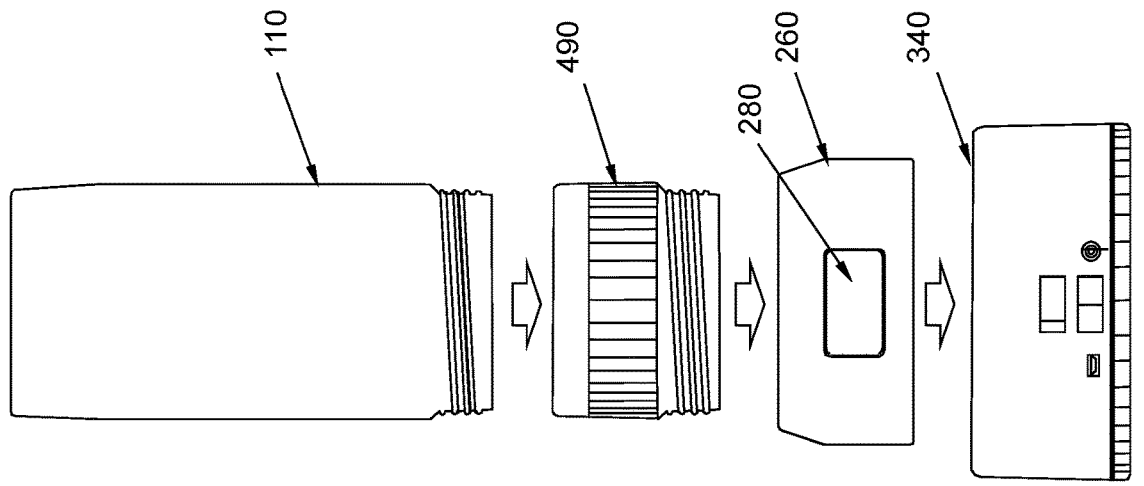

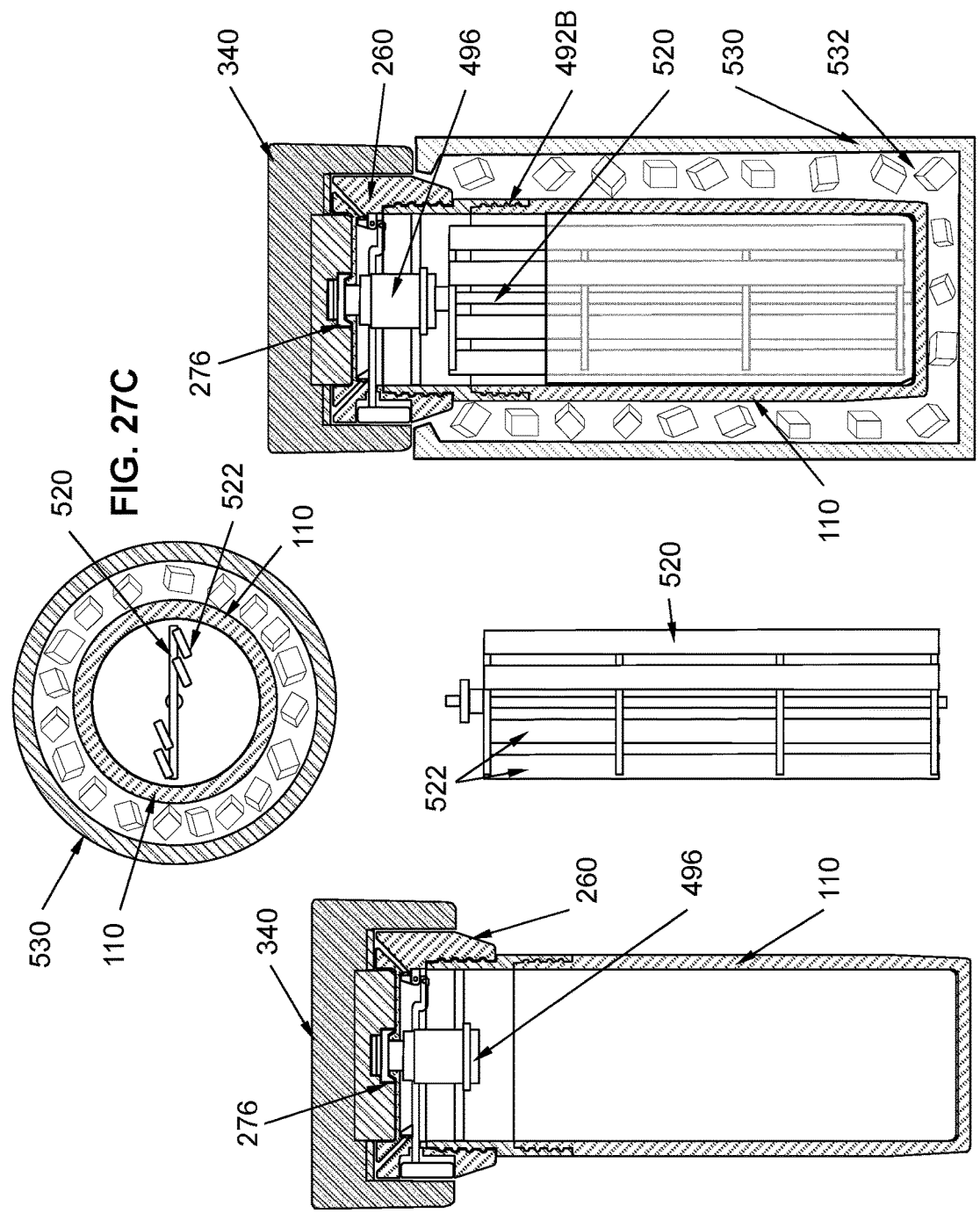

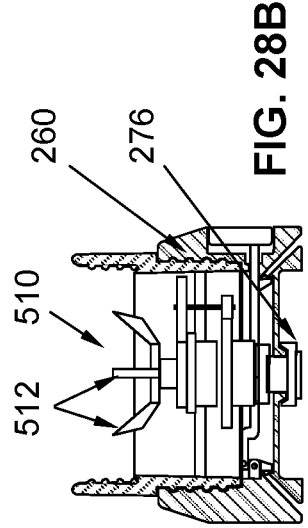
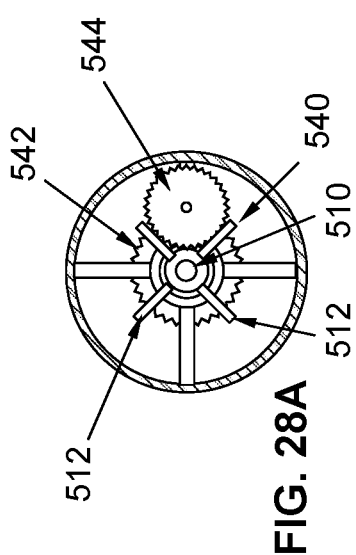
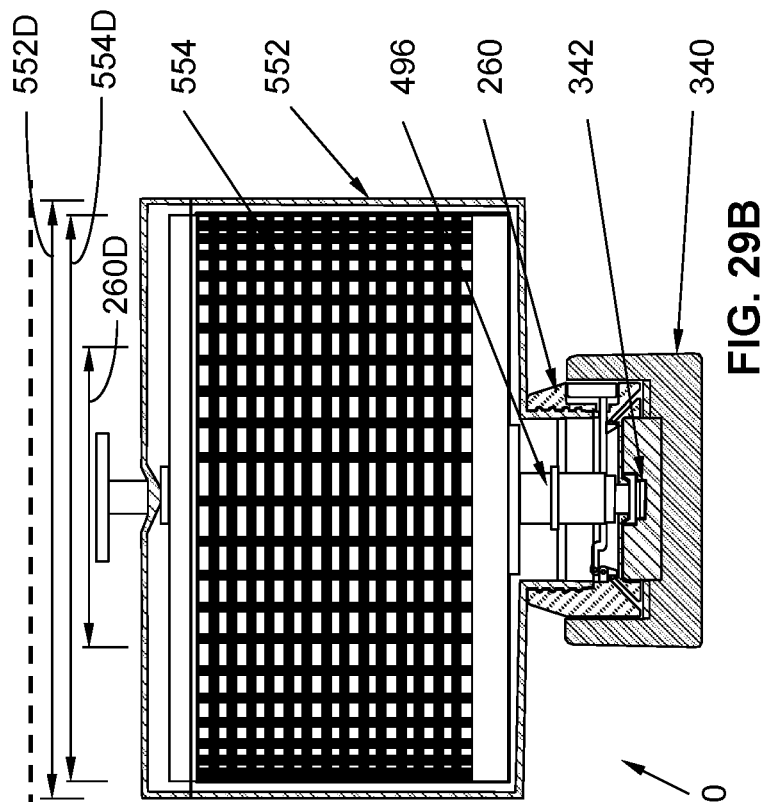
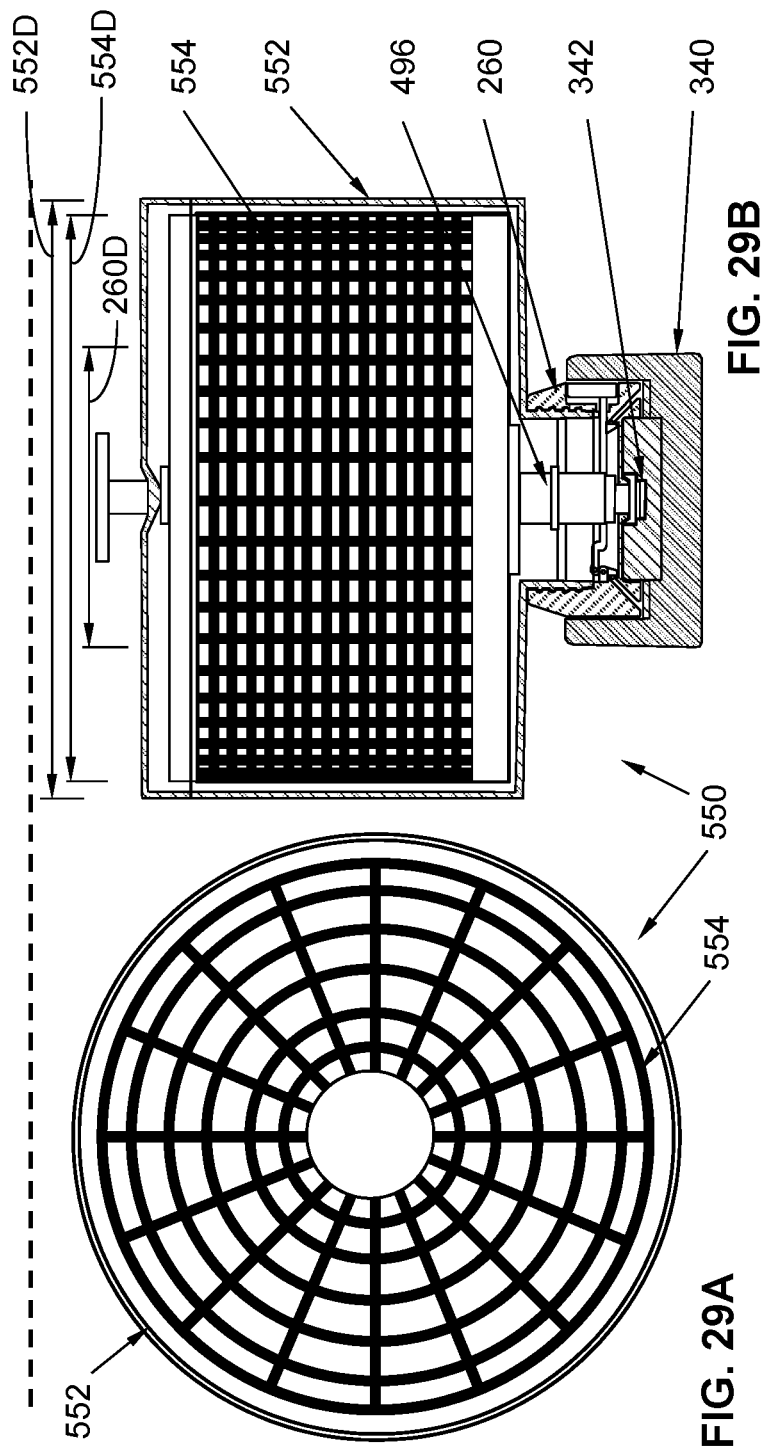

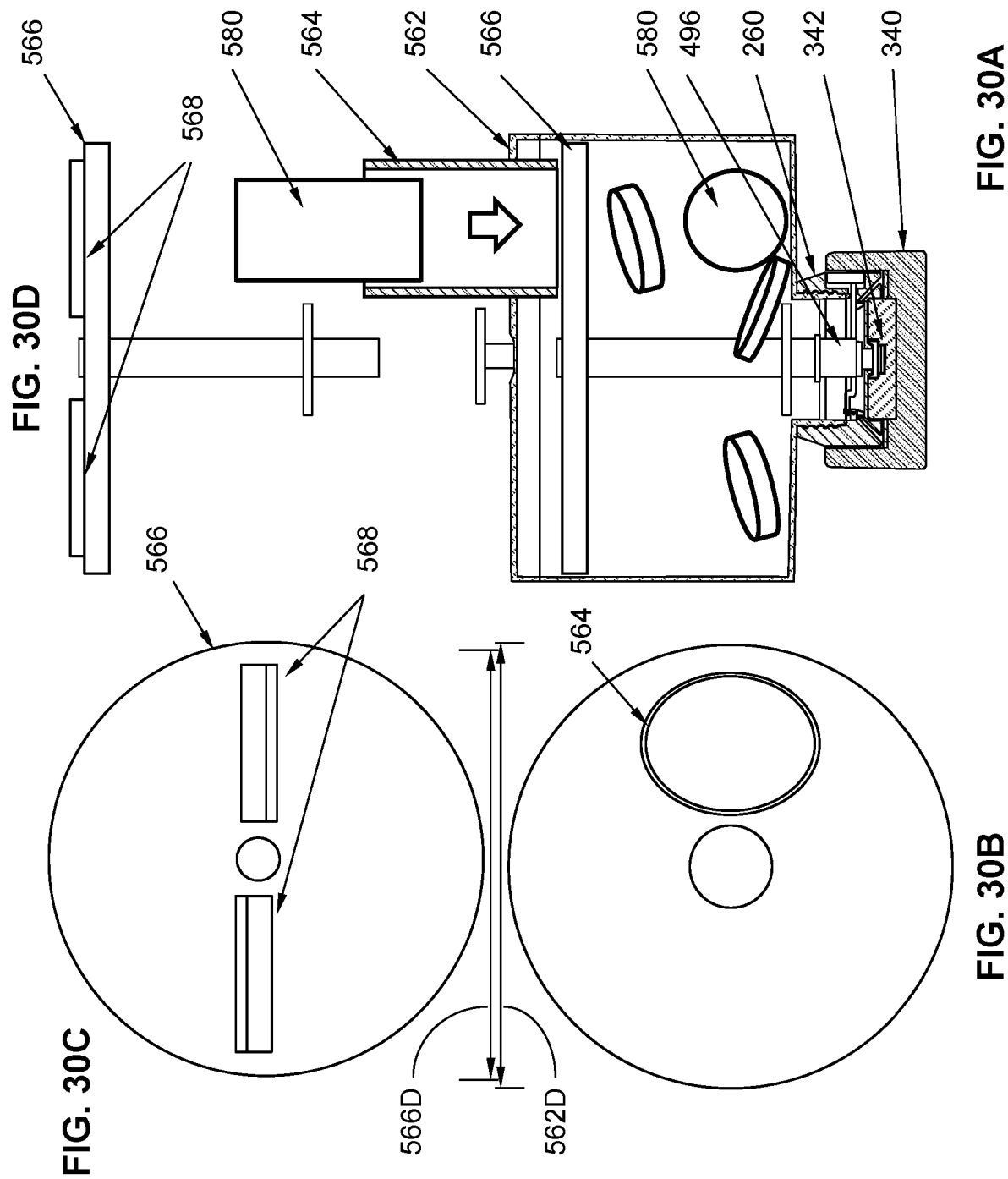

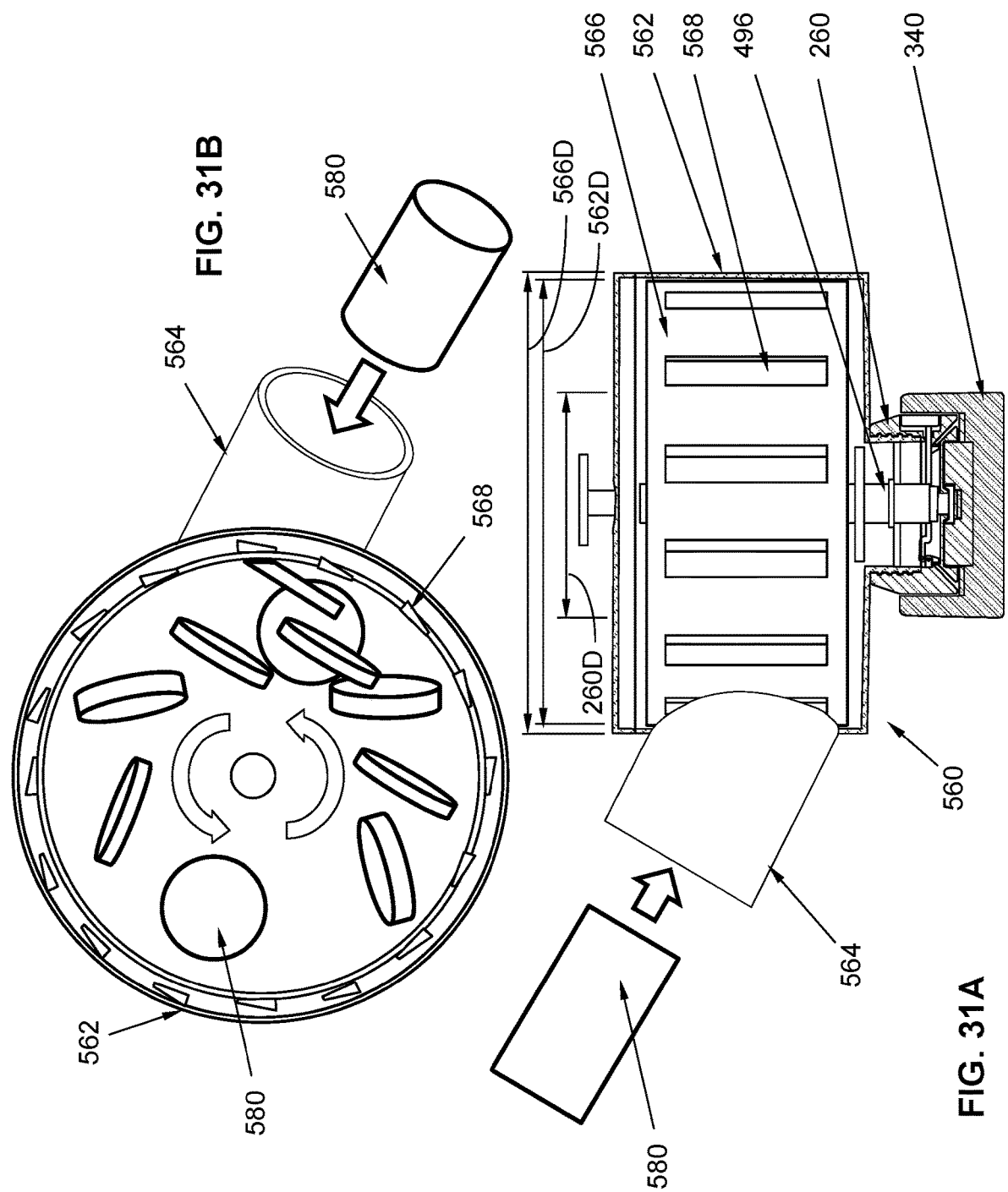

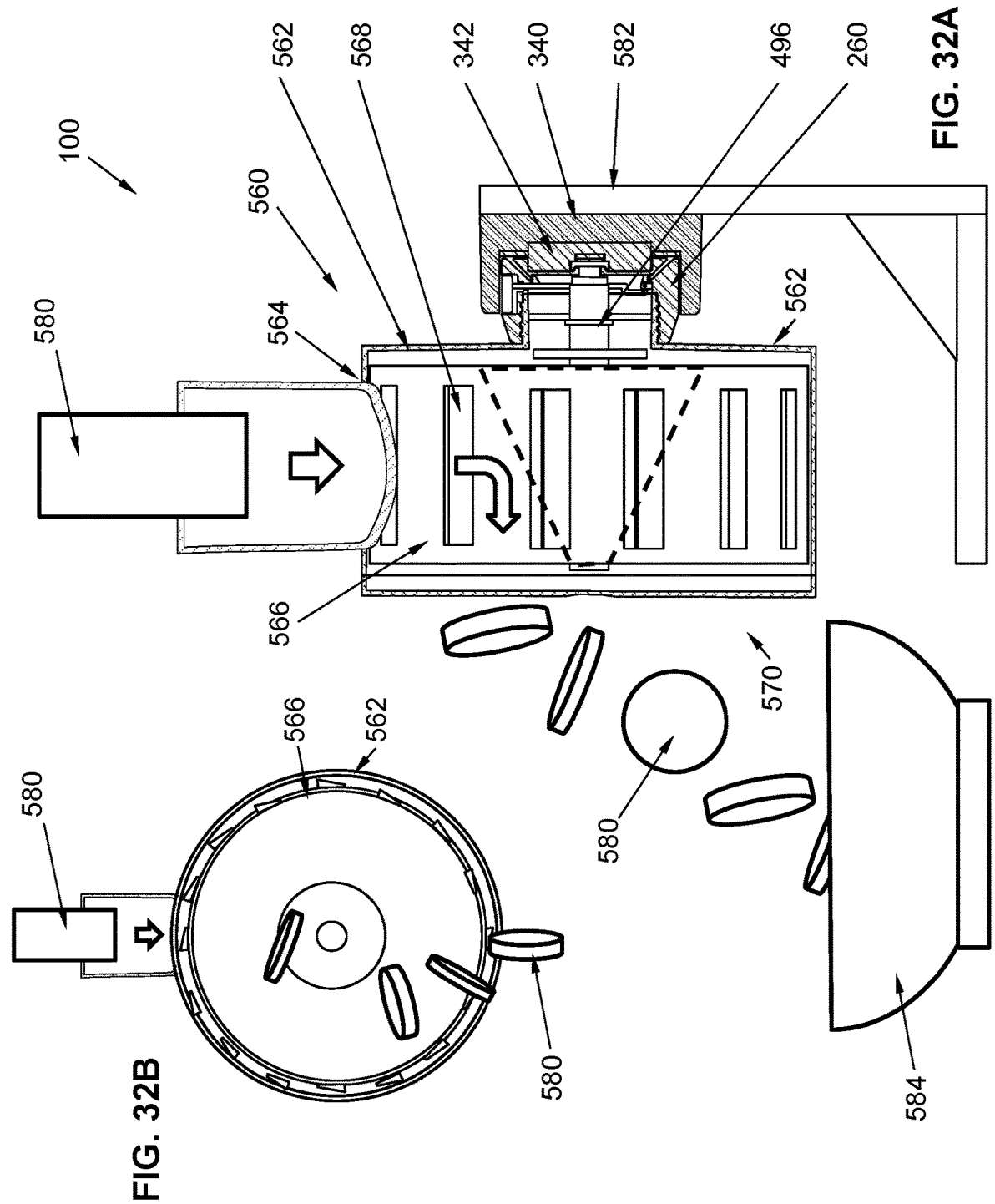

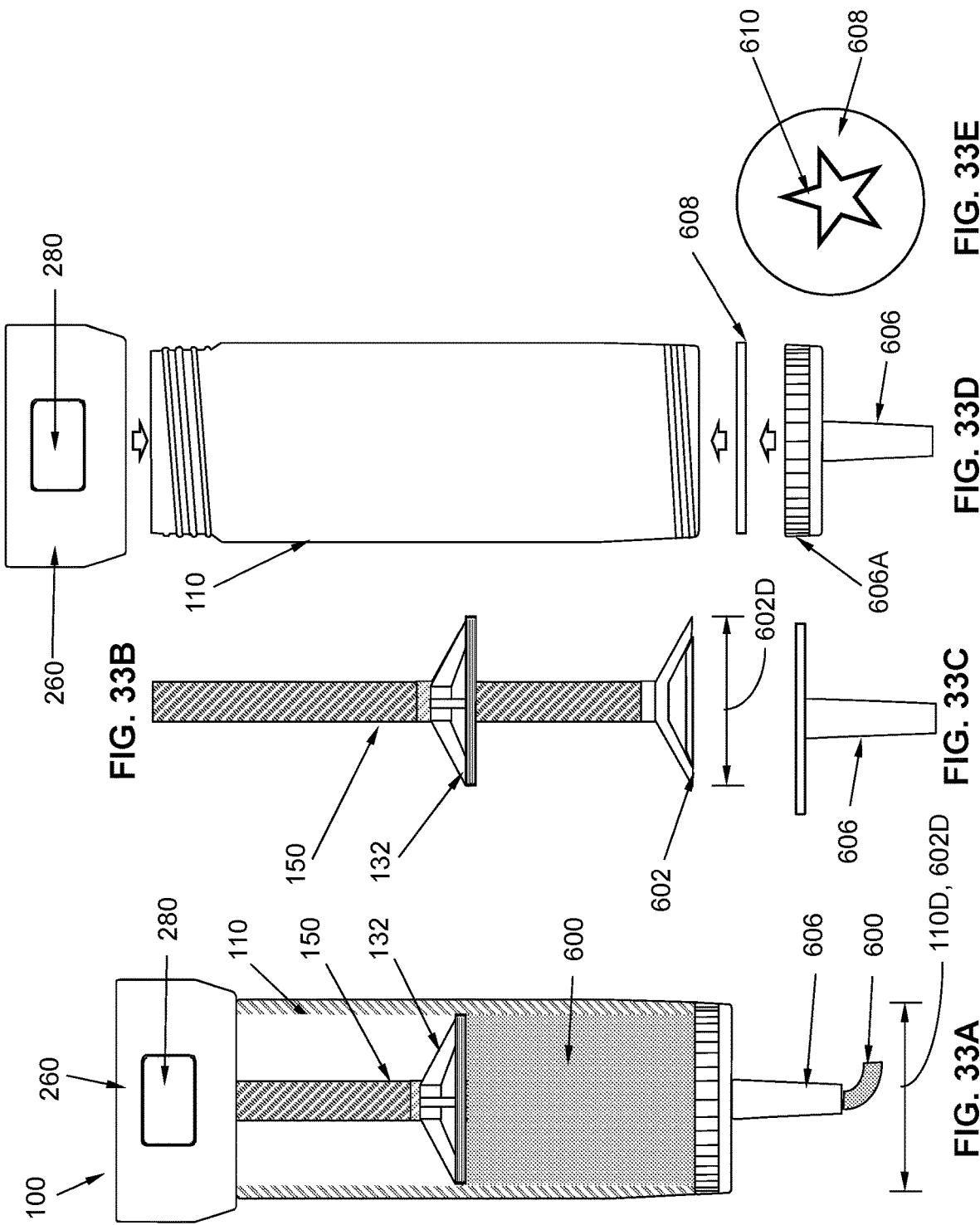

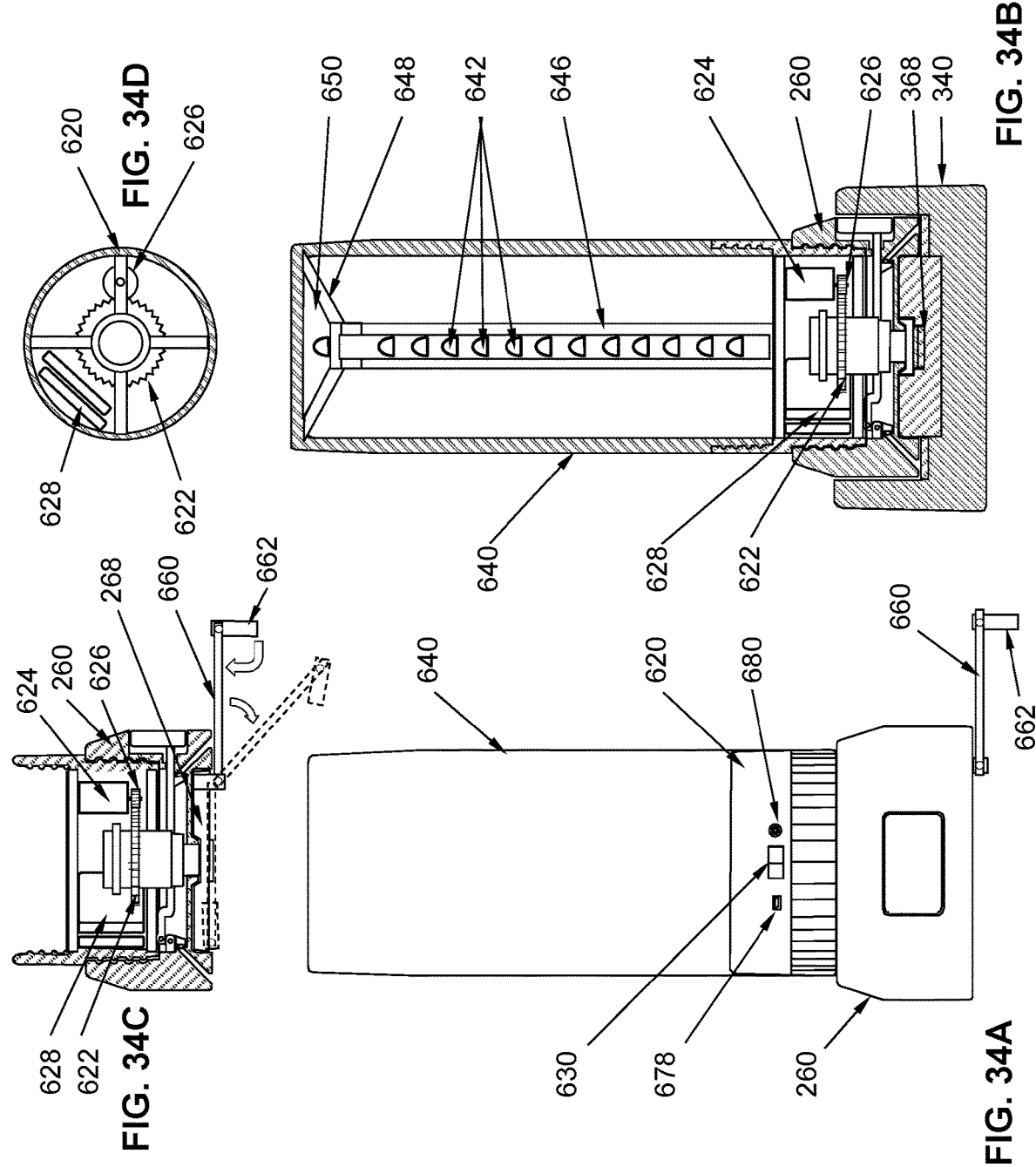

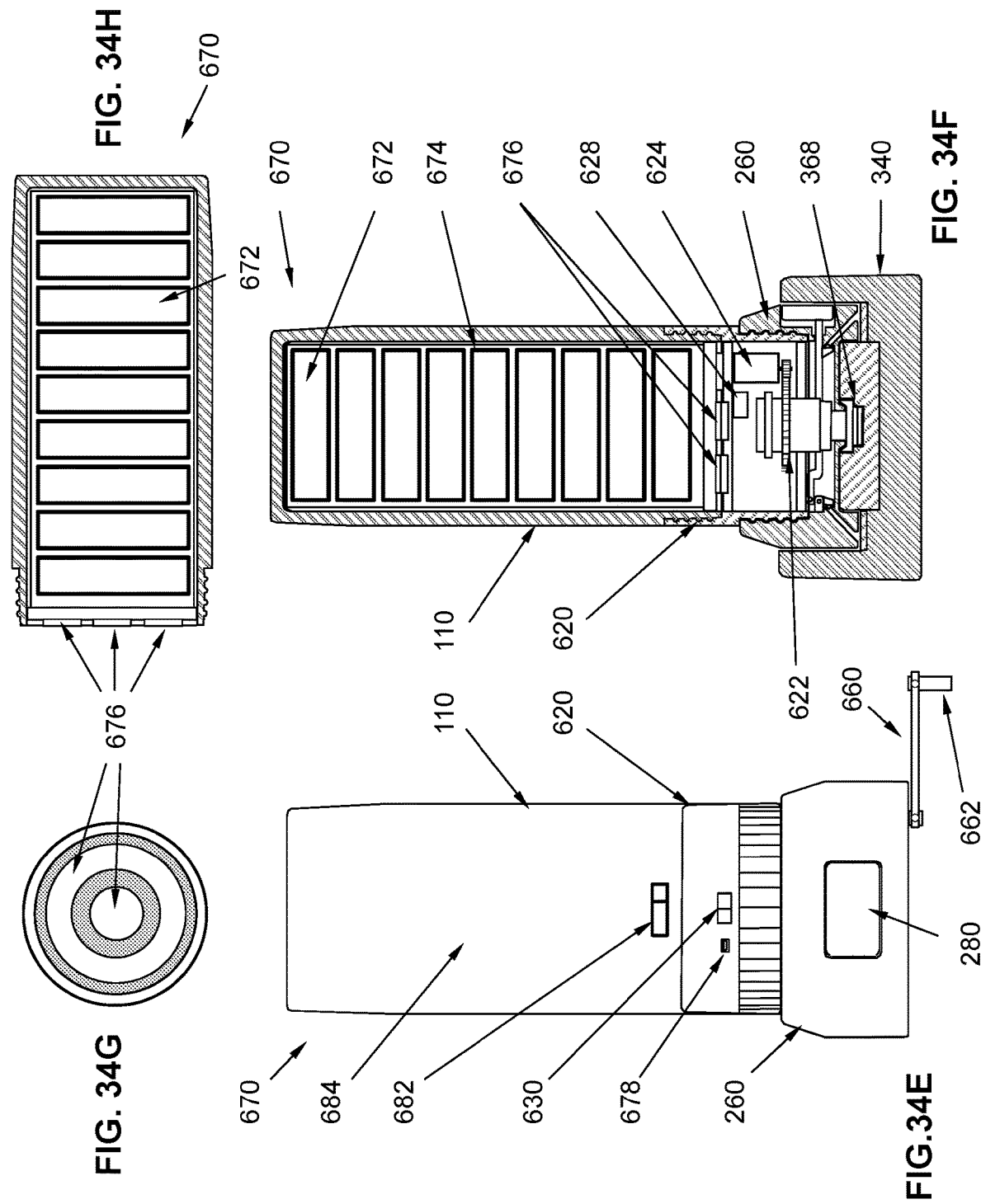

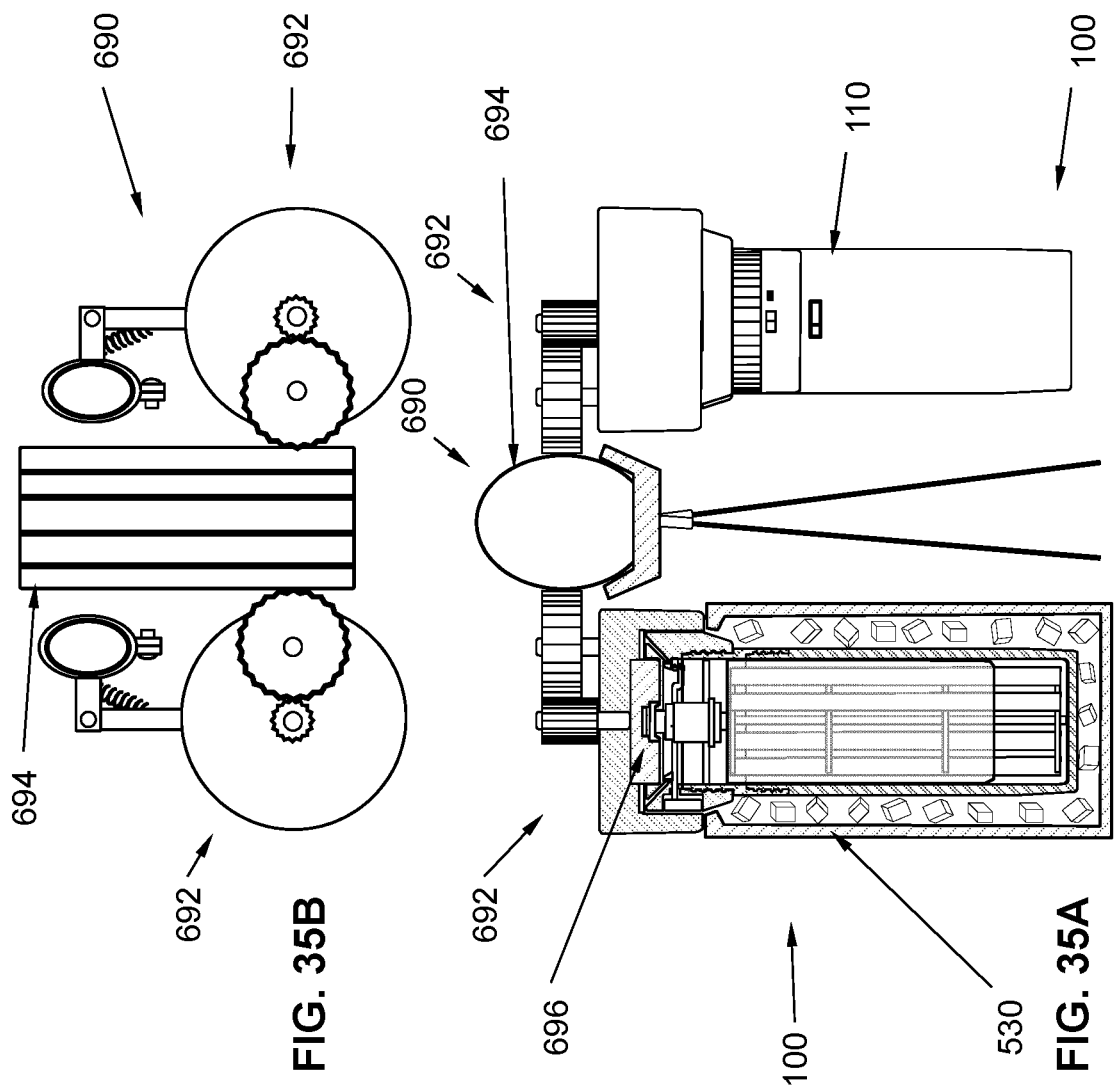

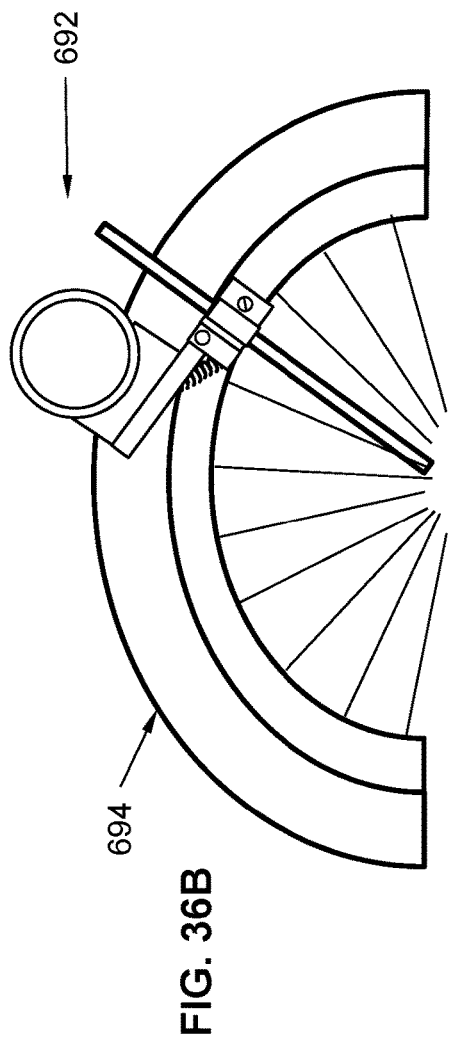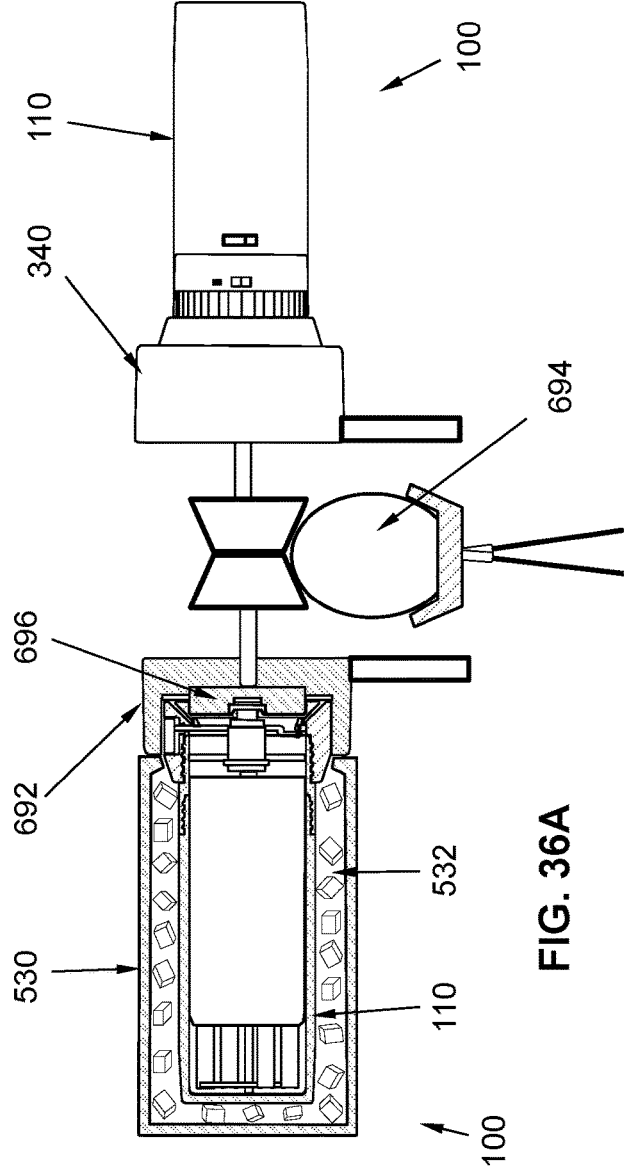
FIG. 36B
FIG. 36A

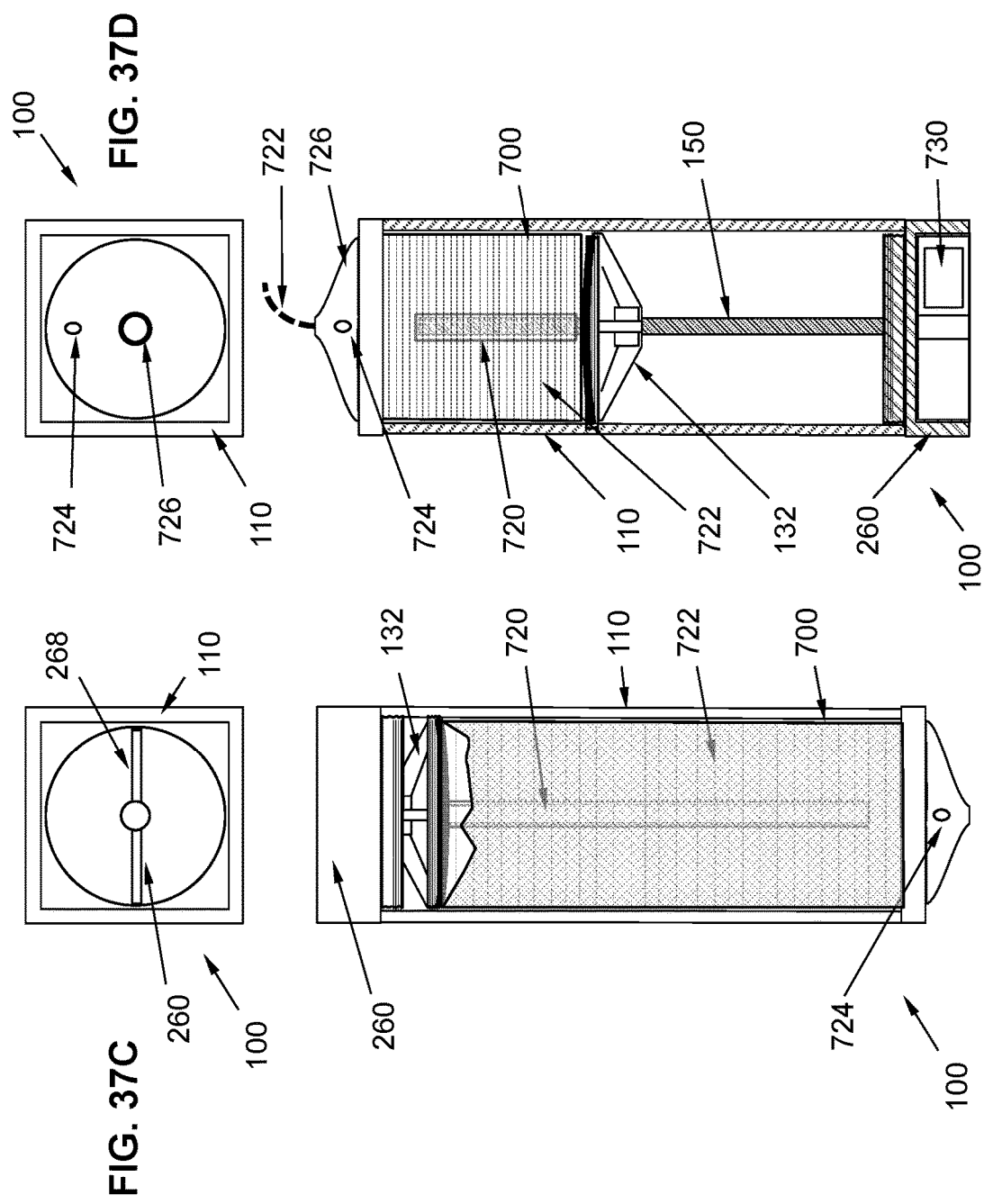

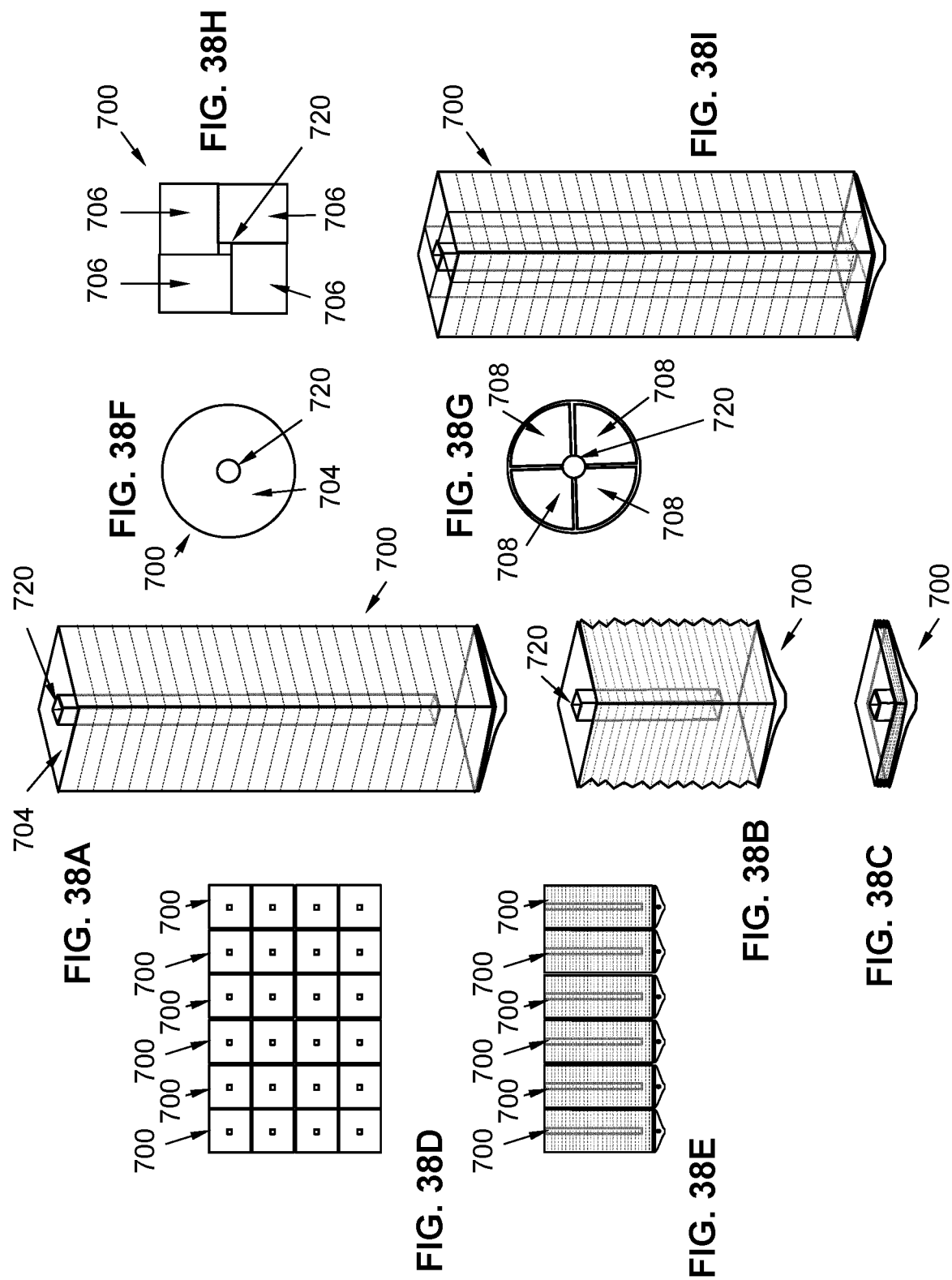

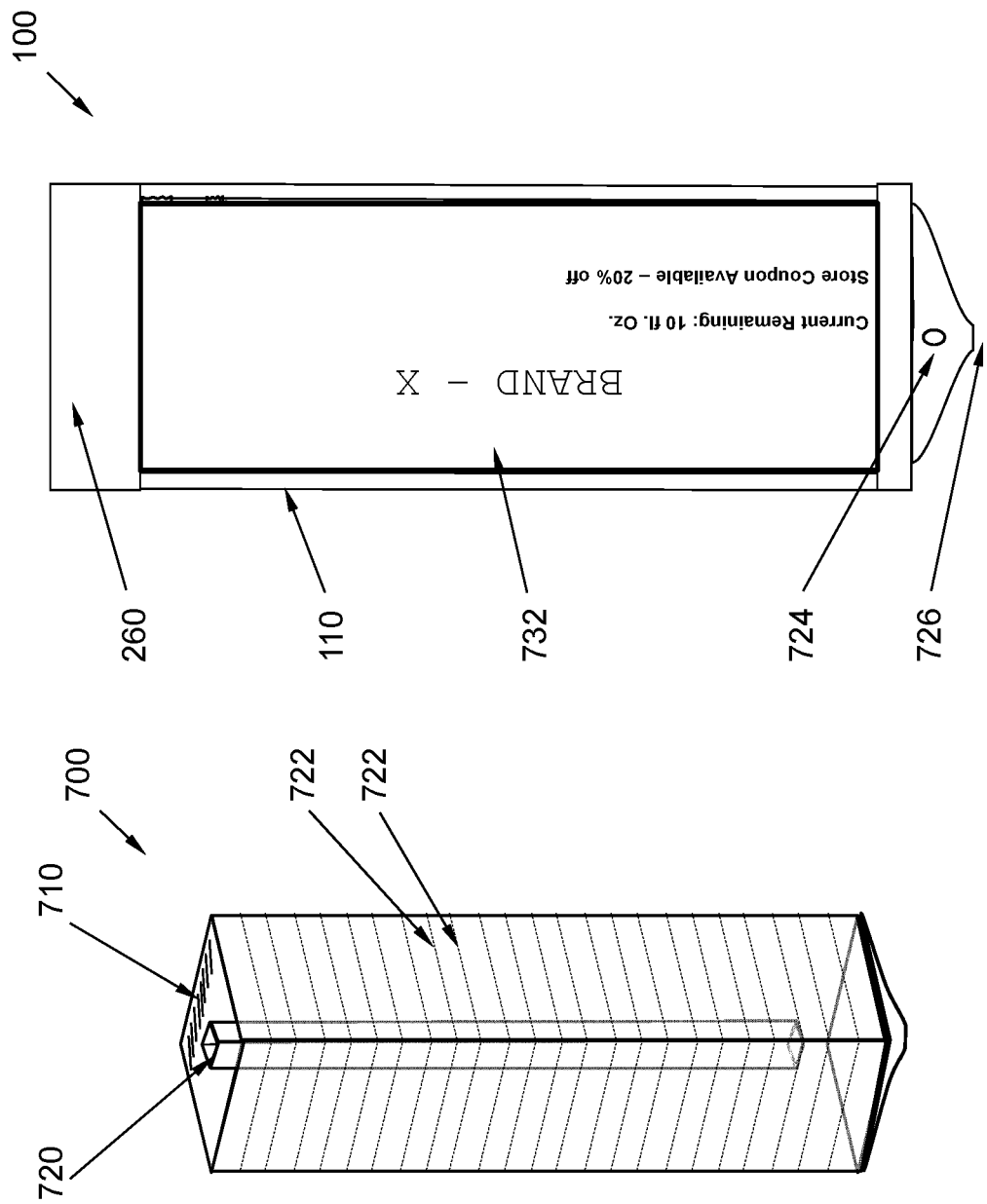

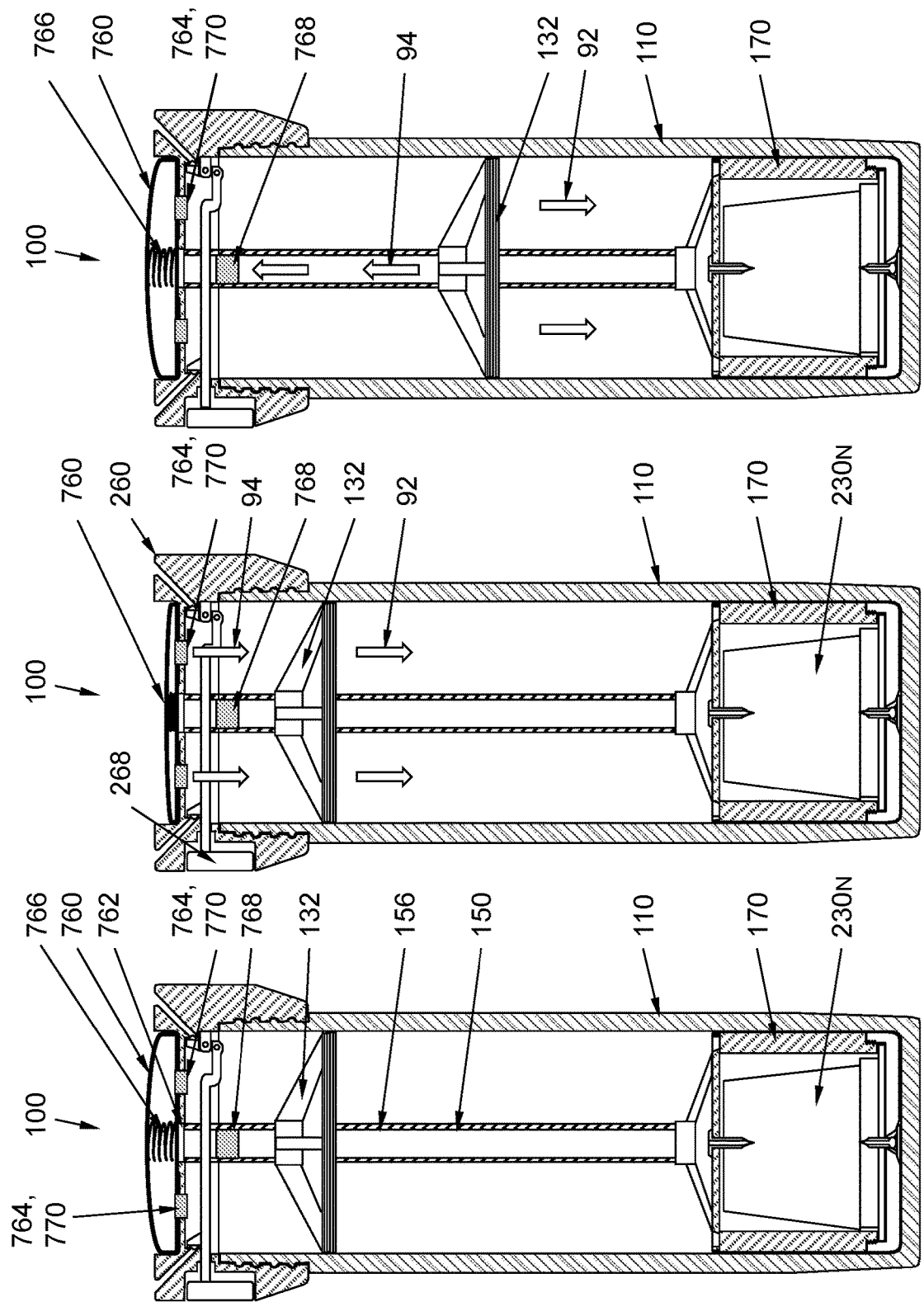

CONTAINER ASSEMBLY AND ACCESSORIES THEREFOR

CROSS-REFERENCE TO RELATED APPLICATION

This application is a National Stage Patent Application of International Patent Application PCT/US17/35676 and claims the benefit of U.S. Provisional Patent Application Ser. No. 62/344,476 filed on Jun. 2, 2016, the disclosures of which are hereby incorporated herein by reference in their entireties.

TECHNICAL FIELD

The present disclosure generally relates to container assemblies that may be used with fluids, such as beverages, and accessories that may be used with container assemblies.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

Some beverage containers or coffee mugs may hold coffee or other beverages, but may not be configured for brewing the beverage. Other devices may brew beverages (e.g., a coffee maker), but such devices are often not portable and/or may not be configured to allow for consumption of the beverage directly from the device. Some containers may only be configured for a single purpose and may not be compatible with other uses or applications.

There is a desire for solutions/options that minimize or eliminate one or more shortcomings of The foregoing discussion is intended only to illustrate examples of the present field and should not be taken as a disavowal of scope.

SUMMARY

In embodiments, a container assembly may include a container, a plunger assembly including a plunger, a lid including a lid lever connected to actuate the plunger of the plunger assembly, and/or a housing disposed in the container and configured to receive mixing media. The lid and the plunger may define a fluid chamber. The plunger assembly may include a rod connected to the lid and the housing. The plunger may be connected to the rod via a threaded engagement. The rod may include an internal fluid passage providing fluid communication between the housing and an end of the rod. The rod may include at least one aperture disposed proximate the end of the rod. Rotation of the lid lever may cause rotation of the rod and translation of the plunger. Translation of the plunger may cause fluid disposed between the plunger and the housing to flow into the housing via at least one inlet port of the housing.

With embodiments, a container assembly may include a fluid flow path that extends from the at least one inlet port of the housing to a fluid chamber provided between the plunger and the lid via (i) a fluid passage in a body of the housing, (ii) a first puncturing protrusion of the housing, (iii) a second puncturing protrusion, (iv) an outlet of the housing, (v) an internal fluid passage of the rod, and/or (vi) at least one aperture disposed proximate an end of the rod.

In embodiments, a container assembly may include a cartridge adapter having a puncturing protrusion. A housing may include a first puncturing protrusion and a second puncturing protrusion. A container assembly may include a power pod including a drive lever configured to cause rotation of the lid lever and an electric motor connected to drive the drive lever. A housing may include a body and/or a cover connected to the body. A first puncturing protrusion may be connected to the body and/or a second puncturing protrusion may be connected to the body.

With embodiments, a lid may include a first port, a second port, and/or a trigger configured to selectively seal the first port and the second port. A trigger may include a connecting member, a trigger button connected to the connecting member, a first protrusion connected to the connecting member and configured to seal the first port, and/or a second protrusion connected to the connecting member and configured to seal the second port. A connecting member may be connected to the lid via a hinge. A connecting member may be rotatably connected to the second protrusion; and the second protrusion is rotatably connected to the lid via a hinge. A second protrusion may be configured to rotate about a first axis relative to the connecting member and/or to rotate about a second axis relative to the hinge. The first axis may be offset from the second axis. A trigger may include a spring biasing the trigger button to a closed position. A trigger button may be at least partially disposed in a recess formed in an outer surface of the lid. In embodiments, a container may include one or more axially-extending rails engaged with the plunger to restrict rotation of the plunger.

With embodiments, a container assembly may include a second lid assembly. A second lid assembly may include a second lid and/or a tamper diffuser. A tamper diffuser may include at least one fluid channel and at least one diffusing hole. In an assembled configuration, the second lid may be connected with a container such that the tamper diffuser is disposed at least partially in a housing. A plunger may include a tubular section configured to at least partially receive the housing.

In embodiments, a container assembly may include a driver assembly. The driver assembly may include an outer wall, an axial wall connected to the outer wall, and/or a drive connector connected to the outer wall and the lid lever. A blade may be connected with the drive connector. A mixing paddle may be connected with the drive connector. With embodiments, a cooling jacket may be disposed at least partially around the container and/or configured to hold a cooling material. In embodiments, a container assembly may include an inner rod connected to the lid lever and/or configured to slide within a rod of a plunger assembly. A flange may be connected to the inner rod. The flange may be configured to permit fluid flow through the rod in a first direction and prevent fluid flow through the rod in a second direction.

Various aspects of the present disclosure will become apparent to those skilled in the art from the following detailed description of the various embodiments, when read in light of the accompanying drawings.

BRIEF DESCRIPTION OF THE DRAWINGS

FIG. 1A is a side view generally illustrating an embodiment of a container assembly according to teachings of the present disclosure.

FIG. 1B is a cross-sectional view generally illustrating an embodiment of a container assembly according to teachings of the present disclosure.

FIGS. 1C and 1D are side views generally illustrating portions of embodiments of container assemblies according to teachings of the present disclosure.

FIG. 2A is an exploded side view generally illustrating portions of an embodiment of a container assembly according to teachings of the present disclosure.

FIG. 2B is a side view generally illustrating an embodiment of a brewing cartridge according to teachings of the present disclosure.

FIG. 2C is a side view generally illustrating portions of an embodiment of a container assembly according to teachings of the present disclosure.

FIG. 3A is an exploded side view generally illustrating portions of an embodiment of a container assembly according to teachings of the present disclosure.

FIG. 3B is an exploded side view generally illustrating portions of an embodiment of a container assembly according to teachings of the present disclosure.

FIG. 3C is an exploded side view generally illustrating portions of an embodiment of a container assembly according to teachings of the present disclosure.

FIG. 3D is a top view generally illustrating portions of an embodiment of a cartridge adapter according to teachings of the present disclosure.

FIG. 4A is an exploded side view generally illustrating portions of an embodiment of a container assembly according to teachings of the present disclosure.

FIG. 4B is a top view generally illustrating portions of an embodiment of a cartridge assembly according to teachings of the present disclosure.

FIG. 4C is a side view generally illustrating portions of an embodiment of a cartridge assembly according to teachings of the present disclosure.

FIG. 5A is an exploded side view generally illustrating portions of an embodiment of a container assembly according to teachings of the present disclosure.

FIG. 5B is a top view generally illustrating portions of an embodiment of a displacement cartridge according to teachings of the present disclosure.

FIG. 6A is a top view generally illustrating portions of an embodiment of a lid in an open configuration according to teachings of the present disclosure.

FIG. 6B is a top view generally illustrating portions of an embodiment of a lid in a closed configuration according to teachings of the present disclosure.

FIG. 6C is a cross-sectional view generally illustrating an embodiment of a lid according to teachings of the present disclosure.

FIG. 7A is an exploded side view generally illustrating portions of an embodiment of a container assembly according to teachings of the present disclosure.

FIG. 7B is a side view generally illustrating portions of an embodiment of a container assembly according to teachings of the present disclosure.

FIGS. 8A, 8B, 9A, 9B, 10A, and 10B are cross-sectional views generally illustrating embodiments of container assemblies according to teachings of the present disclosure.

FIGS. 11A and 11B are top views generally illustrating embodiments of lids according to teachings of the present disclosure.

FIGS. 12A, 12B, and 12C are a side, cross-sectional, and top views, respectively, generally illustrating embodiments of power pods according to teachings of the present disclosure.

FIGS. 13A and 13B are cross-sectional views generally illustrating embodiments of container assemblies according to teachings of the present disclosure.

FIGS. 14A and 14C are top views generally illustrating embodiments of lids, with some portions removed or hidden for illustration, according to teachings of the present disclosure.

FIGS. 14B and 14D are cross-sectional views generally illustrating embodiments of lids according to teachings of the present disclosure.

FIGS. 15A and 15B are cross-sectional views generally illustrating embodiments of lids according to teachings of the present disclosure.

FIGS. 16A and 16C are top views generally illustrating embodiments of lids. With some portions removed or hidden for illustration, according to teachings of the present disclosure.

FIGS. 16B and 16D are cross-sectional views generally illustrating embodiments of lids according to teachings of the present disclosure.

FIGS. 17A, 17B, 17C, 18A, and 18B are cross-sectional views generally illustrating embodiments of container assemblies according to teachings of the present disclosure.

FIG. 20A is an exploded side view generally illustrating portions of an embodiment of a container assembly according to teachings of the present disclosure.

FIG. 20B is a top view generally illustrating portions of an embodiment of a conditioning cartridge according to teachings of the present disclosure.

FIG. 20C is a side view generally illustrating portions of an embodiment of a conditioning cartridge according to teachings of the present disclosure.

FIG. 21A is an exploded side view generally illustrating portions of an embodiment of a container assembly according to teachings of the present disclosure.

FIG. 21B is a top view generally illustrating portions of an embodiment of a conditioning cartridge according to teachings of the present disclosure.

FIG. 21C is a side view generally illustrating portions of an embodiment of a conditioning cartridge according to teachings of the present disclosure.

FIGS. 22A and 22B are cross-sectional views generally illustrating embodiments of container assemblies according to teachings of the present disclosure.

FIGS. 22C and 22D are top and bottom views, respectively, generally illustrating embodiments of tamper diffusers according to teachings of the present disclosure.

FIGS. 23A, 23B, and 23C are cross-sectional views generally illustrating portions of embodiments of container assemblies according to teachings of the present disclosure.

FIGS. 24A, 24B, and 24C are cross-sectional views generally illustrating embodiments of container assemblies according to teachings of the present disclosure.

FIG. 25A is an exploded side view generally illustrating an embodiment of a cartridge adapter according to teachings of the present disclosure.

FIG. 25B is a side view generally illustrating an embodiment of a cartridge adapter according to teachings of the present disclosure.

FIG. 25C is an exploded cross-sectional view generally illustrating an embodiment of a container assemblies according to teachings of the present disclosure.

FIG. 25D is a cross-sectional view generally illustrating an embodiment of a container assembly according to teachings of the present disclosure.

FIG. 26A is an exploded side view generally illustrating an embodiment of a container assembly according to teachings of the present disclosure.

FIG. 26B is a side view generally illustrating an embodiment of a container assembly according to teachings of the present disclosure.

FIG. 26C is a cross-sectional view generally illustrating portions of an embodiment of a blade driver assembly according to teachings of the present disclosure.

FIG. 26D is a cross-sectional view generally illustrating an embodiment of a container assembly according to teachings of the present disclosure.

FIG. 26E is a cross-sectional view generally illustrating portions of an embodiment of a blade driver assembly according to teachings of the present disclosure.

FIG. 27A is a cross-sectional view generally illustrating an embodiment of a container assembly according to teachings of the present disclosure.

FIG. 27B is a cross-sectional view generally illustrating an embodiment of a container assembly according to teachings of the present disclosure.

FIG. 27C is a cross-sectional top view generally illustrating portions of an embodiment of a container assembly according to teachings of the present disclosure.

FIG. 27D is a side view generally illustrating portions of an embodiment of a mixing paddle according to teachings of the present disclosure.

FIG. 28A is a cross-sectional top view generally illustrating portions of an embodiment of a blade driver assembly according to teachings of the present disclosure.

FIG. 28B is a cross-sectional view generally illustrating portions of an embodiment of a blade driver assembly according to teachings of the present disclosure.

FIG. 29A is a top view generally illustrating portions of an embodiment of a salad spinner assembly according to teachings of the present disclosure.

FIG. 29B is a cross-sectional view generally illustrating portions of an embodiment of a salad spinner assembly according to teachings of the present disclosure.

FIG. 30A is a cross-sectional view generally illustrating an embodiment of a container assembly with a food processor according to teachings of the present disclosure.

FIGS. 30B, 30C, and 30D are side views generally illustrating portions of embodiments of food processors according to teachings of the present disclosure.

FIG. 31A is a cross-sectional view generally illustrating portions of an embodiment of a container assembly with a food processor according to teachings of the present disclosure.

FIG. 31B is a cross-sectional top view generally illustrating portions of an embodiment of a container assembly with a food processor according to teachings of the present disclosure.

FIG. 32A is a cross-sectional view generally illustrating portions of an embodiment of a container assembly with a food processor according to teachings of the present disclosure.

FIG. 32B is a side view generally illustrating portions of an embodiment of a container assembly with a food processor according to teachings of the present disclosure.

FIG. 33A is a cross-sectional view generally illustrating an embodiment of a container assembly according to teachings of the present disclosure.

FIG. 33B is a side view generally illustrating portions of an embodiment of a container assembly according to teachings of the present disclosure.

FIGS. 33C and 33E are side views generally illustrating embodiments of nozzles according to teachings of the present disclosure.

FIG. 33D is an exploded side view generally illustrating an embodiment of a container assembly according to teachings of the present disclosure.

FIG. 34A is a side view generally illustrating an embodiment of a container assembly according to teachings of the present disclosure.

FIGS. 34B and 34C are cross-sectional views generally illustrating portions of embodiments of container assemblies according to teachings of the present disclosure.

FIG. 34D is a top view generally illustrating portions of an embodiment of a container assembly according to teachings of the present disclosure.

FIGS. 34E and 34G are side views generally illustrating portions of embodiments of container assemblies according to teachings of the present disclosure.

FIGS. 34F and 34H are cross-sectional views generally illustrating portions of embodiments of container assemblies according to teachings of the present disclosure.

FIGS. 35A and 36A are cross-sectional and side views generally illustrating embodiments of container assemblies and charging assemblies according to teachings of the present disclosure.

FIGS. 35B and 36B are top and side views, respectively, generally illustrating portions of embodiments of charging assemblies according to teachings of the present disclosure.

FIGS. 37A and 37B are cross-sectional views generally illustrating embodiments of container assemblies according to teachings of the present disclosure.

FIGS. 37C and 37D are side views generally illustrating first and second ends of embodiments of container assemblies according to teachings of the present disclosure.

FIGS. 38A, 38B, and 38C are perspective views generally illustrating embodiments of reservoir tube according to teachings of the present disclosure.

FIGS. 38D, 38E, 38F, 38G, 38H, and 39B are side views generally illustrating embodiments of reservoir tubes according to teachings of the present disclosure.

FIGS. 38I and 39A are perspective views generally illustrating embodiments of reservoir tubes according to teachings of the present disclosure.

FIGS. 40A, 40B, 40C, 41A, 41B, and 41C are cross-sectional views generally illustrating embodiments of container assemblies according to teachings of the present disclosure.

DETAILED DESCRIPTION

Figure 9B:
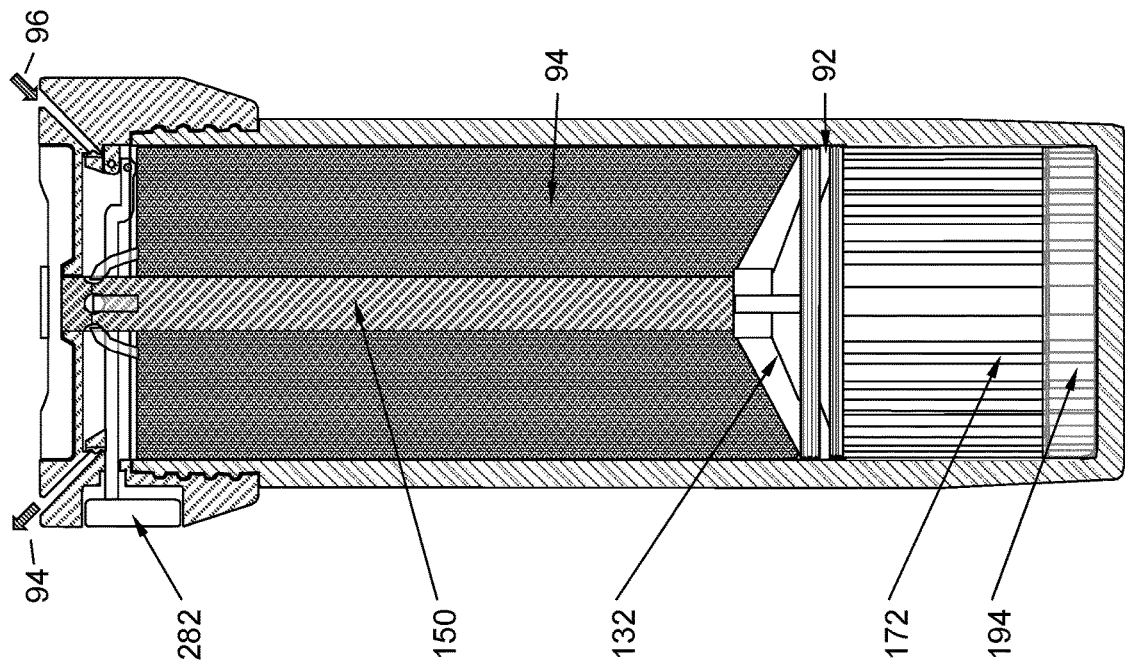
Figure 9A:
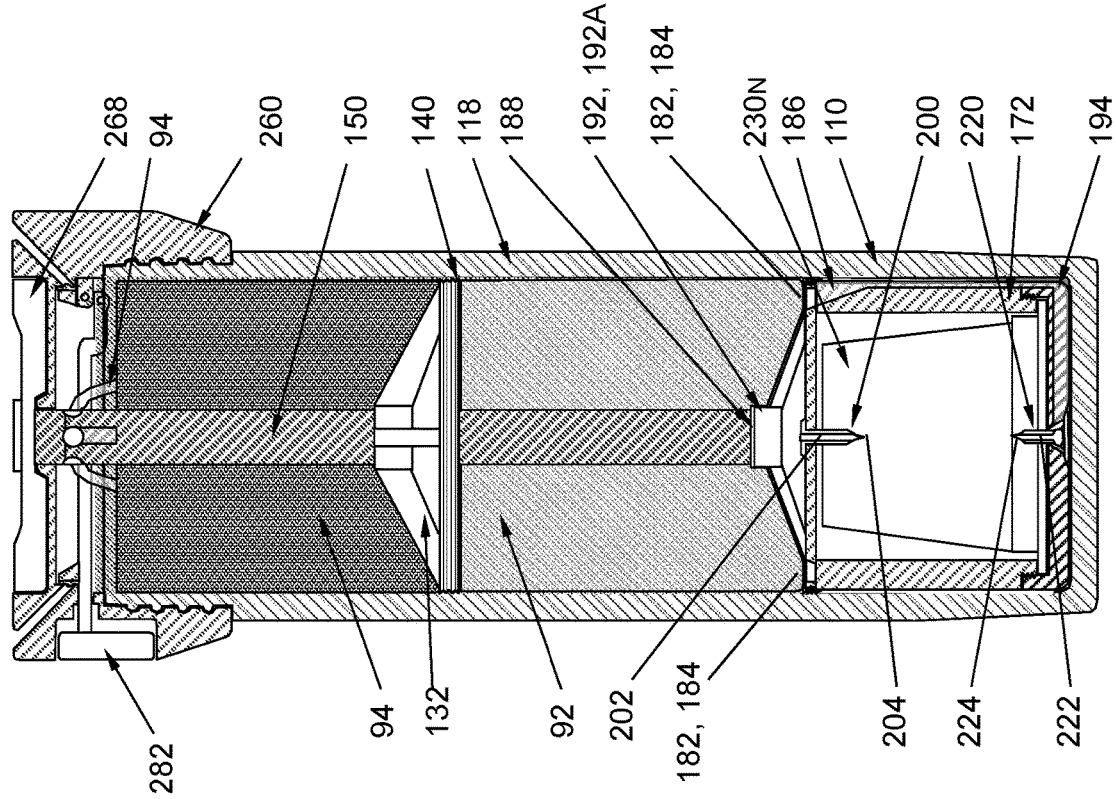
Figure 10B:
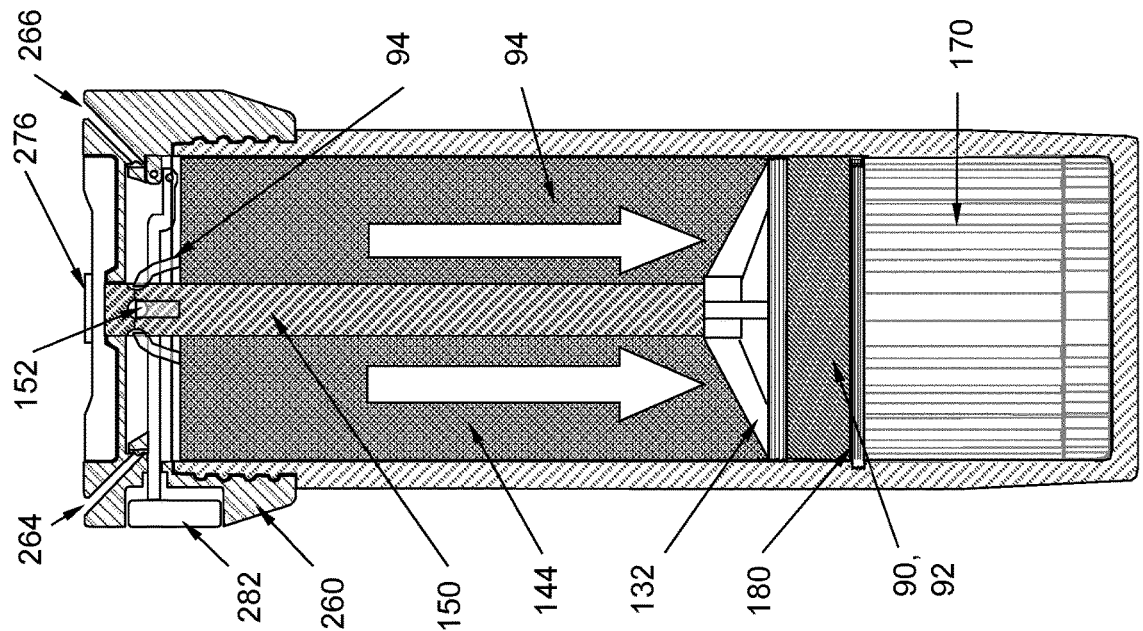
Figure 10A:
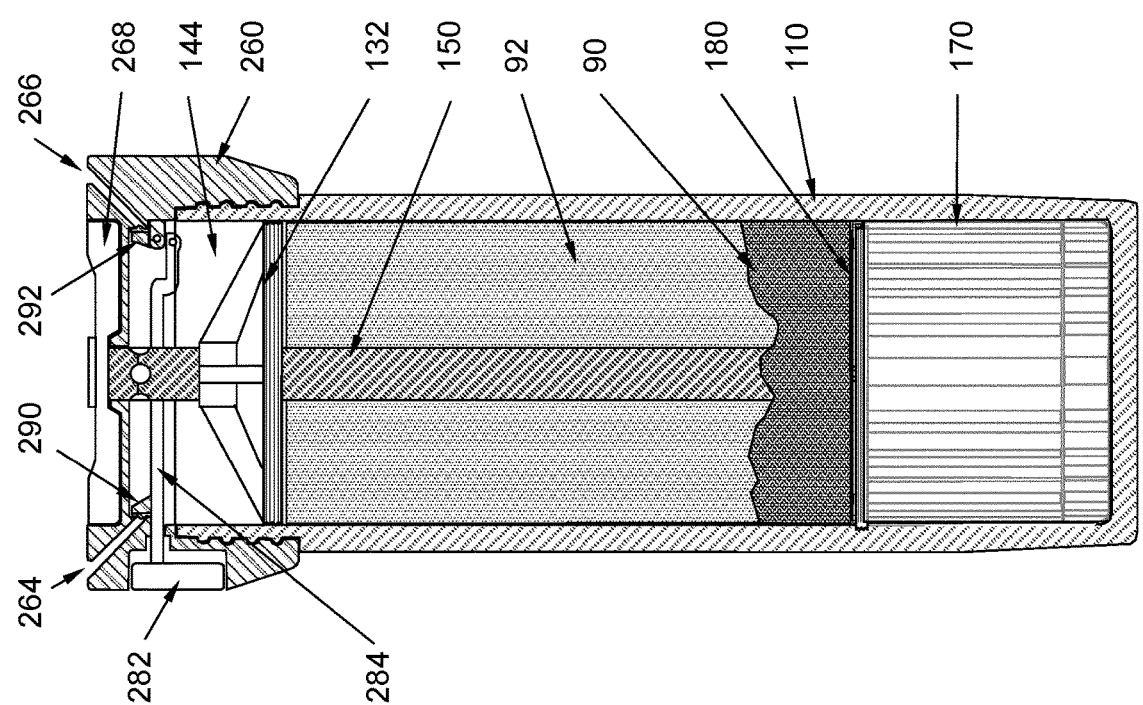
Figure 12B:
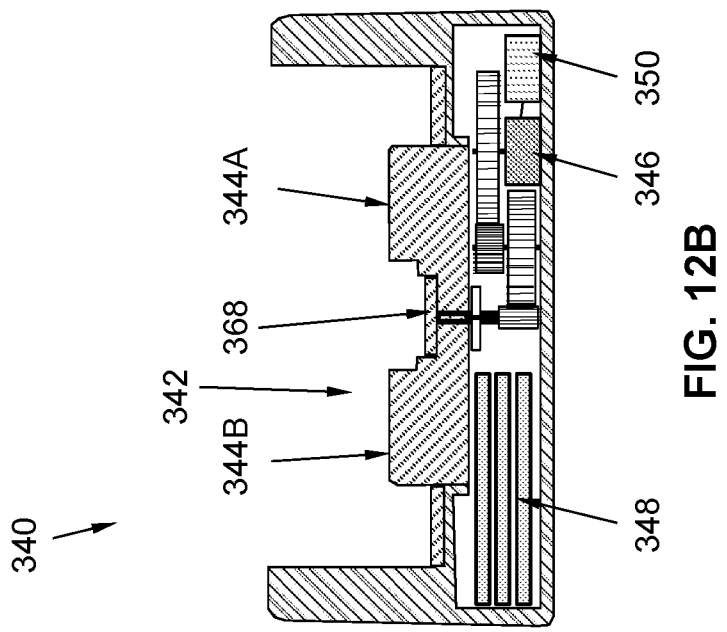
Figure 12A:
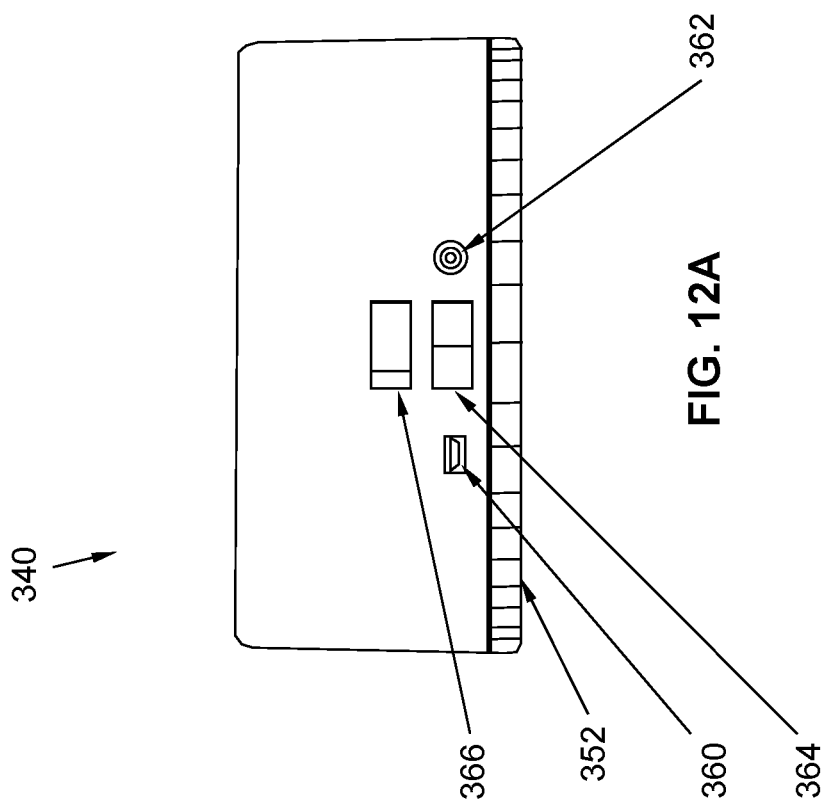

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications and equivalents, which may be included within the spirit and scope of the present disclosure as defined by the appended claims.

In embodiments, such as generally illustrated in FIGS. 1A and 1B, a container assembly 100 may include a container 110, a plunger assembly 130, a housing 170, and/or a lid 260 that may be configured for connection with container 110. Lid 260 may be configured to actuate plunger assembly 130.

With embodiments, container 110 may include one or more of a variety of shapes, sizes, configurations, and/or materials. For example, and without limitation, container 110 may include a generally hollow cylindrical configuration with an first end 112 that may be open and a second end 114 that may be closed. In embodiments, container 110 may include stainless steel and/or may include a polymer (e.g., a dishwasher safe plastic).

With embodiments, plunger assembly 130 may include a plunger 132 that may be connected to a rod 150 (e.g., a threaded rod). Plunger 132 may be connected to rod 150 such that rotation of rod 150 may cause translation of plunger 132. For example and without limitation, plunger 132 may be threaded/screwed onto rod 150, which may include an external thread 160. Plunger 132 may include a shape that corresponds to a shape of container 110. For example and without limitation, an outer edge 134 of plunger 132 may be partially or entirely engaged with an inner surface 116 of container 110. Plunger 132 may include, for example, and generally conical shape that may include a relative small diameter at a first axial end 136 (e.g., proximate first end 112 of container 110) and a relatively larger diameter at a second axial end 138 (e.g., proximate second end 114 of container 110). Plunger 132 may include a sealing element or sealing material 140 that may be connected to and/or disposed at outer edge 134 of plunger 132. Sealing element or sealing material 140 may provide a fluid seal between plunger 132 and inner surface 116 of container 110. Plunger 132 may move between a first position in which plunger 132 may be disposed at or about first end 112 of container 110 and a second position in which plunger 132 may be disposed at or about second end 114 of container 110. As plunger 132 moves between first position and second position, plunger 132 may push material (e.g., fluid 92), disposed between plunger 132 and second end 114, toward second end 114.

Figure 19:
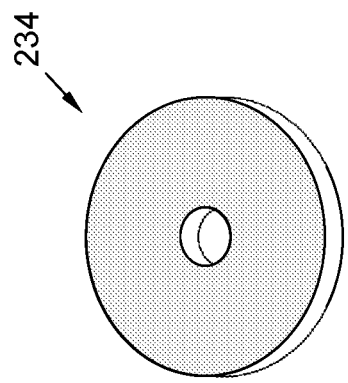
FIG. 19 is a perspective view generally illustrating an embodiment of a brewing media disc according to teachings of the present disclosure.

With embodiments, container assembly 100 may include a housing 170 that may be disposed in and/or connected to container 110. As generally illustrated in FIGS. 1B, 2A, 2C, 3A, 4A, 5A, 8A, 8B, 9A, and 9B, for example, housing 170 may be connected to rod 150 (e.g., a second end 154 of rod 150). Housing 170 may be disposed in container 110 at or about second end 114 of container 110. Housing 170 may be configured to receive/house a cartridge $230_N$ and/or other media (e.g., a media disc 234, such as generally illustrated in FIG. 19). Housing 170 may include a body 172 and/or a cover 194. Body 172 may include, for example, a generally cylindrical configuration and/or may be configured to receive a cartridge $230_N$. Body 172 may include a first end 174 that may be closed and/or a second end 176 that may be open. Second end 176 may be configured to receive a cartridge $230_N$ (e.g., cartridges $230_N$ may be inserted into body 172 through second end 176. Body 172 may include a ledge 190 (e.g., a circumferential ledge) that may be configured to engage a flange 232 of a cartridge $230_N$ and/or limit an insertion depth of a cartridge $230_N$ into body 172. Ledge 190 may be disposed at or about second end 176 of body 172 and/or may be disposed at an end of a threaded section 178 of body 172.

In embodiments, cover 194 may be configured for connection with body 172 and/or to proximate second end 176 of body 172. For example and without limitation, body 172 and cover 194 may include corresponding threaded sections 178, 194A and/or body 172 and cover 194 may screw together. In embodiments, a cartridge $230_N$ may be inserted through second end 176 into body 172 and then cover 194 may be screwed onto/into body 172, which may retain and/or restrict movement of the cartridge $230_N$ within housing 170. With embodiments, in a reversed configuration, cover 194 may be connected to rod 150 and body 172 may be configured for connection with cover 194.

In embodiments, housing 170 may include a seal element 180 that may be disposed at or about an outer edge 172A of body 172. Seal element 180 may be configured to provide a fluid seal between housing 170 and inner surface 116 of container 110.

In embodiments, such as generally illustrated in FIGS. 1B, 2A, 2B, 3A, 3B, 3C, 3D, 4A, 4B, 4C, 5A, 5B, 20A, 20B, 20C, 21A, 21B, and 21C, a cartridge $230_N$ may include one or more of a variety of shapes, sizes, configurations, and/or materials. A cartridge $230_N$ may hold/store, at least temporarily, media 90 for mixing/brewing. For example and without limitation, a cartridge $230_1$ may hold coffee grounds, tea, hot chocolate mix, beverage powders, and/or concentrated beverage liquids, among other things. A cartridge $230_N$ may include, for example, a K-Cup®, a filter that may be configured to hold brewing media (e.g., a reusable coffee filter, such as generally illustrated in connection with cartridge $230_4$), an espresso cartridge (e.g., cartridge $230_7$), and/or another configuration.

In embodiments, housing 170 may be configured to puncture a cartridge $230_N$ (e.g., a plastic side wall and/or a foil cover of a cartridge $230_N$). For example and without limitation, body 172 may include a first puncturing protrusion 200 and/or cover 194 may include a second puncturing protrusion 220. First puncturing protrusion 200 may be connected with body 172 at or about a center of body 172 (e.g., aligned with longitudinal axis 102) proximate first end 174 of body 172 and may extend in an axial direction. Second puncturing protrusion 220 may be connected at or about a center of cover 194 (e.g., aligned with longitudinal axis 102 and/or first puncturing protrusion 200). Puncturing protrusions 200, 220 may include generally cylindrical configurations that may include internal fluid passages 202, 222, and/or may include tips 204, 224 configured to puncture cartridges $230_N$ (e.g., sharp tips).

With embodiments, such as generally illustrated in FIGS. 3A, 3B, and 3C (and 20A and 21A), container assembly 100 and/or housing 170 may include a cartridge adapter/basket 240. Cartridge adapter 240 may be configured to hold and/or support certain cartridges $230_N$, such as less common cartridges, differently-shaped cartridges, and/or cartridges of more than one size. A cartridge $230_N$ may be inserted, at least partially, into cartridge adapter 240, which may be inserted into body 172. Cartridge adapter 240 may include a flange 242 that may engage housing 170 and/or body 172 (e.g., ledge 190) to limit the insertion depth of cartridge adapter 240 into body 172. Cartridge adapter 240 may include an adapter puncturing protrusion 244 that may be configured to puncture a cartridge $230_N$. Adapter puncturing protrusion 244 may be used, for example, instead of first puncturing protrusion 200 of housing 170 (e.g., if the cartridge $230_N$ is not tall enough to be punctured by both first puncturing protrusion 200 and second puncturing protrusion 220). With embodiments, mixing media 90 may be disposed directly into cartridge adapter 240 (e.g., cartridge adapter may function as a cartridge $230_N$ in at least some configurations).

In embodiments, cartridge adapter 240 may be adjustable (e.g., include an adjustable height) to accommodate cartridges $230_N$ of different sizes, such as cartridge $230_2$, which may include a first height, and cartridge $230_3$, which include a greater second height.

With embodiments, such as generally illustrated in FIGS. 2B, 4A, 4B, and 4C, a cartridge $230_N$ (e.g., cartridge $230_4$) may be configured as a filter and may be used with a cartridge adapter or basket (e.g., a reusable coffee filter). Cartridge $230_4$ may include one or more mesh or screen portions 252 that may allow fluid to flow through (e.g., out) and may not allow solid material (e.g., coffee grounds) to flow through. Cartridge adapter 240 may include one or more mesh or screen portions 246 that may allow fluid to flow through (e.g., out) and may not allow solid material (e.g., coffee grounds) to flow through. First puncturing protrusion 200 and/or second puncturing protrusion 220 may engage cartridge adapter 240, but may not permanently deform cartridge adapter 240. For example and without limitation, cartridge adapter 240 may include corresponding apertures, flaps, and/or valves 248 that may be configured to receive first puncturing protrusion 200 and/or second puncturing protrusion 220. In embodiments, fluid 92 may flow into cartridge via first puncturing protrusion 200 and/or second puncturing protrusion 220, may mix with media 90 in cartridge $230_4$, and/or flow out of cartridge $230_4$ via one or more mesh or screen portions 252.

In embodiments, such as generally illustrated in FIGS. 1A, 1B, 1D, 6A, 6B, 7A, 7B, 8A, 8B, 9A, 9B, 10A, 10B, 11A, 11B, 13A, 13B, 14A, 14B, 14C, 14D, 15A, 15B, 16A, 16B, 16C, and 16D, lid 260 may be configured to connect with and/or close first end 112 of container 110 and may include one or more of a variety of shapes, sizes, configurations, and/or materials. Lid 260 may include a connection portion 262, a first port 264, a second port 266, a lid lever 268, and/or a trigger 280. First port 264 and/or second port 266 may include a first fluid passage 264A and/or a second fluid passage 266A, respectively, that may extend from a first end 260A of lid 260 to a second end 260B of lid 260 and/or may provide fluid communication between first end 260A of lid 260 and second end 260B of lid 260 (e.g., between container 110 and a surrounding environment). In embodiments, at least one of first port 264 and second port 266 may be used to dispense fluid (e.g., mixed fluid 94) from container 110 while the other of first port 264 and second port 266 may (e.g., simultaneously) allow gas/air 96 to enter container 110 to replace the volume of the dispensed fluid 94. Lid 260 may include one or more readially-extending support ribs 260C.

With embodiments, first end 112 of container 110 may include a connection portion 120 that may be configured for connection with lid 260. For example and without limitation, connection portion 120 may include threads 120A and lid 260 may include a connection portion 262 that may include corresponding threads 262A to screw onto and/or into connection portion 120 of container 110.

In embodiments, such as generally illustrated in FIGS. 1B, 6A, 6B, 6C, 8A, 8B, 9A, 9B, 10A, 10B, 11A, 11B, 13A, 13B, 14B, 14D, 15A, 15B, 16B, 16D, lid lever 268 may be configured to rotate relative to lid 260 and/or may be configured to rotate rod 150. Lid 260 may be disposed at a first end 260A of lid 260 (e.g., a top of lid 260) and may be configured for actuation/rotation, such as by a user and/or by a device (e.g., a power pod 340, an actuator 690, or other actuator). Rotation of lid lever 268 in a first direction (e.g., clockwise) may cause rod 150 to rotate in the first direction and may cause plunger 132 to translate in a first direction (e.g., toward second end 114 of container 110). Rotation of lid lever 268 in a second direction (e.g., counterclockwise) may cause rod 150 to rotate in the second direction and may cause plunger 132 to translate in a second direction (e.g., away from second end 114 of container 110).

With embodiments, such as generally illustrated in FIGS. 1B, 8A, 9A, and 9B, container assembly 100 may be configured to cause a fluid 92 (e.g., water) to mix with a mixing media 90 (e.g., coffee) that may be disposed in housing 170 (e.g., in a cartridge $230_N$). Mixed fluid 94 may then be provided to a chamber 144 (e.g., fluid chamber) provided/defined between plunger 132 and first end 112 of container 110. Mixed fluid 94 may be dispensed directly from the chamber 144 (e.g., a user may drink mixed fluid 94 from chamber 144 via first port 264 and/or second port 266).

In embodiments, housing 170 may be disposed in container 110 with rod 150 and fluid 92 (e.g., water) and may be added to container 110 (e.g., between housing 170 and first end 112 of container 110). Plunger 132 may be connected to rod 150 and lid 260 may be connected to container 110. Connecting lid 260 to container 110 may include connecting lid lever 268 to rod 150 such that rotation of lid lever 268 causes rotation of rod 150.

In a first configuration, translation of plunger 132 toward second end 114 (and housing 170) may force fluid 92 to enter housing 170, such as via one or more inlet ports 182. Inlet ports 182 may include, for example, screened sections 184 that may permit fluid flow, but may restrict particle flow, into housing 170. Fluid 92 that enters housing 170 may flow through one or more fluid passages 186 of housing 170 to second puncturing protrusion 220. Fluid passages 186 may, for example, be disposed in body 172 and/or cover 194. Fluid 92 may flow through second puncturing protrusion 220 and into a cartridge $230_N$, where fluid 92 may mix with mixing media 90 (e.g., coffee grounds) and/or interact with housing 170 (e.g., be filtered/conditioned) to form a mixed fluid 94. Mixed fluid 94 may exit housing 170 by flowing through first puncturing protrusion 200 and/or through an outlet port 188 of housing 170. Outlet port 188 of housing 170 may be connected to an inner fluid passage 156 of rod 150. Mixed fluid 94 that flows to housing outlet port 188 may flow from a second end 154 of rod 150 to a first end 152 of rod 150 (e.g., up). One or more apertures 158 may be disposed at or about first end 152 of rod 150 and mixed fluid 94 may exit rod 150 and/or may flow into chamber 144 via aperture(s) 158. Chamber 144 may be disposed and/or defined between (i) plunger 132 and (ii) lid 260 and/or first end 112 of container 110.

In a second configuration, such as generally illustrated in FIG. 8B, container 110 may include one or more fluid passages 122 disposed in a wall 118 of container 110. In such a configuration, plunger 132 may cause fluid 92 (e.g., water) to flow through a top 192 of housing (e.g., through one or more apertures or screen/mesh sections 192A). Fluid that flows through top 192 of housing 170 may flow through first puncturing protrusion 200 and into a cartridge $230_N$ where fluid 92 may mix with a mixing media 90 to form mixed fluid 94. Mixed fluid 94 may then exit cartridge $230_N$ by flowing through second puncturing protrusion 220 (e.g., as a result of fluid pressure generated via plunger 132). Second puncturing protrusion 220 may be in fluid communication with fluid passage(s) 122. Mixed fluid 94 that flows through second puncturing protrusion 220 may flow through fluid passage(s) 122 toward a first end 112 of container 110. Wall 118 of container 110 may include one or more apertures 124 at or about first end 112 of container 110 that may permit mixed fluid 94 to flow from passage(s) 122 to chamber 144.

In embodiments, such as the first configuration, the second configuration, and/or other configurations, as plunger 132 translates toward second end 114 of container 110, chamber 144 may increase in size/volume and mixed fluid 94 may continue to flow into chamber 144. If lid lever 268 stops being rotated (e.g., if plunger 132 reaches housing 170), plunger 132 may stop translating and fluid mixing (e.g., brewing) may be complete. Mixed fluid 94 may be dispensed through one or more ports 264, 266 of lid 260 without any assembly or disassembly steps (e.g., no additional steps other than opening one or more outlet ports). For example and without limitation, a user may drink mixed fluid from one or more of ports 264, 266 without adjusting or removing plunger 132, rod 150, and/or housing 170 (e.g., beverages may be brewed in and consumed from the same assembly).

In embodiments, such as generally illustrated in FIGS. 6B and 6C, ports 264, 266 of lid may be opened and/or closed via a rotating cover 278. For example and without limitation, rotation of cover 278 in a first direction (e.g., counterclockwise) may open ports 264, 266 and/or rotation of cover 278 in a second direction (e.g., clockwise) may close ports 264, 266. Ports 264, 266 may, for example, be sector-shaped (e.g., generally resemble a pizza or pie slice).

With embodiments, such as generally illustrated in FIGS. 7A and 7B, container assembly 100 may include a handle 198. At least a portion 198A of handle 198 may slide over connection portion 120 of container 110 and connecting lid 260 with container 110 may restrict movement of portion 198A (e.g., lid 260 may sandwich portion 198A between lid 260 and container 110).

With embodiments, such as generally illustrated in FIGS. 1B, 8A, 8B, 9A, 9B, 10A, 10B, 13A, 13B, 14A, 14B, 14C, 14D, 15A, 15B, 16A, 16B, 16C, 16D, 17A, 17B, and 17C, trigger 280 may be configured for selectively opening and/or closing first port 264 and/or second port 266. Trigger 280 may include a trigger button 282, a connecting member 284, a first protrusion 290, a second protrusion 292, and/or a hinge 294. Connecting member 284 may connect trigger button 282 with hinge 294. Connecting member 284 may include a first end 286 and a second end 288 and may extend in a generally radial/horizontal direction. Trigger button 282 may be disposed and/or connected at or about first end 286. Hinge 294 may be connected to second end 288. First protrusion 290 may extend (e.g., perpendicularly/vertically) from connecting member 284 (e.g., from a portion of connecting member 284 between first end 286 and second end 288) and may be configured to selectively seal/close first port 264 according to the position of connecting member 284. Second protrusion 292 may extend (e.g., vertically) from connecting member 284 (e.g., from at or about second end 288) and may be configured to seal/close second port 266 according to the position of connecting member 284. Hinge 294 may be connected (e.g., fixed) to an inner surface 270 of lid 260 and may be rotatably connected to connecting member 284, such as via a rotatable connection with second protrusion 292. Second protrusion 292 may be rotatably connected at or about to second end 288 of connecting member 284. For example and without limitation, second protrusion 292 may be configured to rotate relative to connecting member 284 about a first axis 296 and/or second protrusion 292 may be configured to rotate relative to hinge 294 about a second axis 298, which may be offset from first axis 296.

With embodiments, trigger button 282 may be disposed at least partially in a recess 272 of lid 260 that may be disposed in an outer surface 274 of lid 260 (e.g., formed in a lateral side of lid 260). Trigger button 282 may translate, at least to some degree, within recess 272. For example and without limitation, trigger button 282 may move from a closed position, such as the position generally illustrated in FIGS. 14A and 14B, to an open position, such as the position generally illustrated in FIGS. 14C and 14D. In the closed position, first protrusion 290 may close first port 264, which may restrict and/or prevent fluid (e.g., mixed fluid 94) flow from chamber 144 out through first port 264. Additionally or alternatively, in the closed position, second protrusion 292 may close second port 266, which may restrict and/or prevent fluid (e.g., mixed fluid 94) flow from chamber 144 out through second port 266.

If an opening force is applied to trigger button 282, such as a force directed radially inward, connecting member 284 may move/translate (e.g., from left to right in FIGS. 14A-14D). As connecting member 284 moves, first protrusion 290 may move out of a sealing engagement with first port 264 (e.g., may move to the right/radially inward). Additionally or alternatively, movement of connecting member 284 may cause second protrusion 292 to rotate about first axis 296 and/or second axis 298 (e.g., counterclockwise) and/or out of a sealing engagement with second port 266. A sealing material 300 (e.g., a rubber, a plastic, a polymer, etc.) may be connected to first protrusion 290 and/or second protrusion 292 and may be configured to promote fluid sealing of first protrusion 290 and/or second protrusion 292 with lid 260.

With embodiments, at least one of first port 264 and second port 266 (e.g., second port 266) may be used primarily as a vent to allow air 96 to enter chamber 144 while mixed fluid 94 flows out of chamber 144 via the other of first port 264 and second port 266 (e.g., first port 264).

In embodiments, such as generally illustrated in FIGS. 14A-14D, trigger 280 may include a spring 302 that may bias trigger button 282 into a closed position. For example and without limitation, spring 302 may include a coil spring that may be wrapped around connecting member 284 in recess between lid 260 and trigger button 282.

In embodiments, such as generally illustrated in FIGS. 15A and 15B, first protrusion 290 may include a sealing tab 320 that may extend from an end 290A of first protrusion 290 and, at least in a closed position, may extend at least partially into first port 264. Additionally or alternatively, second protrusion 292 may include a sealing tab 322 that may be connected (e.g., rotatably) to an end 292A of second protrusion 292 and, at least in a closed position, may extend at least partially into second port 266.

With embodiments, such as generally illustrated in FIGS. 16A-16D, lid 260 may include an internal recess 330 that may be configured to receive at least a portion of connecting member 284, such as second end 288 of connecting member 284. Additionally or alternatively, internal recess 330 may be configured to at least partially receive second protrusion 292. Internal recess 330 may provide fluid communication between chamber 144 and second port 266. In such configurations, trigger 280 may not include hinge 294 and/or second protrusion 292 may be non-rotatably connected with connecting member 284. For example and without limitation, if connecting member 284 is moved from a closed position to an open position, first protrusion 290 and second protrusion 292 may both translate out of sealing engagement with first port 264 and second port 266, respectively. A spring 332 may be disposed between an inner surface 270 of lid 260 and second protrusion 292 (e.g., wrapped around connecting member 284) and spring 302 may bias trigger button 282 (via connecting member 284) into a closed position.

With embodiments, such as generally illustrated in FIGS. 1C and 12A-13B, container assembly may include a power pod 340. Power pod 340 may be configured to actuate lid lever 268. Power pod 340 may include a drive lever 342, an electric motor 346, an energy storage device 348 (e.g., a battery), an electronic control unit (ECU) 350, a first power input 360, a second power input 362, a first control input 364, and/or a second control input 366. With embodiments, ECU 350 may be configured to control electric motor 346, such as according to first control input 364 and/or second control input 366. First control input 364 may include a forward/reverse switch. If first control input 364 is in a first/forward position, ECU 350 may cause electric motor 346 to operate in a first direction. If first control input 364 is in a second/reverse position, ECU 350 may cause electric motor 346 to operate in a second direction. Second control input 366 may include, for example, a speed switch that may include a plurality of positions corresponding to various desired speeds of electric motor 346. ECU 350 may cause electric motor 346 to operate at speeds corresponding to the position of second control input 366. Energy storage device 348 may be connected and/or provide electrical energy/current to ECU 350 and/or electric motor 346. First power input 360 may include, for example, a DC (direct current) input, such as a USB (universal serial bus) connector configured to receive power from a USB cable. Second power input 362 input may include, for example, and AC (alternating current) input that may be configured to receive AC power (e.g., from a wall outlet). First power input 360 and/or second power input 362 may be connected to one or more of energy storage device 348, electric motor 346, and ECU 350 and may be configured to charge energy storage device 348 and/or provide electrical energy/current to one or more of electric motor 346, energy storage device 348, and ECU 350.

In embodiments, drive lever 342 may be connected to electric motor 346 such that drive lever 342 may rotate with drive lever 342. Drive lever may include a first flange 344A and/or a second flange 344B. First flange 344A and/or second flange 344B may be configured to engage lid lever 268 of lid 260. For example and without limitation, operation of electric motor 346 may cause rotation of drive lever 342, which may cause first flange 344A and/or second flange 344B to cause rotation of lid lever 268, which may cause plunger 132 to translate within container 110. Power pod 340 may include a pod crank 352 that may be configured to drive a drive lever 342 (e.g., manually). Pod crank 352 may rotate relative a remainder of power pod 340 (e.g., other than drive lever 342).

With embodiments, power pod 340 may include a start button 368. Start button 368 may be disposed at or about a center of power pod 340 and/or may be aligned with a center of lid (e.g., axis 102) when power pod 340 is connected with lid 260. For example and without limitation, lid 260 may include a protrusion 276 that may extend outward from lid 260 (e.g., vertically) and, upon connection of power pod 340 with lid 260, protrusion 276 may engage/activate start button 368. Start button 368 may be connected with ECU 350 and/or engagement of start button 368 may cause ECU 350 to cause electric motor 346 to operate (e.g., power pod 340 may operate automatically upon connection of power pod 340 with lid 260).

In embodiments, such as generally illustrated in FIGS. 17A, 17B, and 17C, second end 114 of container 110 may be open and a second lid 370 may be configured to connect with and/or close second end 114. Second lid 370 may, for example, screw onto or into container 110. Cartridges 230$_N$ may be inserted into and/or removed from housing 170 via second end 114. With embodiments, such as generally illustrated in FIGS. 17B and 17C, container assembly 100 may include a heating element 390, 392. For example and without limitation, a heating element 390 may be disposed in rod 150 and may be powered via an electrical connection with power pod 340 (e.g., protrusion 276 of lid 260 may electrically connect with start button 368 of power pod 340). Rod 150 may include a heat resistant material (e.g., ceramic) that may be able to withstand relatively temperatures (e.g., up to and/or exceeding 200 degrees Fahrenheit). Additionally or alternatively, a heating element 392 may be disposed in wall 118 of container 110. Second lid 370 may include a battery pack 372 that may provide power to heating element 392. Second lid 370 may include a first control input 374 (e.g., a temperature dial), a second control input 376 (e.g., an on/off switch), and/or a charging port 378 that may be used to charge battery pack 372 and/or to charge other devices (e.g., power pod 340, portable electronic devices, etc.).

Figure 18B:
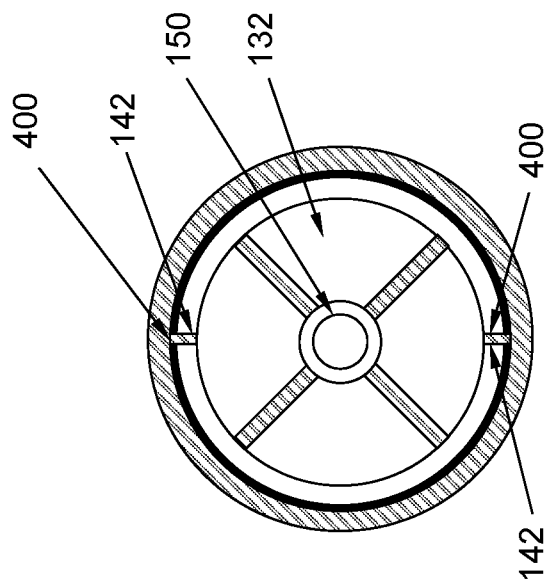
Figure 18A:
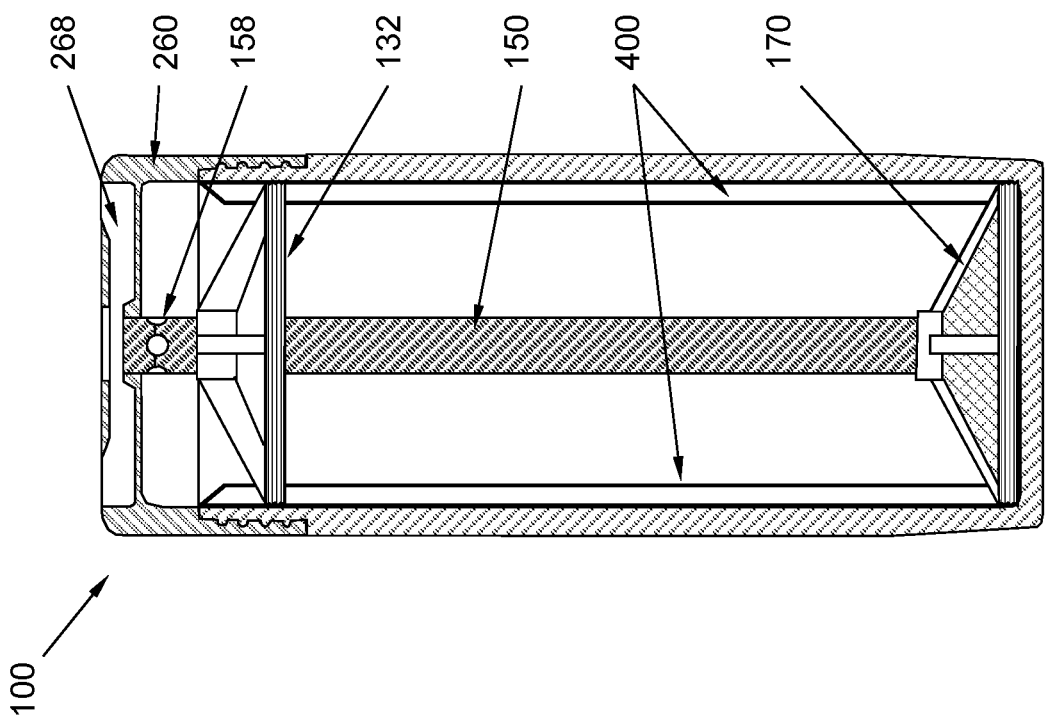
Figure 40A:
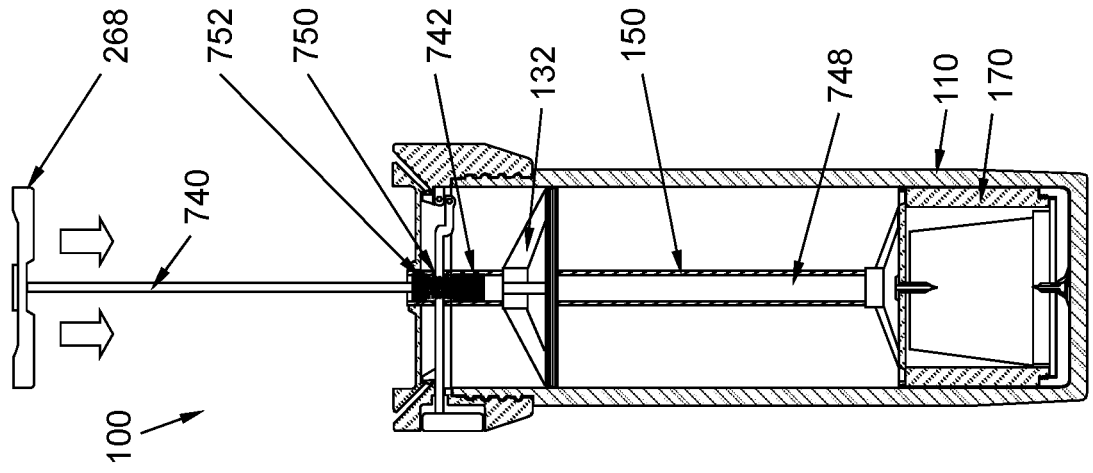
Figure 40B:
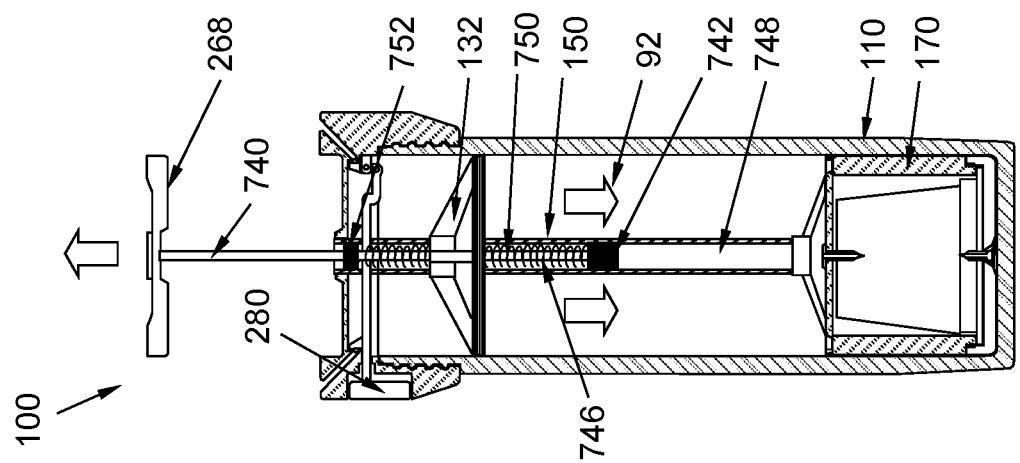
Figure 40C:
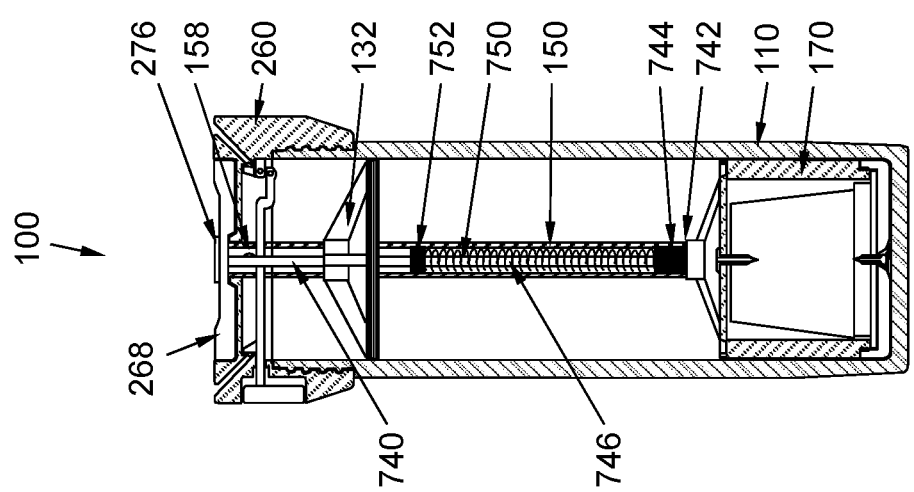
Figure 41D:
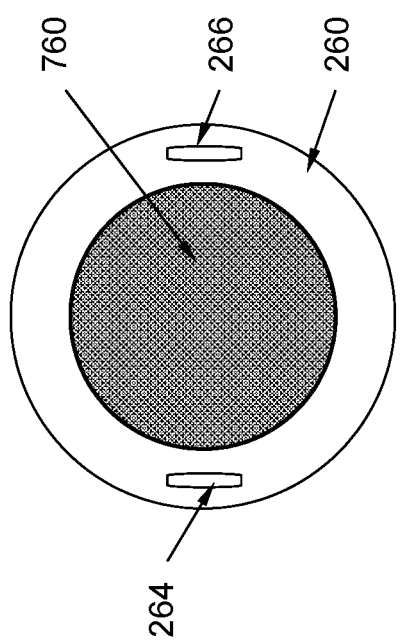
FIG. 41D is a top view generally illustrating portions of an embodiment of a container assembly according to teachings of the present disclosure.

With embodiments, such as generally illustrated in FIGS. 18A and 18B, container may include one or more axially-extending rails 400. Rails 400 may engage corresponding recesses 142 of plunger 132 and/or rails 400 may restrict rotational movement of plunger 132. For example and without limitation, rails 400 may prevent plunger 132 from rotating with rod 150. In embodiments with more than one rail 400, rails 400 may be equally spaced from each other (e.g., circumferentially).

With embodiments, such as generally illustrated in FIGS. 20A, 20B, and 20D, a cartridge 230N (e.g., cartridge 230$_5$) may include media 90 and/or an aerator 410. Media 90 may include one or more of a variety of materials and/or fluids. For example, and without limitation, media 90 may include liquid flavoring, brewing media, hops, and/or materials. Container assembly 100 may operate to cause a fluid 92 to mix with mixing media 90, which may include adding additional flavor to fluid 92 (e.g., adding a flavoring to coffee, mixing beer with hops, etc.).

In embodiments, aerator 410 may be configured to introduce a gas (e.g., air 96) into a liquid (e.g., of fluid 92). For example and without limitation, fluid 92 may include wine and aerator 410 may aerate the wine as the wine flows through cartridge 230$_5$. Air provided by aerator 410 to a fluid 92 may be initially present in aerator 410 (e.g., a cartridge 230$_5$ may include a volume of air 96 that may be used to aerate liquids).

With embodiments, such as generally illustrated in FIGS. 21A, 21B, 21C, a cartridge 230$_N$ (e.g., cartridge 230$_6$) may be configured entirely as an aerator/conditioner 410 (as opposed to also including media 90). Cartridge 230$_6$ may be configured for aerating and/or conditioning fluids 92 (e.g., beverages). For example and without limitation, cartridge 230$_6$ may be configured to produce beer foam/head (e.g., relatively uniform bubbles in the beer to create a condensed/dense foam or head), to create froth for a latte or cappuccino (e.g., from within), and/or to aerate wine. Housing 170 may include a screen or mesh section 420 that may be configured to filter out relatively large particles (e.g., foreign objects, brewing media, etc.) from flowing into housing (e.g., from container 110) and/or from flowing out of housing (e.g. into rod 150).

With embodiments, such as generally illustrated in FIGS. 22A, 22B, 22C, 23A, 23B, 23C, 24A, 24B, and 24C, container assembly 100 may be configured for making espresso. Container assembly 100 may include a container 110, a plunger assembly 130, housing 170, a lid 260, and/or a second lid assembly 430. Lid 260 may be configured to actuate plunger assembly 130 to cause fluid 92 (e.g., water) to flow to a cartridge 230$_N$ (e.g., cartridge 230$_7$) holding brewing media 90, such as espresso grounds or similar. Plunger 132 may be configured to at least partially receive housing 170. For example and without limitation, plunger 132 may include a tubular section 450 that may extend toward housing 170 and/or may be configured to slide over housing 170 (e.g., to a flange 460 of housing 170). Plunger 132 may include a second seal element 452 that may be configured to provide a fluid seal between tubular section 450 and inner surface 116 of container 110.

In embodiments, housing 170 may be used in conjunction with second lid assembly 430. Second lid assembly 430 may be configured for connection with second end 114 of container 110 and may include a second lid 432 and/or a tamper diffuser 434. Second lid 432 may connect with (e.g., screw onto/into) second end 114 of container 110. Housing 170 may include a radial flange 460 configured to be secured between container 110 and second lid 432 (e.g., at least a portion of flange 460 may be sandwiched between second lid 432 and container 110). Flange 460 may include a screen or mesh section or sections 462 that may be disposed radially between an outer edge 464 of flange 460 and an outer wall 466 of housing 170. A screen or mesh portion 462 may permit fluid 92 (e.g., water) to flow through screen or mesh portion 462 and/or may permit fluid 92 to flow into second lid 432.

With embodiments, a tamper diffuser 434 may be connected to second lid 432 such that upon connection of second lid 432 with container 110 (e.g., in an assembled configuration), tamper diffuser 434 may be aligned with housing 170 and/or may at least partially enter housing 170. In embodiments, a height 434H (e.g., in an axial direction) of tamper diffuser 434 may correspond to an expected amount of brewing media 90 and/or may compact/tamp brewing media 90 in housing 170. For example and without limitation, a compacting/tamping pressure provided by tamper diffuser 434 may be about 30 psi when about 18 g-21 g of brewing media 90 is disposed in housing 170, which may correspond to a double shot of espresso.

In embodiments, tamper diffuser 434 may include one or more channels 436 (e.g., fluid channels) and/or one or more diffusion holes 438. Fluid 92 that flows into second lid 432 may flow into channels 436 and/or holes 438 and into housing 170 where fluid 92 may mix with media 90 (e.g., espresso grounds) to form a mixed fluid 94. Mixed fluid 94 may then flow through rod 150 to apertures 158 and/or into chamber 144, from where it may be dispensed/consumed (e.g., via first port 264). Tamper diffuser 434 may include a generally cylindrical configuration and channels 436 may be disposed at radial sides 434A of tamper diffuser 434 and/or an axial end 434B of tamper diffuser 434. Diffusion holes 438 may be disposed in axial end 434B of tamper diffuser 434 and may extend through to a second axial end 434C of tamper diffuser 434 to provide fluid communication between second lid 432 and housing 170.

With embodiments, tamper diffuser 434 may include an extension 440 (see, e.g., FIGS. 23A, 23B, and 23C). Extension 440 may be configured to increase the height 434H of tamper diffuser 434 such that tamper diffuser 434 may still compact/tamp brewing media 90 when a lesser amount of brewing media 90 is disposed in housing (e.g., for single shots of espresso). For example and without limitation, tamper diffuser 434 with extension 440 may provide 30 psi of pressure even for a single shot of espresso (e.g., about 1 ounce). Extension 440 may, for example, screw into tamper diffuser 434.

In embodiments, lid lever 268 may cause plunger 132 to translate within container 110 toward housing 170. As plunger 132 translates, plunger 132 may force fluid 92 (e.g., water) in container 110 to flow through flange 460 to one or more fluid passages 442 in second lid assembly 430. Fluid 92 may flow from passages 442 through tamper diffuser 434 to mix with brewing media 90 and form mixed/brewed fluid 94. Mixed fluid 94 may flow out of housing 170, into rod 150, and/or into chamber 144 via apertures 158.

With embodiments, such as generally illustrated in FIGS. 25A, 25B, 25C, and 25D, a cartridge $230_N$ may include an espresso cartridge, such as cartridge $230_7$ (e.g., a Nespresso® cartridge). For example, and without limitation, cartridge $230_7$ may be inserted into a cartridge adapter 470, which may puncture holes, via first and second puncturing protrusions 474, 476, in the top and bottom of cartridge $230_7$. Cartridge adapter 470 with cartridge $230_7$ may be inserted into housing 170 and/or second lid 432 may be connected to container 110. As plunger 132 moves toward housing 170, fluid 92 (e.g., water) may flow through screen or mesh section 462, into second lid 432, from second lid 432 through second puncturing protrusion 476, and/or into cartridge $230_7$ where it may mix with media 90 to form mixed fluid 94. Mixed fluid 94 may flow through first puncturing protrusion 474, into rod 150, through apertures 158, and/or into chamber 144 from where it may be dispensed and/or consumed. Cartridge adapter 470 may include a flange 472 that may engage housing 170 (e.g., ledge 190).

In embodiments, such as generally illustrated in FIGS. 26A, 26B, 26C, 26D, and 26E, a container assembly 100 may include a drive assembly 490. Drive assembly 490 may include an outer wall 492, an axial wall 494, and/or a drive connector 496. Outer wall 492 may be configured for connection with container 110 and/or lid 260. For example and without limitation, outer wall may include an external thread 492A for screwing into internal threads 262A of lid 260 and/or may include internal threads 492B for screwing onto external threads 120A of container 110. Axial wall 494 may be connected to an inner surface 492C of outer wall 492. Drive connector 496 may be connected to axial wall 494 and may be configured for connection with lid lever 268. For example and without limitation, drive connector 496 may be connected with lid lever 268 in a manner similar to that of rod 150, and drive connector may rotate with lid lever 268.

With embodiments, a blade 510 may be connected with drive connector 496. For example and without limitation, rotation of lid lever 268 may cause rotation of drive connector 496, which may cause rotation of blade 510, which may mix, chop, blend, froth, grind, process, and/or otherwise contact fluid and/or material in container 110 and/or drive assembly 490 (e.g., mix beverages, froth beverages, grind coffee beans, grind spices, etc.). In some configurations, such as generally illustrated in FIG. 26E, a cap 514 may close off blade in drive assembly 490 (e.g., instead of connecting with container 110). Such configurations may be used, for example, to grind coffee beans and/or spices as cap 514 may limit the distance beans/spices can move away from blade 510. With embodiments, blade 510 may include a plurality of blade portions 512 that may be circumferentially spaced from each other.

In embodiments, such as generally illustrated in FIGS. 27A, 27B, 27C, and 27D, a mixing paddle 520 may be connected to drive assembly 490 (e.g., drive connector 496). Mixing paddle 520 may include a plurality of axially-extending paddle portions 522 that may be spaced from each other. Mixing paddle 520 may be used, for example, in connection with making ice cream. Rotation of lid lever 268 (e.g., via power pod 340) may cause rotation of mixing paddle 520, which may mix and/or whip fluids and/or materials 92 disposed in container 110 and/or drive assembly 490.

With embodiments, such as generally illustrated in FIGS. 27C and 27D, container assembly 100 may include a cooling jacket 530 that may be disposed at least partially around container 100 (e.g., around radial sides and second end 114 of container 110). Cooling jacket 530 may be configured to hold a cooling material 532, such as iced salt water, which may contact a wall 118 of container 110 and/or cool container 110 and any fluids/materials therein.

In embodiments, such as generally illustrated in FIGS. 28A and 28B, drive assembly may include a gear arrangement 540. Gear arrangement 540 may be configured to increase the torque or speed output of drive assembly 490 relative to a torque or speed output of lid lever 268. Gear arrangement 540 may include, for example, a first gear 542 connected to lid lever 268, and a second gear 544 connected to first gear 542 and to drive connector 496.

With embodiments, such as generally illustrated in FIGS. 29A and 29B, container assembly may include a salad spinner 550. Salad spinner 550 may include an outer container 552 and an inner container 554 configured to spin relative to outer container 552. Inner container 554 may be connected with lid 260 such that rotation of lid lever 268 (e.g., via power pod 340) causes rotation of inner container 554 relative to outer container 552. For example and without limitation, inner container 554 may be connected to lid lever 268 (e.g., in a similar manner to rod 150) and/or may be connected to drive assembly 490. Outer container 552 and/or inner container 554 may include outer diameters 552D, 554D that may be larger than an outer diameter 260D of lid 260 (e.g., at least twice as large). If lettuce (or other material) is placed in inner container 554 and lid lever 268 is rotated, the lettuce may spin with inner container 554 and water or other material on the lettuce may be forced to the outer container 552 (e.g., effectively drying the lettuce).

With embodiments, such as generally illustrated in FIGS. 30A, 30B, 30C, 30D, 31A, 31B, 32A, and 32B, container assembly 100 may include a food processor 560. Food processor 560 may include a container 562 and a blade 566 configured to spin relative to container 562. Blade 566 may be connected with lid 260 such that rotation of lid lever 268 (e.g., via power pod 340) causes rotation of blade 566 relative to container 562. For example and without limitation, blade 566 may be connected to lid lever 268 (e.g., in a similar manner to rod 150) and/or may be connected to drive assembly 490. Container 562 and/or blade 566 may include outer diameters 562D, 556D that may be larger than outer diameter 260D of lid. Container 562 may include an aperture 564 through which food 580 may be inserted into container 562. Blade 566 may include one or more cutting portions 568. If food 580 is inserted through aperture 564 in container 562 while blade 566 is spinning (e.g., via lid lever 268 rotation and/or power pod 340 actuation), food 580 may engage blade 566, which may process (e.g., slice, cut, etc.) the food 580.

In embodiments, blade 566 may include a disc-like configuration, cutting portions 568 may extend radially, and/or aperture 564 may be disposed in an axial surface of container 562 (see, e.g., 30A, 30B, 30C, and 30D). Processed food 580 may move through blade 566 farther into container 562. In other embodiments, blade 566 may include a drum-like configuration, cutting portions 568 may extend axially, and/or aperture 564 may be disposed in a radial surface of container 562 (see, e.g., FIGS. 31A, 31B, 32A, and 32B). With embodiments, container assembly 100 may be mounted to a stand 582 (see, e.g., FIGS. 32A and 32B). Container 562 may include an open end 570 and food 580 processed by food processor 560 may exit container 562 through open end 570 and fall into an adjacent receptacle 584, such as a bowl.

In embodiments, such as generally illustrated in FIGS. 33A, 33B, 33C, 33D, and 33E, a container assembly 100 may be configured for dispensing paste-like materials 600, such as frosting/icing, cookie dough, cake batter, and/or pancake/waffle batter, among others. A plunger assembly 130 may include a plunger 132, a rod 150, and/or a rod stabilizer 602. Rod stabilizer 602 may be configured to stabilize and/or limit movement of rod 150 within container 110. For example and without limitation, rod stabilizer 602 may be connected at or about second end 154 of rod 150 and/or may include an outer diameter 602D about equal to an inner diameter 110D of container 110. In such configurations, a housing 170 may not be disposed in container 110.

With embodiments, container assembly 100 may include a cap/nozzle 606 that may be connected to and/or at least partially close second end 114 of container 110. As plunger 132 translates toward second end 114 of container 110, material may flow/move out of container 110 through cap/nozzle 606. Container assembly 100 may include a shaping disc 608 that may be connected between container 110 and cap/nozzle 606 and may provide a shape, at least temporarily, to material 600 that flows through shaping disc 608. For example and without limitation, shaping disc 608 may include a star-shape aperture 610 and material 600 may flow/move from container 110 through shaping disc 608 and/or out through cap/nozzle 606. Cap/nozzle 606 may include a threaded section 606A for connecting with container 110.

In embodiments, such as generally illustrated in FIGS. 34A, 34B, 34C, and 34D, a container assembly 100 may include a charging pod 620 and/or a light/lamp pod 640. Charging pod 620 may include a driving gear 622, an electrical generator 624, and/or an energy storage device 628 (e.g., a rechargeable battery or batteries). Driving gear 622 may be connected with a lid lever 168 such that rotation of lid lever 168 causes rotation of driving gear 622. Driving gear 622 may be connected to (e.g., engaged with) an input shaft or gear 626 of electrical power generator 624 such that rotation of driving gear 622 may cause rotation of input shaft 626. Rotation of input shaft 626 may cause electrical generator 624 to generate electrical energy, which may be provided to energy storage device 628 and/or light pod 640, for example.

With embodiments, light pod 640 may include a container 110 and a plurality of lights 642 (e.g., light emitting diodes or LEDs) disposed in container 110. Wall 118 of container 110 may be at least semi-transparent and/or may permit light from lights to pass through. Lights 642 may be disposed in one or more of a variety of positions within container 110. For example and without limitation, a plurality of lights 642 may be connected to and/or arranged in a column 646 that may be aligned with a center of container 110 (e.g., axis 102) and may extend from a first end 112 of container 110 toward second end 114 of container 110. At or about second end 114 of container 110, light pod 640 may include a flashlight configuration 648 with one or more lights 642 directed in an axial direction away from first end 112. Flashlight configuration 648 may include a reflective surface 650 that may be disposed around the one or more axially-directed lights 642.

In embodiments, such as generally illustrated in FIGS. 34A and 34C, lid 260 may include a crank 660 that may be connected to lid lever 268 to facilitate rotation of lid lever 268. Crank 660 may rotate between a folded position in which crank 660 may at least partially abut lid lever 268

(e.g., lay on lid lever 268) and an unfolded position in which crank 660 may extend in a radial direction. Crank 660 may include a folding handle portion 662.

In embodiments, such as generally illustrated in FIGS. 34E, 34F, 34G, and 34H, a container assembly may include a battery pod 670 that may be configured for connection (e.g., electrical and/or physical) with charging pod 620. Battery pod 670 may include one or more batteries or cells 672 (or other energy storage device) that may be electrically connected together, such as to provide a 12 volt DC output. Batteries/cells 672 may be at least partially surrounded with insulating material 674. Battery pod 670 may be electrically connected with charging pod 620 via corresponding terminals 676 (e.g., positive and negative terminals), which may be circular and/or ring-shaped (see, e.g., FIG. 34G). Electrical energy generated via electrical generator 624 may be provided, via terminals 676, to battery pod 670 and battery pod 670 may store such energy. Electrical power generator 624 may be actuated by lid lever 268 and/or foldable crank 660. Battery pod 670 may be charged via electrical power generator 624 and/or an external source, such as via a first power input 678 (e.g., a USB power input) and/or a second power input 680 (e.g., an AC power input) of charging pod 620. Battery pod 670 may include a remaining power/charge indicator 682 that may be disposed at an outer wall 684 of battery pod 670. In embodiments, battery pod 670 may include one or more lights 642 that may be configured in the same or a similar manner as lights 642 of light pod 640.

With embodiments, charging pod 620 may include one or more control inputs 630, such as a power button that may control whether electrical current is output from charging pod 620 (e.g., to a light pod 620 or to a battery pod 670).

With embodiments, such as generally illustrated in FIGS. 35A, 35B, 36A, and 36B, a container assembly 100 may include and/or be connected to an external actuator 690. External actuator 690 may be configured to actuate (e.g., rotate) lid lever 268, such as in a similar manner as power pod 340. External actuator 690 may, for example, include a gear arrangement 692 connected to a tire (or other drive component) 694 of a vehicle, such as a bicycle. Rotation of tire 694 may cause rotation of one or more gears of gear arrangement 692, which may cause rotation of lid lever 268, such as via a drive lever 696 that may be configured in the same or a similar manner as drive lever 342 of power pod 340. External actuator 690 may be configured to actuate lid lever 268 for one or more of a variety of configurations/uses of a container assembly 100 (e.g., brewing coffee, brewing espresso, spinning salad, blending/chopping/grinding, ice cream making, providing light, etc.).

With embodiments, such as generally illustrated in FIGS. 37A, 37B, 37C, 37D, 38A, 38B, 38C, 38D, 38E, 38F, 38G, 38H, 38I, 39A, 39B, 39C, and 39D, a container assembly 100 may be used/utilized with a reservoir tube 700. Container assembly 100 may include a lid 260 and/or a container 110 configured to receive reservoir tube 700. Lid 260 may be configured to cause movement of a plunger 132 along a rod 150 (e.g., a threaded rod). Container assembly 100 may be configured to dispense material from reservoir tubes 700.

In embodiments, container 110 and reservoir tube 700 may include a variety of shapes, sizes, configurations, and/or materials. For example and without limitation, container 110 and/or reservoir tube 700 may include corresponding cross-sectional shapes, such as generally rectangular cross-sectional shapes (see, e.g., FIGS. 37A-37D, 38A-38D, 38H, and 38I). A rectangular cross-section shape may allow for reservoir tubes 700 to be packaged efficiently (see, e.g., FIGS. 38D and 38E).

In embodiments, container 110 and/or reservoir tube 700 may include generally circular cross-sectional shapes (see, e.g., FIGS. 38F and 38G). Reservoir tube 700 may include a single compartment 704 (see, e.g., FIGS. 37A-37D, 38A-38G) or may include a plurality of compartments 706, 708 (see, e.g., FIGS. 38G-38I). Compartments 706, 708 may be spaced arranged circumferentially and/or radially (as opposed to axially). Compartments of rectangular reservoir tubes 700 (e.g., compartments 706) may be rectangular. For example and without limitation, reservoir tube 700 may be substantially square-shaped and/or compartments 706 may be rectangular, but not square-shaped. Compartments of circular reservoir tubes 700 (e.g., compartments 708) may be sector-shaped.

With embodiments, reservoir tubes 700 may be collapsible and/or may include a hollow portion 720 that may be configured to receive at least a portion of rod 150. A reservoir tube 700 may be inserted into container 110 from second end 114 of container 110 such that rod 150 extends into hollow portion 720. If a lid lever 268 of lid 260 is actuated, rod 150 may rotate, which may cause a plunger 132 to move toward second end 114 of container 110. As plunger 132 moves toward second end 114, plunger 132 may force material in reservoir tube 700 to move/flow out of reservoir tube 700 and/or may cause reservoir tube 700 to at least partially collapse. Reservoir tube 700 may collapse from an initial height (see, e.g., FIG. 38A), to an intermediate height (see, e.g., FIG. 38B), and/or to fully collapsed height (see, e.g., FIG. 38C). Collapsing of reservoir tube 700 may include reservoir tube 700 bending/folding at predetermined/designed folding areas 722 that may be spaced (e.g., equally) along a length of reservoir tube 700. Reservoir tube may be filled and/or refilled via a check valve 724 that may be disposed in a dispensing nozzle 726. Dispensing nozzle 726 may be connected to a second end 114 of container 110.

In embodiments, container assembly 100 may include an ECU 730 and/or a display 732 (e.g., an electronic display) that may display information about the contents of a reservoir tube 700. For example and without limitation, container assembly 100 and/or ECU 730 may be configured to obtain information from a reservoir tube 700, such as via a barcode 710, QR (quick response) code, RFD (radio-frequency identification) communication, Bluetooth®, and/or other communication methods. ECU 730 may be configured to display information from a reservoir tube 700 on display 732. Container assembly 100 and/or ECU 730 may be configured to obtain information from external sources (e.g., the internet) and display such external information on display 732 (e.g., manufacturer coupons, advertising, promotions, etc.). Display 732 may be a touch display and/or may be configured to allow a user to obtain/download information about the material in reservoir tube 700.

With embodiments, a lid lever 268 of a container assembly 100 may be connected to an inner rod 740 that may be configured to slide into and out of a rod 150. Lid lever 268 may be lifted upward from a lid 260, which may pull inner rod 740 up. A flange 742 may be connected at or about a distal end 744 of inner rod 740 and/or flange 742 may function in a similar manner as a check valve. For example and without limitation, flange 742 may engage rod 150 to prevent fluid flow between flange 742 and rod 150 when inner rod 740 is moving away from second end 114 of container 110 and may permit fluid flow between flange 742 and rod 150 when inner rod 740 is moving toward second end 114 of container 110.

In embodiments, as lid lever 268 and inner rod 740 are moved away from second end 114 of container 110, flange 742 may pull fluid (e.g., mixed fluid 94) disposed in an upper section 746 of rod 150 toward first end 112 of container 100 and such fluid 94 may flow out of rod 150 and into container 110 via apertures 158. As flange 742 moves away from second end 114, a low pressure area may be created in a lower section 748 of rod 150, which may cause mixed fluid 94 from housing 170 to flow into lower section 748. In embodiments, at least initially, upper section 746 may be filled with air 96 and an initial actuation (e.g., pulling up) may push air 96 into container 110, which may push fluid 92 already in container 110 toward second end 114 of container 110. If lid lever 268 and inner rod 740 are moved toward second end 114, flange 742 may move through mixed fluid 94 in lower section 748 and/or mixed fluid 94 in lower section 748 may flow past flange 742 into upper section 746 such that upper section 746 may become least partially filled with mixed fluid 94. Upon a subsequent movement/actuation of lid lever 268 and inner rod 740 away from second end 114, flange 742 may push mixed fluid 94 from upper section 746 into container 110 via apertures 158. A spring 750 may bias inner rod toward second end 114. A guide gasket 752 disposed in rod 150 and/or around inner rod 740 may maintain at least a portion of inner rod 740 in alignment relative to rod 150 (e.g., centered).

In embodiments, such as generally illustrated in FIGS. 41A, 41B, 41C, and 41D, a container assembly may include a pump 760 that may be configured to cause fluid 92 in a container 110 to flow. Pump 760 may, for example, be configured as a generally hollow, hemispherical button that may be connected to a first end 260A of a lid 260. Pump 760 may be in fluid communication with a rod 150 via a first orifice 762 and/or pump 760 may be in fluid communication with container 110 via one or more other orifices 764. When actuated, pump 760 may be configured to cause fluid (e.g., mixed fluid 94) to flow out of pump 760 into container 110 via orifices 764 and/or create a lower pressure area (e.g., a vacuum) within pump 760 to draw fluid (e.g., mixed fluid 94) from rod 150 into pump 760 through first orifice 762 (see, e.g., FIG. 41B). Pump 760 may be configured to return to a rest position (see, e.g., FIGS. 41A, 41C) after being actuated. For example and without limitation, pump 760 may include a flexible and/or resilient material, and/or a biasing member 766 (e.g., a spring) may be connected to and/or disposed in pump 760 to bias pump 760 toward a rest position.

In embodiments, at least initially, pump 760 may be filled with air 96 and an initial actuation of pump 760 (e.g., pressing down) may push air 96 into container. Biasing member 766 may cause pump 760 to return to a rest position, which may create a lower pressure area in pump (e.g., relative to rod 150 and/or container 110). Lower pressure in pump 760 may cause fluid from rod 150 to flow into pump 760. Initially, fluid that flows from rod 150 into pump 760 may be primarily air 96. If pump 760 continues to be actuated, fluid that flows from rod 150 into pump 760 may be primarily mixed fluid 94 (e.g., water 92 that has flowed from container 110 to a housing 170 or cartridge $230_N$, mixed with media 90, and/or flowed through rod 150).

With embodiments, a first check valve 768 may be connected to rod 150 such that fluid may flow from housing 170 toward lid 260, but may not flow from lid 260 toward housing 170 (e.g., pump 760 may only receive fluid from rod 150 and may not push fluid into rod 150). Additionally or alternatively, check valves 770 may be connected with each other orifice 764 and may be configured to permit fluid flow out of pump 760 into container 110 and not permit fluid flow from container 110 into pump 760.

In embodiments, a container assembly 100 with a pump 760 may not include a plunger 132 and/or a plunger 132 may be removed after a first cycle (e.g., after plunger 132 reaches housing 170). For example and without limitation, if a filtration cartridge $230_4$ is used, fluid could be repeatedly cycled/pumped through cartridge $230_4$ to provide additional filtering. Additionally or alternatively, if a brewing cartridge (e.g., cartridges $230_1$, $230_2$, $230_3$) is used, fluid could be repeatedly cycled/pumped through the cartridge to increase a strength of the mixed fluid 94 (e.g., stronger/darker coffee).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the scope thereof. Therefore, it is intended that the present teachings not be limited to the particular examples illustrated by the drawings and described in the specification, but that the scope of the present disclosure will include any embodiments falling within the foregoing description and the appended drawings.

What is claimed is:

1. A container assembly, comprising:
    a container;
    a plunger assembly including a plunger;
    a lid including a lid lever connected to actuate the plunger of the plunger assembly; and
    a housing disposed in the container and configured to receive mixing media;
    wherein the plunger assembly includes a rod connected to the lid and the housing; and the rod includes an internal fluid passage providing fluid communication between the housing and an end of the rod.

2. The container assembly of claim 1, wherein the lid lever is disposed at a top surface of the lid.

3. The container assembly of claim 1, wherein the plunger is connected to the rod via a threaded engagement.

4. The container assembly of claim 1, wherein the rod includes at least one aperture disposed proximate the end of the rod; the at least one aperture includes at least two apertures disposed in a side wall of the rod; and the end of the rod is a top end of the rod disposed proximate the lid.

5. The container assembly of claim 1, wherein rotation of the lid lever causes rotation of the rod and translation of the plunger along the rod.

6. The container assembly of claim 5, wherein translation of the plunger causes fluid disposed between the plunger and the housing to flow into the housing via at least one inlet port of the housing.

7. The container assembly of claim 6, comprising a fluid flow path that extends from the at least one inlet port of the housing to a fluid chamber provided between the plunger and the lid via (i) a fluid passage in a body of the housing, (ii) a first puncturing protrusion of the housing, (iii) a second puncturing protrusion, (iv) an outlet of the housing, (v) the internal fluid passage of the rod, and (vi) at least one aperture disposed proximate the end of the rod; and the end of the rod is disposed proximate the lid.

8. The container assembly of claim 7, comprising a cartridge adapter including the first puncturing protrusion and the second puncturing protrusion.

9. The container assembly of claim 1, wherein an axial position of the rod is fixed relative to the container.

10. The container assembly of claim 1, comprising a power pod including a drive lever configured to cause rotation of the lid lever and an electric motor connected to drive the drive lever.

11. The container assembly of claim 1, wherein the end of the rod is fixed to the lid lever.

12. The container assembly of claim 1, wherein the housing includes a body and a cover connected to the body; and a first puncturing protrusion is connected to the body and a second puncturing protrusion is connected to the cover.

13. The container assembly of claim 1, wherein the lid includes a first port, a second port, and a trigger configured to selectively seal the first port and the second port, the trigger comprising:
    a connecting member;
    a trigger button connected to the connecting member;
    a first protrusion connected to the connecting member and configured to seal the first port; and
    a second protrusion connected to the connecting member and configured to seal the second port.

14. The container assembly of claim 13, wherein the housing is fixed relative to the container.

15. The container assembly of claim 13, wherein the connecting member is rotatably fixed to the second protrusion; and the second protrusion is rotatably fixed to the lid via a hinge.

16. The container assembly of claim 15, wherein the second protrusion is configured to rotate about a movable first axis relative to the connecting member and to rotate about a fixed second axis relative to the hinge; and the first axis is offset from the second axis.

17. The container assembly of claim 13, wherein the trigger includes a spring biasing the trigger button to a closed position; the trigger button is at least partially disposed in a recess formed in an outer surface of the lid; and the spring is disposed at least partially in the recess.

18. The container assembly of claim 13, wherein the first protrusion and the second protrusion are fixed to the connecting member.

19. The container assembly of claim 1, wherein the container includes one or more axially-extending rails engaged with the plunger to restrict rotation of the plunger.

20. The container assembly of claim 1, comprising a second lid assembly, the second lid assembly including a second lid and a tamper diffuser.

21. The container assembly of claim 20, wherein the tamper diffuser includes at least one fluid channel and at least one diffusing hole.

22. The container assembly of claim 1, wherein the lid lever is disposed at least partially in a recess of a top surface of the lid.

23. The container assembly of claim 1, comprising a cooling jacket disposed at least partially around the container and configured to hold a cooling material.

* * * * *